US011296433B1

(12) United States Patent
Wanta et al.

(10) Patent No.: US 11,296,433 B1
(45) Date of Patent: Apr. 5, 2022

(54) SHELF WITH ELECTRICAL CONNECTIVITY

(71) Applicant: Sub-Zero Group, Inc., Madison, WI (US)

(72) Inventors: Keith R. Wanta, Mount Horeb, WI (US); Alan C. Wood, Cottage Grove, WI (US); Sean T. Petersen, Evansville, WI (US); Matthew J. McMillin, Palmyra, IN (US)

(73) Assignee: Sub-Zero Group, Inc., Madison, WI (US)

( * ) Notice: Subject to any disclaimer, the term of this patent is extended or adjusted under 35 U.S.C. 154(b) by 123 days.

(21) Appl. No.: 16/885,440

(22) Filed: May 28, 2020

Related U.S. Application Data

(63) Continuation of application No. 16/872,818, filed on May 12, 2020.
(Continued)

(51) Int. Cl.
*H01R 4/48* (2006.01)
*A47B 57/16* (2006.01)
(Continued)

(52) U.S. Cl.
CPC .............. *H01R 4/48* (2013.01); *A47B 57/16* (2013.01); *F25D 25/02* (2013.01); *H02B 1/012* (2013.01);
(Continued)

(58) Field of Classification Search
CPC .. F21V 33/0012; F25D 25/02; F25D 2325/00; F25D 27/00; F25D 27/005; F21W 2131/305; F21W 2131/405; A47F 11/10; A47F 3/001; A47B 2220/0075; A47B 2220/0077; H01R 12/7047; H01R 9/18; H01R 9/20
(Continued)

(56) References Cited

U.S. PATENT DOCUMENTS 5,034,861 A 7/1991 Skelnak et al.
5,287,252 A 2/1994 Caruso
(Continued)

FOREIGN PATENT DOCUMENTS

EP 2844935 B1 4/2013
EP 2916088 A1 9/2015
WO WO2014/205352 12/2014

*Primary Examiner* — Jong-Suk (James) Lee
*Assistant Examiner* — James M Endo
(74) *Attorney, Agent, or Firm* — Bell & Manning, LLC

(57) ABSTRACT

A shelf includes a shelf support plate, an insulator formed at least partially of a first electrically insulating material, a first fastener, a second fastener and a shelf brace. The shelf support plate, the first fastener, the second fastener, and the shelf brace are formed at least partially of electrically conductive material. The shelf support plate includes a first aperture wall. The insulator includes second and third aperture walls. The shelf brace includes a brace plate, a shelf hook that extends from the brace plate, and a fourth aperture wall through the shelf brace. The insulator mounts between the shelf support plate and the shelf brace using the first fastener inserted into the first and second aperture walls and the second fastener inserted into the fourth and third aperture walls. The shelf hook connects to an electrical connector to provide current to the shelf brace.

32 Claims, 51 Drawing Sheets

Related U.S. Application Data

(60) Provisional application No. 62/915,075, filed on Oct. 15, 2019.

(51) Int. Cl.
  *F25D 25/02* (2006.01)
  *H02B 1/01* (2006.01)
  *H02B 1/04* (2006.01)
  *F21S 4/22* (2016.01)
  *F21Y 115/10* (2016.01)
  *F21V 33/00* (2006.01)
  *F25D 27/00* (2006.01)

(52) U.S. Cl.
  CPC .................... *H02B 1/04* (2013.01); *F21S 4/22* (2016.01); *F21V 33/0012* (2013.01); *F21Y 2115/10* (2016.08); *F25D 27/00* (2013.01); *F25D 2325/00* (2013.01)

(58) Field of Classification Search
  USPC .......................................... 312/408; 362/127
  See application file for complete search history.

(56) References Cited

U.S. PATENT DOCUMENTS

| | | | |
|---|---|---|---|
| 5,348,485 A | 9/1994 | Briechle et al. | |
| 5,690,415 A * | 11/1997 | Krehl | A47F 5/101 108/23 |
| 6,065,821 A | 5/2000 | Anderson et al. | |
| 6,435,697 B1 | 8/2002 | Simmons et al. | |
| 6,813,896 B1 | 11/2004 | Janke et al. | |
| 7,600,888 B1 * | 10/2009 | Miller | A47F 3/001 362/217.05 |
| 8,646,935 B2 | 2/2014 | Karan | |
| 9,287,021 B2 | 3/2016 | Hammond et al. | |
| 9,455,506 B2 | 9/2016 | Kerner | |
| 9,541,328 B2 | 1/2017 | Kerner | |
| 9,581,383 B2 | 2/2017 | Brown et al. | |
| 9,719,719 B2 | 8/2017 | Kerner | |
| 9,989,298 B1 | 6/2018 | Wantland et al. | |
| 2003/0026091 A1 * | 2/2003 | Shemitz | A47F 11/10 362/125 |
| 2005/0081547 A1 * | 4/2005 | Avenwedde | G02B 6/0095 62/264 |
| 2008/0043456 A1 * | 2/2008 | Bernardini | F25D 25/02 362/94 |
| 2010/0270925 A1 | 10/2010 | Withers | |
| 2014/0022790 A1 | 1/2014 | Wang | |
| 2014/0235093 A1 * | 8/2014 | Harlan | A47B 97/00 439/370 |
| 2014/0376213 A1 | 12/2014 | Miedema et al. | |
| 2015/0289681 A1 * | 10/2015 | Sun | A47F 5/103 108/23 |
| 2016/0061429 A1 * | 3/2016 | Waalkes | H01R 25/142 362/217.15 |
| 2016/0161669 A1 | 6/2016 | Lee | |
| 2016/0316939 A1 * | 11/2016 | Kraiss | A47F 5/103 |
| 2017/0191743 A1 * | 7/2017 | Lee | F25D 27/00 |

* cited by examiner

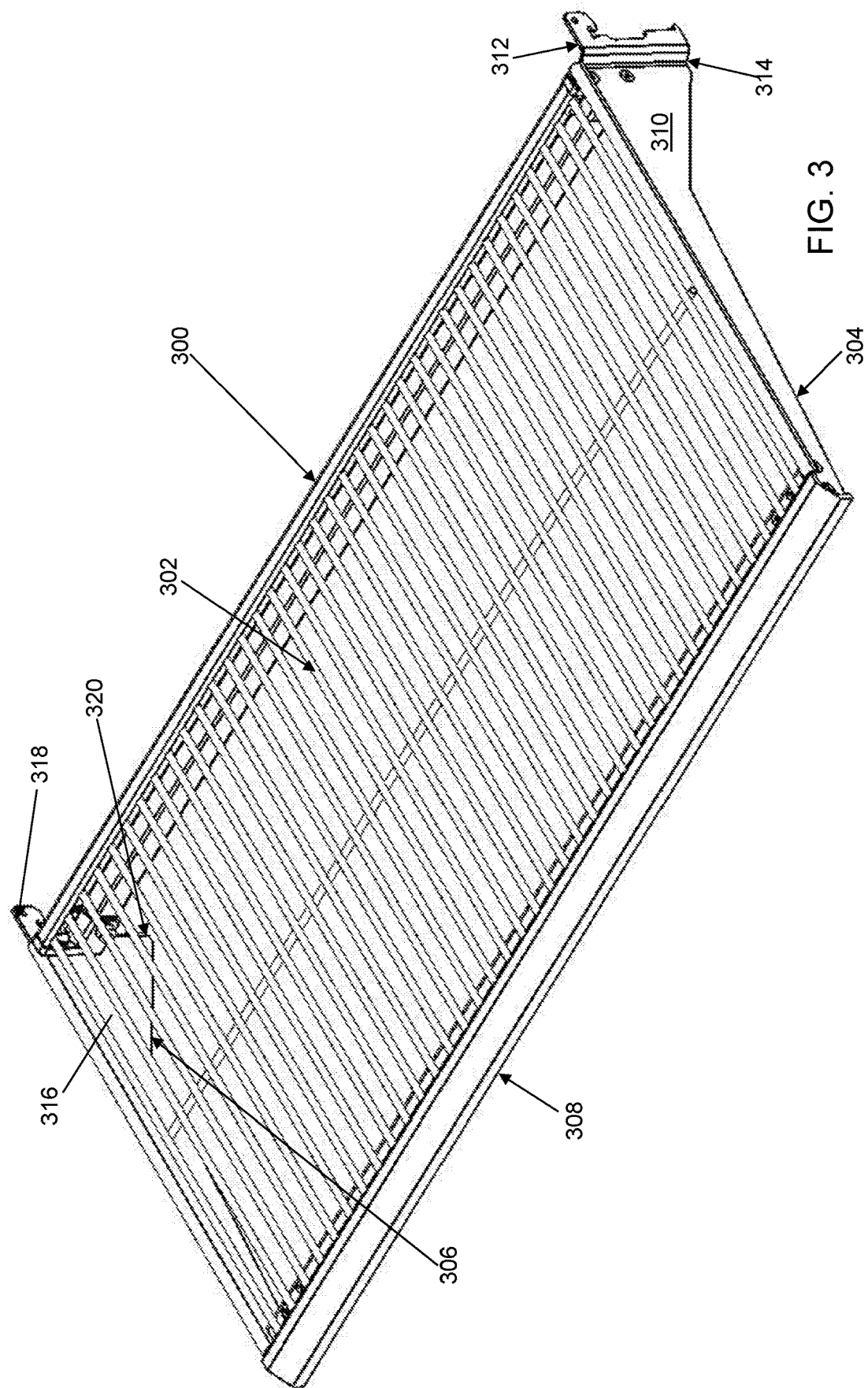

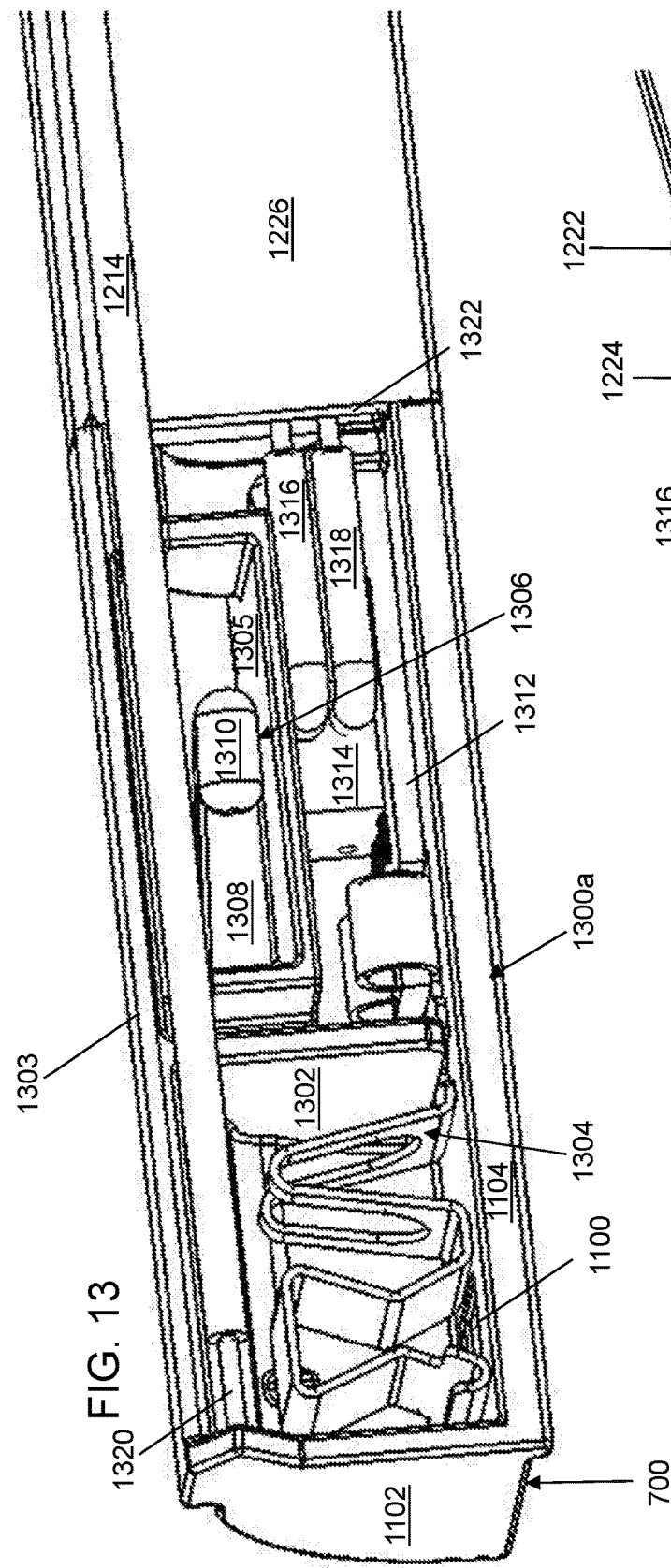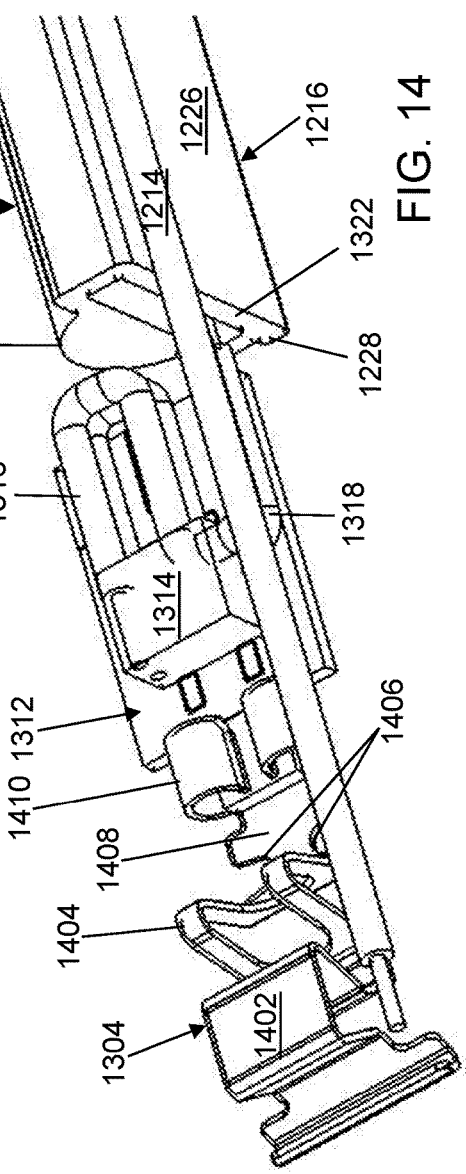

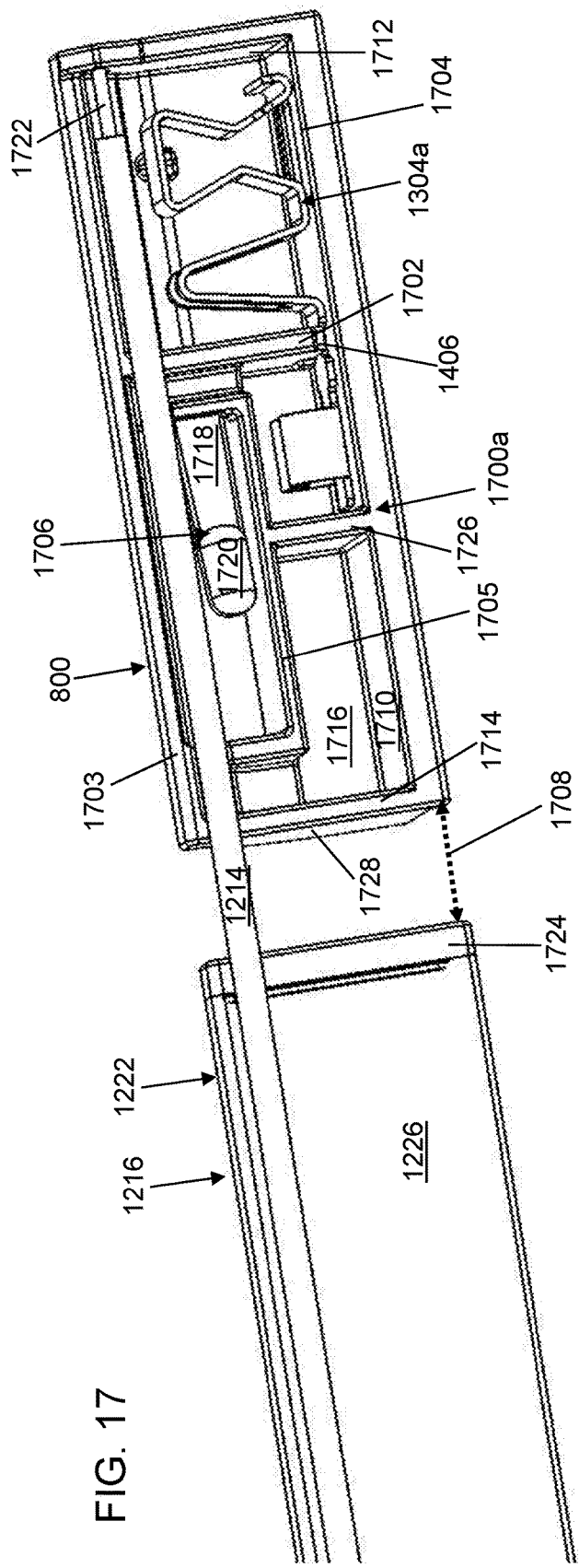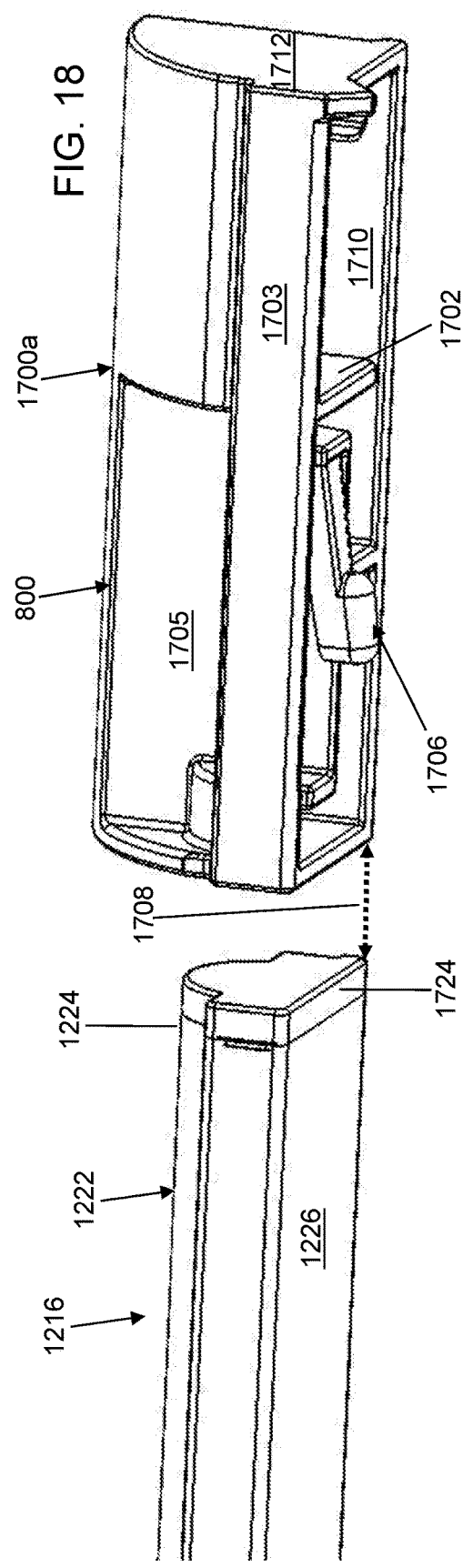

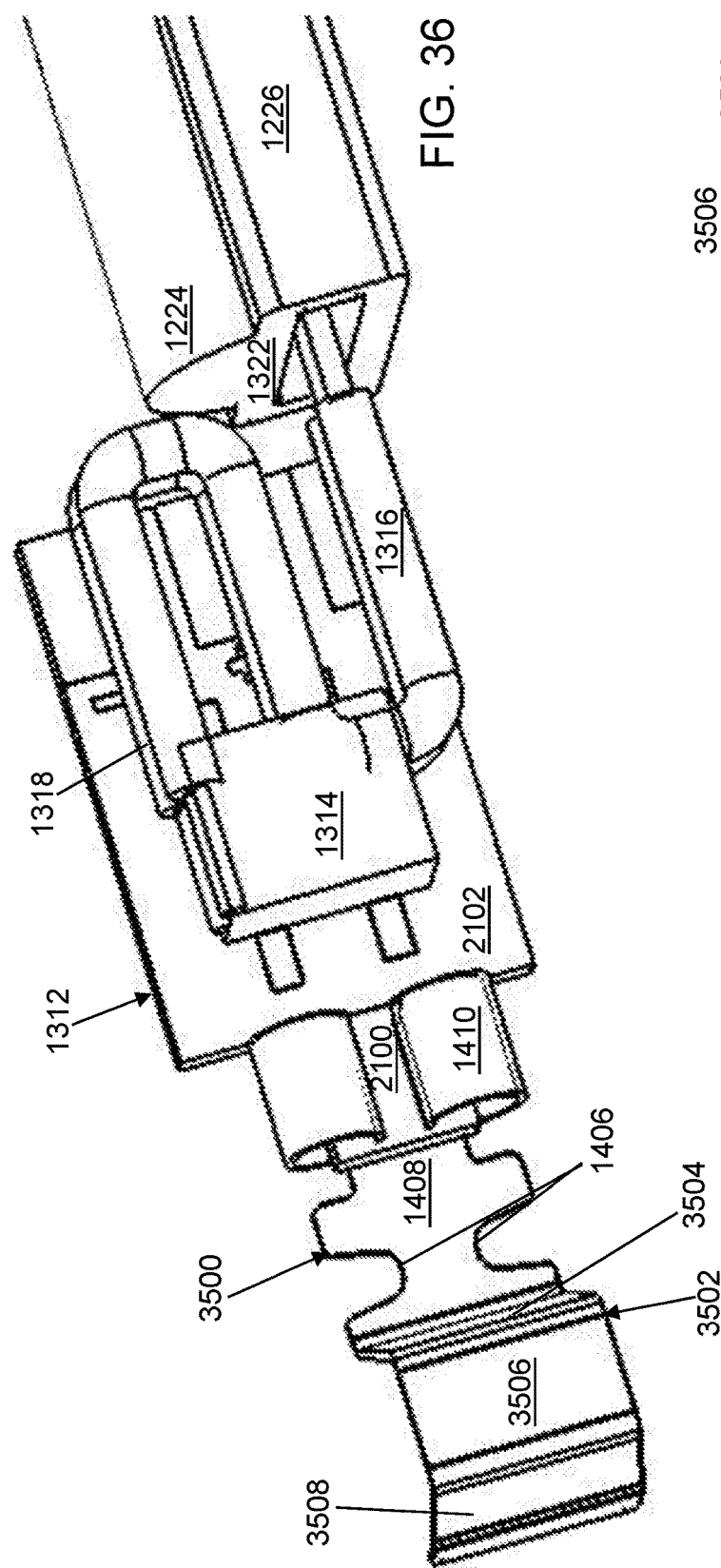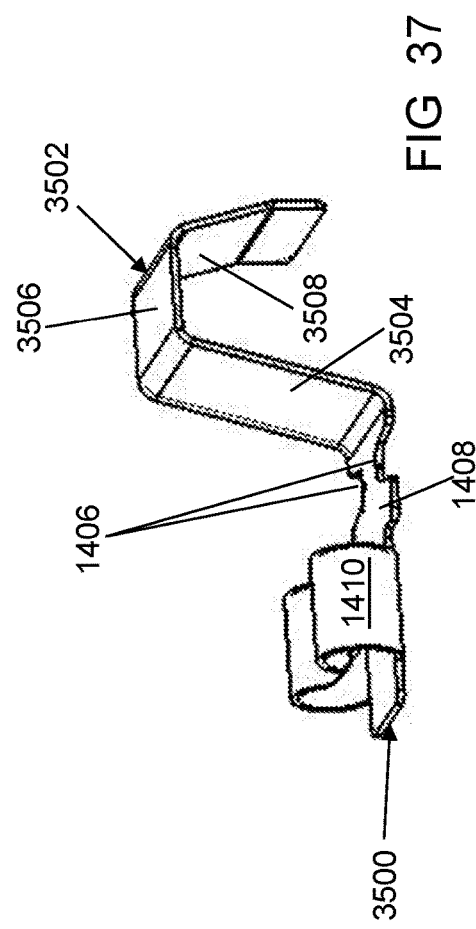

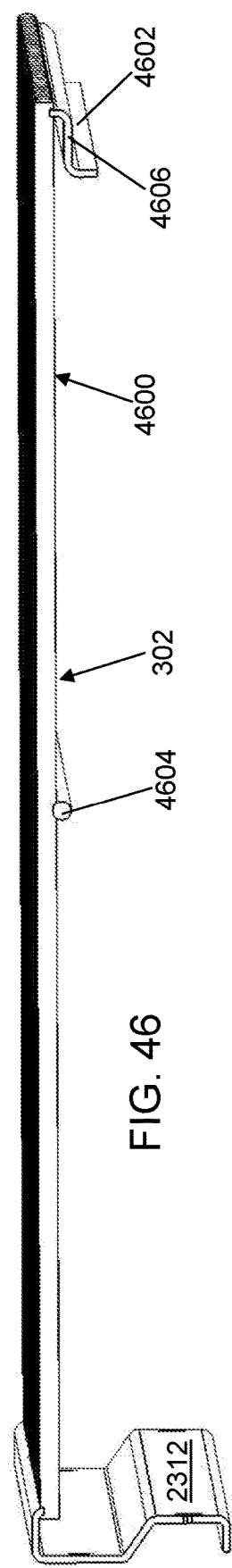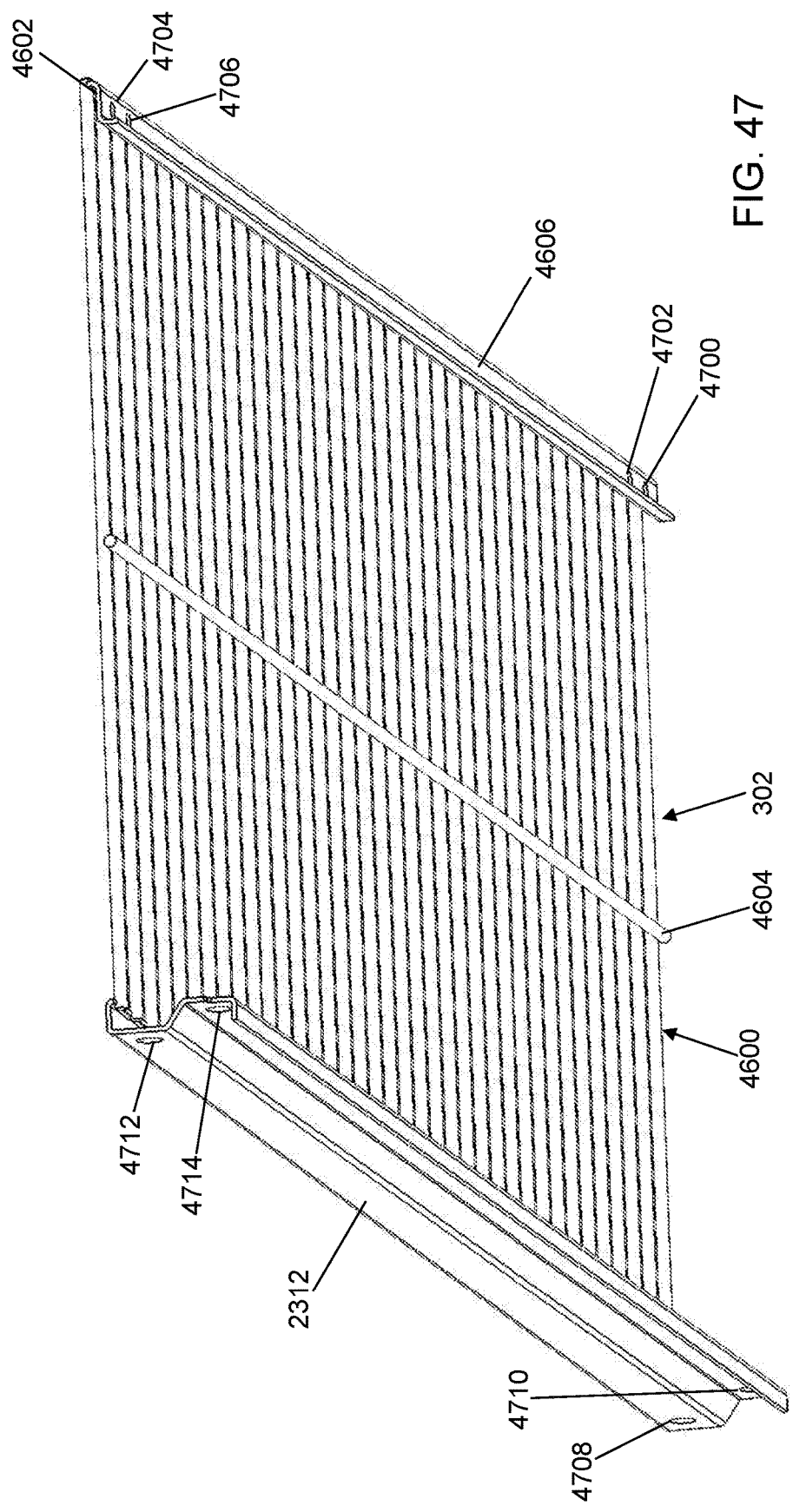

SHELF WITH ELECTRICAL CONNECTIVITY

CROSS-REFERENCE TO RELATED APPLICATIONS

The present application claims the benefit of 35 U.S.C. § 119(e) to U.S. Provisional Patent Application No. 62/915,075 filed on Oct. 15, 2019, the entire contents of which are hereby incorporated by reference. The present application is also a continuation of U.S. patent application Ser. No. 16/872,818 that was filed May 12, 2020, the entire contents of which is hereby incorporated by reference.

BACKGROUND

Objects that use an electrical signal, such as for power or for data transmission, may be associated with a shelving system. Electrical connection systems that provide the electrical signal to such objects should provide a safe and reliable electrical connection that is preferably easy to manufacture and to mount in the shelving system in a visually unobtrusive manner while maintaining a structural integrity that supports one or more items on a shelf support plate of a shelf of the shelving system.

SUMMARY

In an example embodiment, a shelf is provided that includes, but is not limited to, a shelf support plate, a first insulator, a first fastener, a second fastener and a shelf brace. The shelf support plate is formed at least partially of a first electrically conductive material. The shelf support plate includes, but is not limited to, a first aperture wall formed through the shelf support plate. The first insulator is formed at least partially of a first electrically insulating material. The first insulator includes, but is not limited to a second aperture wall and a third aperture wall. The first fastener includes, but is not limited to, a first shaft and a first head. The first fastener is formed at least partially of a second electrically conductive material. The second fastener includes, but is not limited to. a second shaft and a second head. The second fastener is formed at least partially of a third electrically conductive material. The shelf brace is formed at least partially of a fourth electrically conductive material. The shelf brace includes, but is not limited to, a brace plate, a shelf hook that extends from the brace plate, and a fourth aperture wall. The shelf hook is configured to connect to an electrical connector configured to provide an electrical current to the shelf brace. The fourth aperture wall is formed through the shelf brace. The first insulator is configured to mount between the shelf support plate and the shelf brace using the first shaft of the first fastener inserted into the first aperture wall and the second aperture wall and the second shaft of the second fastener inserted into the fourth aperture wall and the third aperture wall.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 3 depicts a front, right side view of a second shelf of the plurality of shelves of FIG. 1 in accordance with an illustrative embodiment.

FIG. 13 depicts a zoomed back, right side view of a right end cap assembly of the front trim assembly of FIG. 9 in accordance with an illustrative embodiment.

FIG. 14 depicts a zoomed top perspective view of electrical components of the light assembly of the front trim assembly of the first shelf of FIG. 2 in accordance with an illustrative embodiment.

FIG. 17 depicts a zoomed back perspective view of a left side of a left end cap assembly of the front trim assembly of FIG. 9 in accordance with an illustrative embodiment.

FIG. 18 depicts a zoomed top perspective view of the left side of the left end cap assembly of the front trim assembly of FIG. 9 in accordance with an illustrative embodiment.

FIG. 36 depicts a zoomed top perspective view of electrical components of the light assembly of the front trim assembly of the second shelf of FIG. 3 with the second electrical connector of FIG. 35 in accordance with an illustrative embodiment.

FIG. 37 depicts a front perspective view of the second electrical connector of FIG. 35 in accordance with an illustrative embodiment.

FIG. 46 depicts a left side view of a shelf support plate of the second shelf of FIG. 3 in accordance with an illustrative embodiment.

FIG. 47 depicts a left, bottom view of the shelf support plate of FIG. 46 in accordance with an illustrative embodiment.

DETAILED DESCRIPTION

The described system provides electrical connectivity through a shelf brace of a shelf. One or more wired or wireless connectors may be associated with each shelf. For example, a first connector may provide a ground potential, a second connector may provide an alternating current/voltage or a direct current/voltage, and/or a third connector may provide a digital or analog data signal though a fewer or a greater number of connectors may be associated with each shelf. Power provided to the connector may be modulated, for example, using pulse width modulation to vary the amount of power, for example, to dim a light. Various voltage levels may be provided such as 12 volts (V), 24 V, etc.

Figure 1:
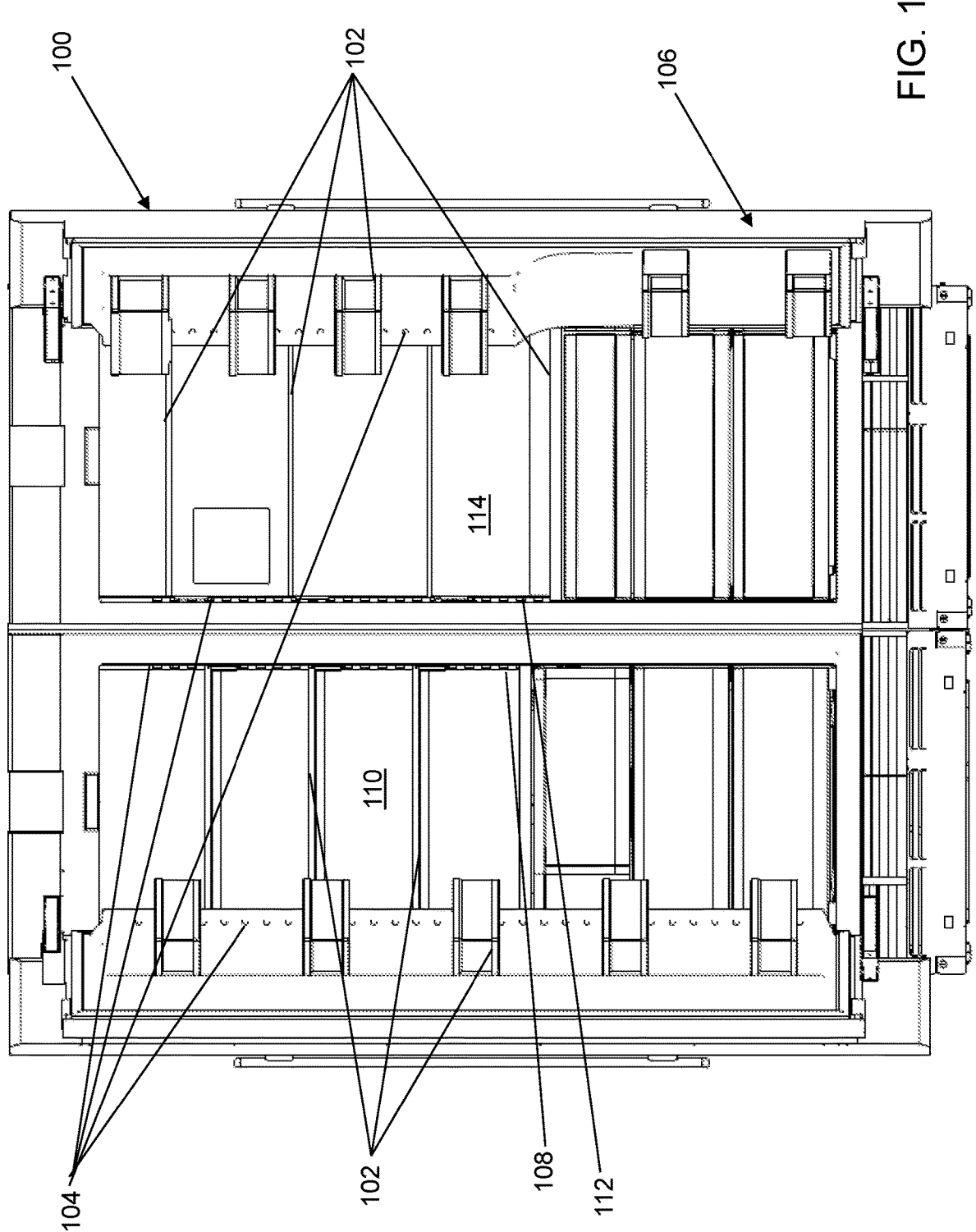
FIG. 1 depicts a device in which a plurality of shelves is mounted in accordance with an illustrative embodiment.

Referring to FIG. 1, an illustrative device is shown in which a plurality of shelves 102 is mounted. FIG. 1 shows a front view of refrigerator 100 with open doors to show a portion of two interior spaces that include the plurality of shelves 102. The plurality of shelves 102 are mounted to a plurality of ladders 104 not all of which are visible. The plurality of ladders 104 may be mounted to one or more walls that define each interior space including a door 106 that may enclose the interior space. One or more ladders of the plurality of ladders 104 may be used to mount each shelf of the plurality of shelves 102 within the interior space(s). For example, a first left ladder (not shown) and a first right ladder 108a may be mounted to a first back wall 110 to extend vertically near a left edge and near a right edge of first back wall 110, respectively. A second left ladder 112 and a second right ladder (not shown) may be mounted to a second back wall 114 to extend vertically near a left edge and near a right edge of second back wall 114, respectively.

A ladder may be mounted in other locations and to other walls that define the interior space(s). For example, in an alternative embodiment, the ladder may extend horizontally or in another direction such as a diagonal direction relative to the one or more walls. As another example, the ladder may be mounted at a center of the back wall or to a side wall. As yet another example, the ladder(s) may be mounted to door 106. A drawer or other storage space may further be mounted to the shelf. The shelf may be included in a heated or a cooled space or in a space at an ambient temperature. The cooled space, for example, may be a refrigerated space or a freezer space. One or more of the plurality of shelves 102 may extend a portion of a width and/or a depth of the interior space or an entire width and/or an entire depth of the interior space. One or more of the plurality of shelves 102 further may extend a portion of a width of door 106 or an entire width of door 106.

Figure 2:
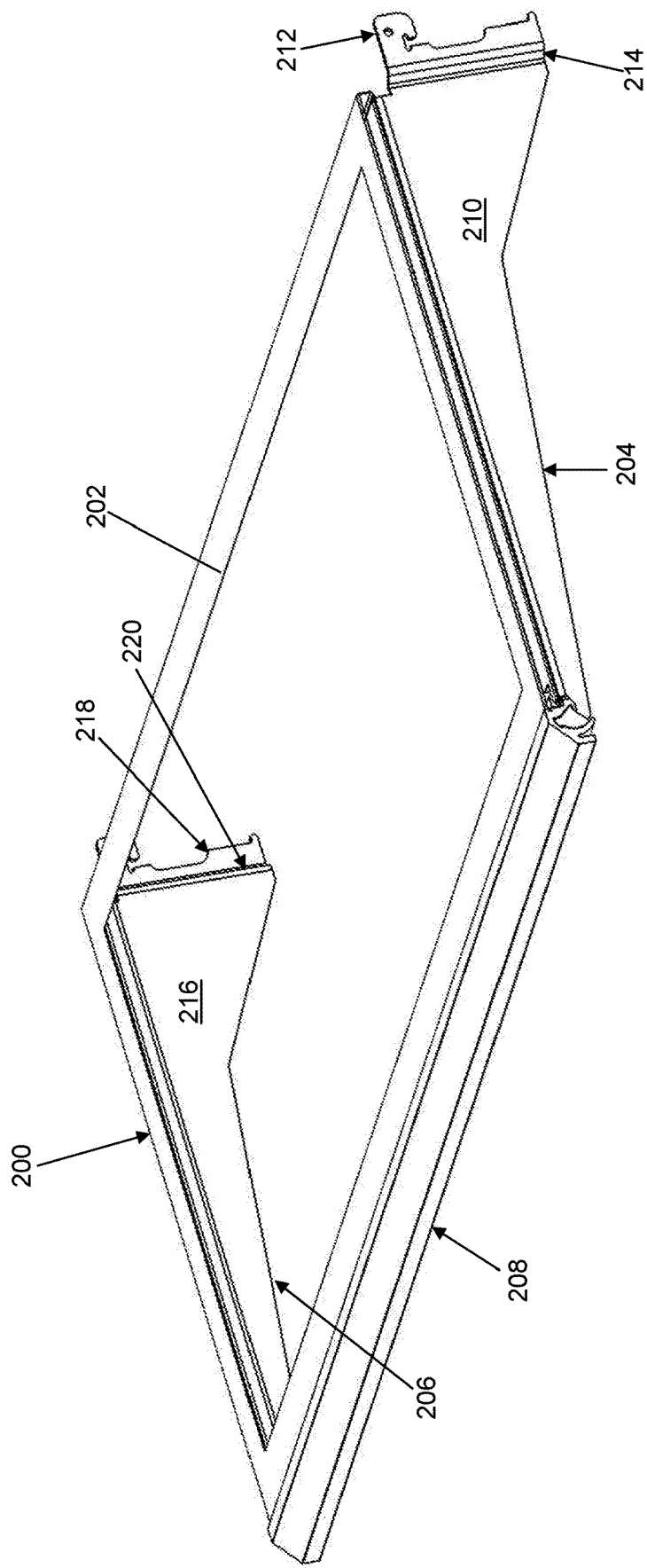
FIG. 2 depicts a front, right side view of a first shelf of the plurality of shelves of FIG. 1 in accordance with an illustrative embodiment.

Referring to FIG. 2, a front right side view of a first shelf 200 of the plurality of shelves 102 is shown in accordance with an illustrative embodiment. First shelf 200 may include a first shelf support plate 202, a first right brace 204, a first left brace 206, and a first front trim assembly 208. First front trim assembly 208 is mounted to a front edge of first shelf support plate 202.

Figure 5:
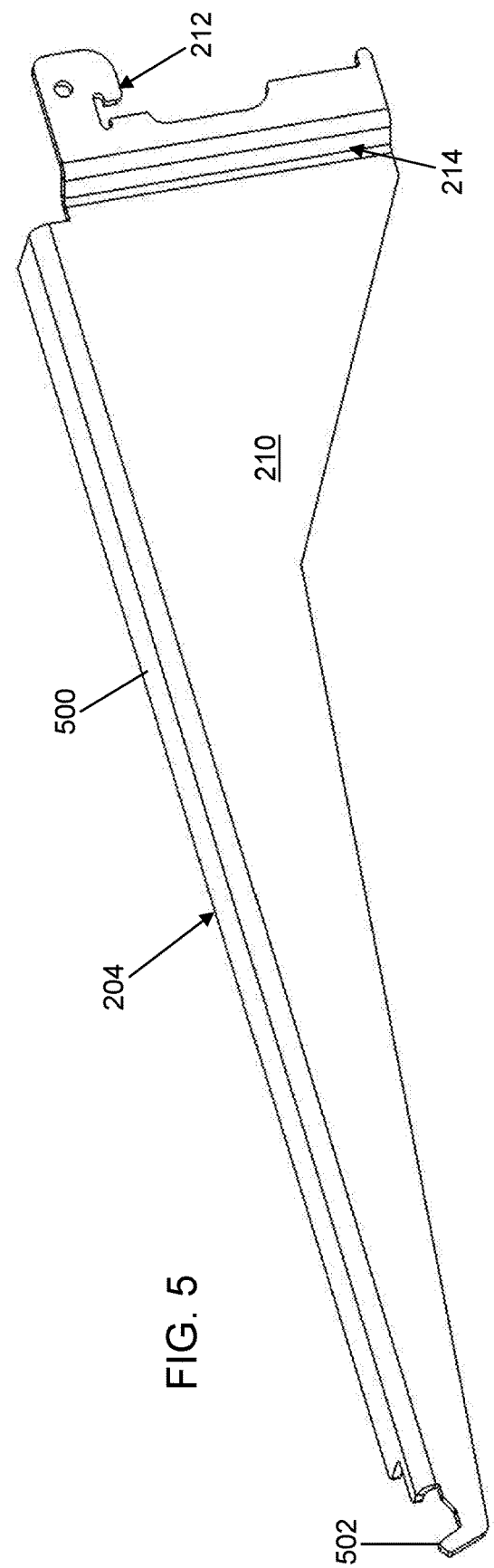
FIG. 5 depicts a right side view of a right brace of the first shelf of FIG. 2 in accordance with an illustrative embodiment.

Referring to FIG. 5, a right side view of first right brace 204 is shown in accordance with an illustrative embodiment. First right brace 204 may include a first right brace plate 210, a first right brace arm 500, a first right brace hook 212, a first right transition wall 214, and a right shelf electrical connector 502. First left brace 206 may include a first left brace plate 216, a first left brace arm (not shown), a first left brace hook 218, a first left transition wall 220, and a left shelf electrical connector 802 (shown referring to FIG. 8).

A greater or a fewer number of braces may be used in alternative embodiments. For example, an additional brace may be included to support a larger first shelf support plate 202. As another example, a single center brace may be used with a different support system such as a molded platform on either side of first shelf support plate 202. As another example, a single brace adjacent a left or a right side of first shelf 200 may be used with a different support system such as a molded platform on the other side of first shelf support plate 202. Items can be placed on first shelf support plate 202. The components of first shelf 200 may be formed of one or more materials, such as metal, glass, and/or plastic having a sufficient strength and rigidity to provide the illustrated and/or described function. For example, first shelf support plate 202, a drawer, or other receptacle may be formed of one or more materials, such as metal, glass, and/or plastic having a sufficient strength and rigidity to support food items or other items stored in refrigerator 100. In an illustrative embodiment, first right brace 204 and first left brace 206 are formed of an electrically conductive materials such as a metal including steel, stainless steel, aluminum, etc. In an illustrative embodiment, first right brace 204 and first left brace 206 may be partially coated with an electrically insulating material.

In the illustrative embodiment, first shelf support plate 202 is mounted to first right brace 204 and first left brace 206. First shelf support plate 202 may form a variety of shapes including a polygon, a circle, etc. with various sizes. In an illustrative embodiment, first shelf support plate 202 is attached to first right brace 204 and to first left brace 206, for example, using an adhesive though in alternative embodiments other mounting mechanisms may be used or first shelf support plate 202 may not be attached to first right brace 204 and first left brace 206. A drawer or other receptacle may be mounted to extend upward or downward from first shelf support plate 202 using various methods known in the art.

First right brace plate 210 may have various shapes and dimensions. For example, a height of first right brace plate 210 may narrow towards a front of first shelf 200 so that less material is used and so that first right brace plate 210 is less visible to a consumer though the height, a width, and the material are selected to be strong enough to support a weight of items placed on first shelf support plate 202. In the illustrative embodiment, first right brace arm 500 forms a generally flat, horizontal surface when first shelf support plate 202 is mounted to first right brace 204 and is configured to support first shelf support plate 202. In the illustrative embodiment, first right brace arm 500 extends in a generally perpendicular direction from a top edge of first right brace plate 210. The generally perpendicular direction may indicate that a transition between two objects may be curved though the two objects are otherwise perpendicular to each other.

In the illustrative embodiment, right shelf electrical connector 502 extends up from first right brace plate 210 at an end of first right brace plate 210 opposite first right brace hook 212. In alternative embodiments, right shelf electrical connector 502 extends down from first right brace plate 210 or outward from first right brace plate 210 at the end of first right brace plate 210 opposite first right brace hook 212. Right shelf electrical connector 502 may have various sizes and shapes configured to mate with a portion of first front trim assembly 208 described further below. Right shelf electrical connector 502 may have a polygonal cross-sectional shape relative to a plane parallel to an exterior surface of first right brace plate 210. For example, right shelf electrical connector 502 may have a triangular or rectangular cross-sectional shape. Right shelf electrical connector 502 and first right brace plate 210 may be formed of a single continuous piece of electrically conductive material or formed of separate components mounted to each other, for example, by welding.

In the illustrative embodiment, first right brace 204 may include first right transition wall 214 formed between first right brace hook 212 and first right brace plate 210 to assist in alignment of first right brace 204 with the ladder to which first shelf 200 is mounted on a right side. Similarly, first left brace 206 may include first left transition wall 220 formed between first left brace hook 218 and first left brace plate 216 to assist in alignment of first left brace 206 with the ladder to which first shelf 200 is mounted on a left side. First right brace plate 210, first right transition wall 214, and first right brace hook 212 may be formed of a single continuous piece of electrically conductive material or formed of separate components mounted to each other, for example, by welding. Similarly, first left brace plate 216, first left transition wall 220, and first left brace hook 218 may be formed of a single continuous piece of electrically conductive material or formed of separate components mounted to each other, for example, by welding.

In an alternative embodiment, first right brace 204 and first left brace 206 may not include first right transition wall 214 or first left transition wall 220, respectively. Instead, first right brace plate 210 and first right brace hook 212 and/or first left brace plate 210 and first left brace hook 218 may be formed of a continuous planar wall. First right brace plate 210 and first left brace plate 210 may or may not extend an entire length of first shelf support plate 202.

First left brace 206 may be similar to first right brace 204. For example, first left brace 206 may form a mirror image of first right brace 204 relative to a vertical plane through a center of a space between first right brace 204 and first left brace 206.

Referring to FIG. 3, a front right side view of a second shelf 300 of the plurality of shelves 102 is shown in accordance with an illustrative embodiment. Similar to first shelf 200, second shelf 300 may include a second shelf support plate 302, a second right brace 304, a second left brace 306, and a second front trim assembly 308. Second front trim assembly 308 is mounted to a front edge of second shelf support plate 302.

Figure 6:
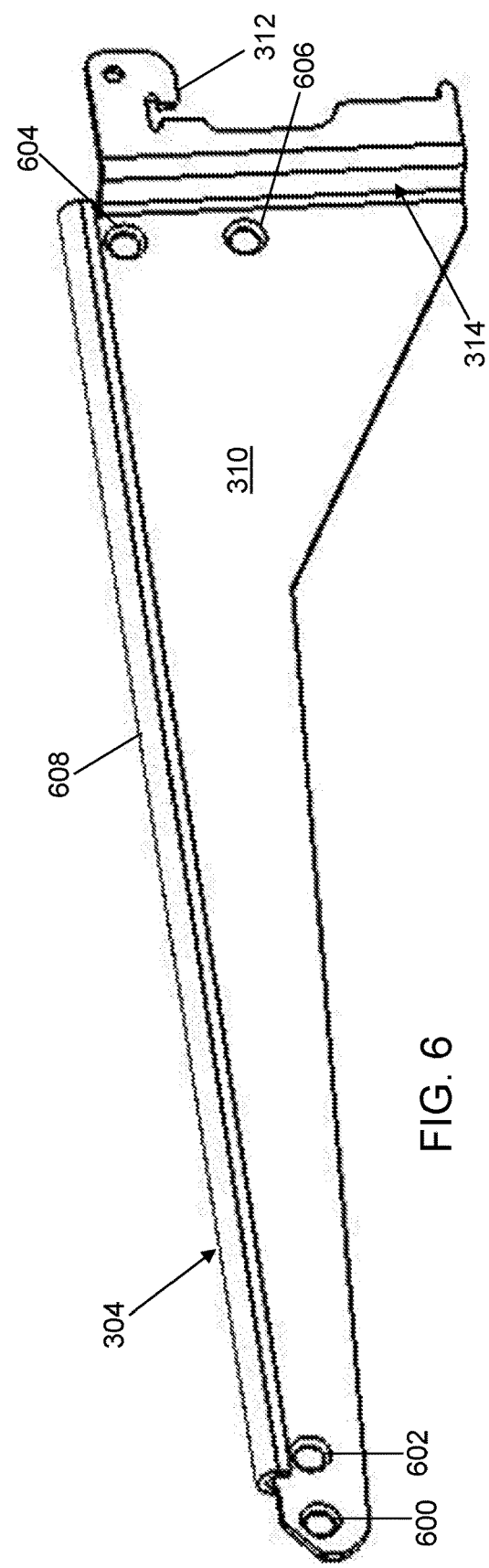
FIG. 6 depicts a right side view of a right brace of the second shelf of FIG. 3 in accordance with an illustrative embodiment.

Referring to FIG. 6, a right side view of second right brace 304 is shown in accordance with an illustrative embodiment. Second right brace 304 may include a second right brace plate 310, a second right brace hook 312, a second right transition wall 314, a first right front aperture wall 600, a second right front aperture wall 602, a right top aperture wall 604, a right bottom aperture wall 606, and a second right brace arm 608. Second left brace 306 may include a second left brace plate 316, a second left brace hook 318, a second left transition wall 320, a first left front aperture wall 4508 (shown referring to FIG. 45B), a second left front aperture wall 4509 (shown referring to FIG. 45B), a left top aperture wall 4510 (shown referring to FIG. 45B), a left bottom aperture wall 4512 (shown referring to FIG. 45B), and a second left brace arm 4514 (shown referring to FIG. 45B). Second right brace 304 and second left brace 306 may include a fewer or a greater number of aperture walls.

Similar to first shelf 200, a greater or a fewer number of braces may be used in alternative embodiments. The components of second shelf 300 may be formed of one or more materials, such as metal, glass, and/or plastic having a sufficient strength and rigidity to provide the illustrated and/or described function. For example, second shelf support plate 302, a drawer, or other receptacle may be formed of one or more materials, such as metal, glass, and/or plastic having a sufficient strength and rigidity to support food items or other items stored in refrigerator 100. In an illustrative embodiment, second right brace 304 and second left brace 306 are formed of an electrically conductive materials such as a metal including steel, stainless steel, aluminum, etc. In an illustrative embodiment, second right brace 304 and second left brace 306 may be partially coated with an electrically insulating material.

Second shelf support plate 302 is mounted to second right brace 304 and second left brace 306. Second shelf support plate 302 may form a variety of shapes including a polygon, a circle, etc. of various sizes. In an illustrative embodiment, second shelf support plate 302 is attached to second right brace 304 and to second left brace 306, for example, using an adhesive though in alternative embodiments other mounting mechanisms may be used or second shelf support plate 302 may not be attached to second right brace 304 and second left brace 306. A drawer or other receptacle may be mounted to extend upward or downward from second shelf support plate 302.

Second left brace 306 may be similar to second right brace 304. Second left brace 306 may form a mirror image of second right brace 304 relative to a vertical plane through a center of a space between second right brace 304 and first left brace 306. Second right brace 304 and second left brace 306 may be similar to first right brace 204 and first left brace 206, respectively. In the illustrative embodiments, first right brace plate 210, first right brace hook 212, and first right transition wall 214 are identical to second right brace plate 310, second right brace hook 312, and second right transition wall 314, and first left brace plate 216, first left brace hook 218, and first left transition wall 220 are identical to second left brace plate 316, second left brace hook 318, and second left transition wall 320 except that second right brace plate 310 and second left brace plate 316 include the apertures, and first right brace plate 210 and first left brace plate 216 include right shelf electrical connector 502 and left shelf electrical connector 802, respectively. Second right brace arm 608 and second left brace arm 4514 of second right brace 304 and second left brace 306, respectively, are further curved instead of flat as are first right brace arm 500 and the first left brace arm because second shelf support plate 302 includes a plurality of wires 4600 (shown referring to FIG. 46) instead of first shelf support plate 202, which is a flat glass plate in the illustrative embodiment.

Second right brace plate 310 may have various shapes and dimensions. For example, a height of second right brace plate 310 may narrow towards a front of second shelf 300 so that less material is used and so that second right brace plate 310 is less visible to a consumer though the height, a width, and the material are selected to be strong enough to support a weight of items placed on second shelf support plate 302.

In the illustrative embodiment, second right brace 304 may include second right transition wall 314 formed between second right brace hook 312 and second right brace plate 310 to assist in alignment of second right brace 304 with the ladder to which second shelf 300 is mounted on a right side. Similarly, second left brace 306 may include second left transition wall 320 formed between second left brace hook 318 and second left brace plate 316 to assist in alignment of second left brace 306 with the ladder to which second shelf 300 is mounted on a left side. Second right brace plate 310, second right transition wall 314, and second right brace hook 312 may be formed of a single continuous piece of electrically conductive material or formed of separate components mounted to each other, for example, by welding. Similarly, second left brace plate 316, second left transition wall 320, and second left brace hook 318 may be formed of a single continuous piece of electrically conductive material or formed of separate components mounted to each other, for example, by welding.

In an alternative embodiment, second right brace 304 and second left brace 306 may not include second right transition wall 314 or second left transition wall 320, respectively. Instead, second right brace plate 310 and second right brace hook 312 and/or second left brace plate 310 and second left brace hook 318 may be formed of a continuous planar wall. Second right brace plate 310 and second left brace plate 310 may or may not extend an entire length of second shelf support plate 302.

In the illustrative embodiment, first right front aperture wall 600, second right front aperture wall 600, right top aperture wall 602, and right bottom aperture wall 606 form apertures through second right brace plate 310. As discussed further below, a fastener such as a screw, a rivet, a bolt, a nail, etc. is inserted into each of first right front aperture wall 600, second right front aperture wall 600, right top aperture wall 602, and right bottom aperture wall 606 to mount second right brace plate 310 to second shelf support plate 302. Similarly, first left front aperture wall 4508, second left front aperture wall 4509, left top aperture wall 4510, and left bottom aperture wall 4512 form apertures through second left brace plate 316. A fastener is inserted into each of first left front aperture wall 4508, second left front aperture wall 4509, left top aperture wall 4510, and left bottom aperture wall 4512 to mount second left brace plate 316 to second shelf support plate 302

Figure 4B:
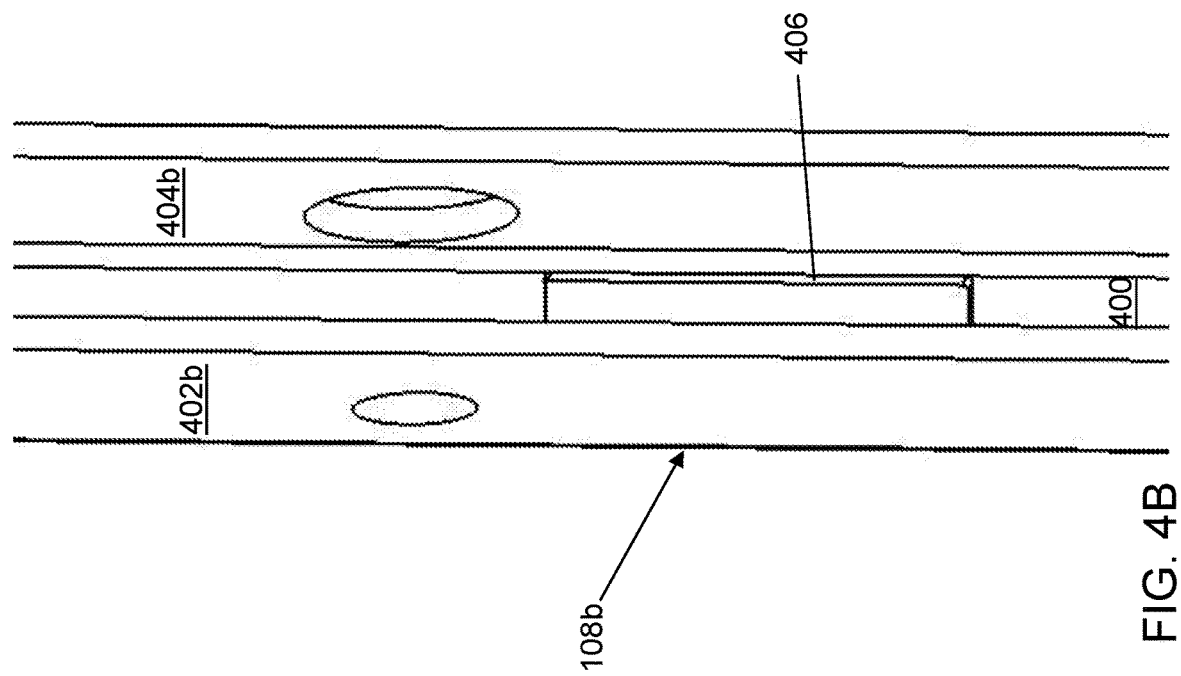
FIG. 4B depicts a zoomed back perspective view of a second ladder in accordance with an illustrative embodiment.
Figure 4A:
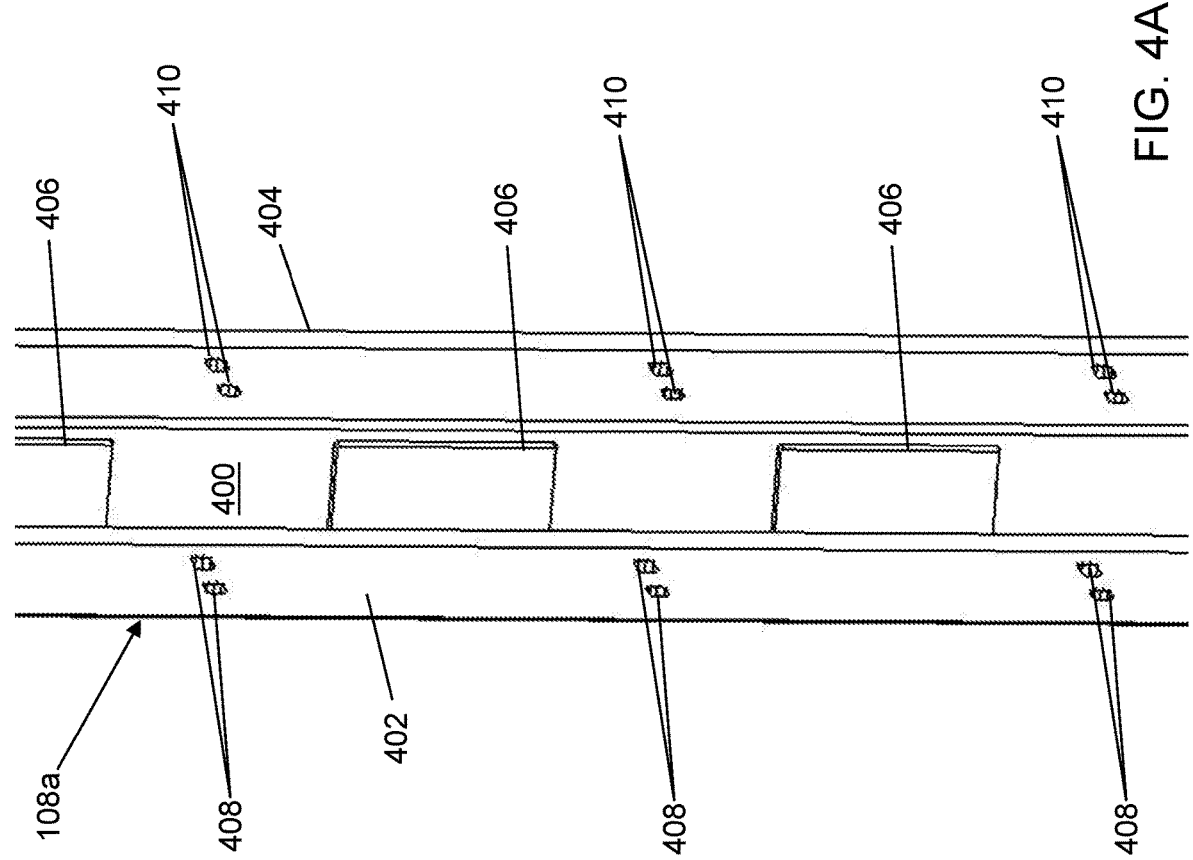
FIG. 4A depicts a zoomed back perspective view of a first ladder in accordance with an illustrative embodiment.

Referring to FIG. 4A, a zoomed back perspective view of first right ladder 108a is shown in accordance with an illustrative embodiment. Each ladder of the plurality of ladders 104 may be similar. First right ladder 108a may include a front wall 400, a right side wall 402, and a left side wall 404 mounted to each other to form a u-shaped brace. Front wall 400 includes a plurality of shelf bracket aperture walls 406 that define spaced apart apertures formed through front wall 400 at regular intervals to provide a plurality of mounting locations for first shelf 200 and/or second shelf 300 of the plurality of shelves 102. Right side wall 402 includes a plurality of pairs of right ladder connector aperture walls 408 that define spaced apart apertures formed through right side wall 402 at regular intervals to provide a plurality of mounting locations for a ladder connector (not shown), for example, as described in U.S. Patent Publication Number 2019/0211627. Left side wall 404 includes a plurality of pairs of left ladder connector aperture walls 410 that define spaced apart apertures formed through left side wall 404 at regular intervals to provide the plurality of mounting locations for the ladder connector. For example, a pair of right ladder connector aperture walls 408 align horizontally at a common vertical height with a pair of left ladder connector aperture walls 410 so that the ladder connector is supported on both sides.

Using various openings formed in first right ladder 108a and in the first left ladder, a position of first shelf 200 and/or second shelf 300 can be adjusted within the interior space or on door 106 or first shelf 200 and/or second shelf 300 can be removed from the interior space or from door 106.

First right ladder 108a may be formed of one or more materials, such as metal, glass, and/or plastic having a sufficient strength and rigidity to provide the illustrated and/or described function of supporting one or more of the plurality of shelves 102. First right ladder 108a may be formed of a single continuous piece of material. In an illustrative embodiment, first right ladder 108a is formed of stainless steel or aluminum.

A number of shelf bracket aperture walls 406 spaced in the vertical direction may be selected to define a number of optional mounting locations for first shelf 200 and/or second shelf 300. In the illustrative embodiment, a distance between a lower edge of a first shelf bracket aperture wall and an upper edge of a second shelf bracket aperture wall is defined based on a geometry of first right brace hook 212, first left brace hook 218, second right brace hook 312, and second left brace hook 318. In the illustrative embodiment, the shelf bracket aperture walls 406 are generally rectangular in shape and sized to allow insertion therein of a head portion of each hook 212, 218, 312, 318 with or without the ladder connector.

Referring to FIG. 4B, a zoomed back perspective view of second right ladder 108b is shown in accordance with an illustrative embodiment. Second right ladder 108b may include front wall 400, a second right side wall 402b, and a second left side wall 404b mounted to each other to form the u-shaped brace. Second right side wall 402b does not include the plurality of pairs of right ladder connector aperture walls 408. Second left side wall 404b does not include the plurality of pairs of left ladder connector aperture walls 410. Nevertheless, a position of first shelf 200 and/or second shelf 300 can be adjusted within the interior space or on door 106 using the shelf bracket aperture walls 406.

Second right ladder 108b may be formed of one or more materials, such as metal, glass, and/or plastic having a sufficient strength and rigidity to provide the illustrated and/or described function of supporting one or more of the plurality of shelves 102. Second right ladder 108b may be formed of a single continuous piece of material. In an illustrative embodiment, second right ladder 108b is formed of stainless steel or aluminum.

First right ladder 108a and/or second right ladder 108b may be connected by wire or wirelessly to a controller of a device to which the shelf is mounted such as a refrigerator 100 (shown referring to FIG. 1). A ladder connector further may be connected by wire or wirelessly to a controller of a device to which the shelf is mounted such as a refrigerator 100 (shown referring to FIG. 1). The ladder connector may be mounted between first right ladder 108a and/or second right ladder 108b and first right brace 204, first left brace 206, second right brace 304, and/or second left brace 306.

First right brace hook 212, first left brace hook 218, second right brace hook 312, and second left brace hook 318 extend towards a back of the interior space(s) and are configured to each mount to a ladder of the plurality of ladders 104 that may be similar to first right ladder 108a or second right ladder 108b. First right brace hook 212, first left brace hook 218, second right brace hook 312, and second left brace hook 318 may provide an electrical connection through first right brace plate 210, first left brace plate 216, second right brace plate 310, and second left brace plate 316. For example, first right brace plate 210 may be formed of an electrically conductive material that has been coated with a non-conductive or insulating material except where an electrical connection is desired. For example, a portion of first right brace hook 212 may not be coated with the non-conductive material where contact is made with the ladder or the ladder connector.

Figure 7:
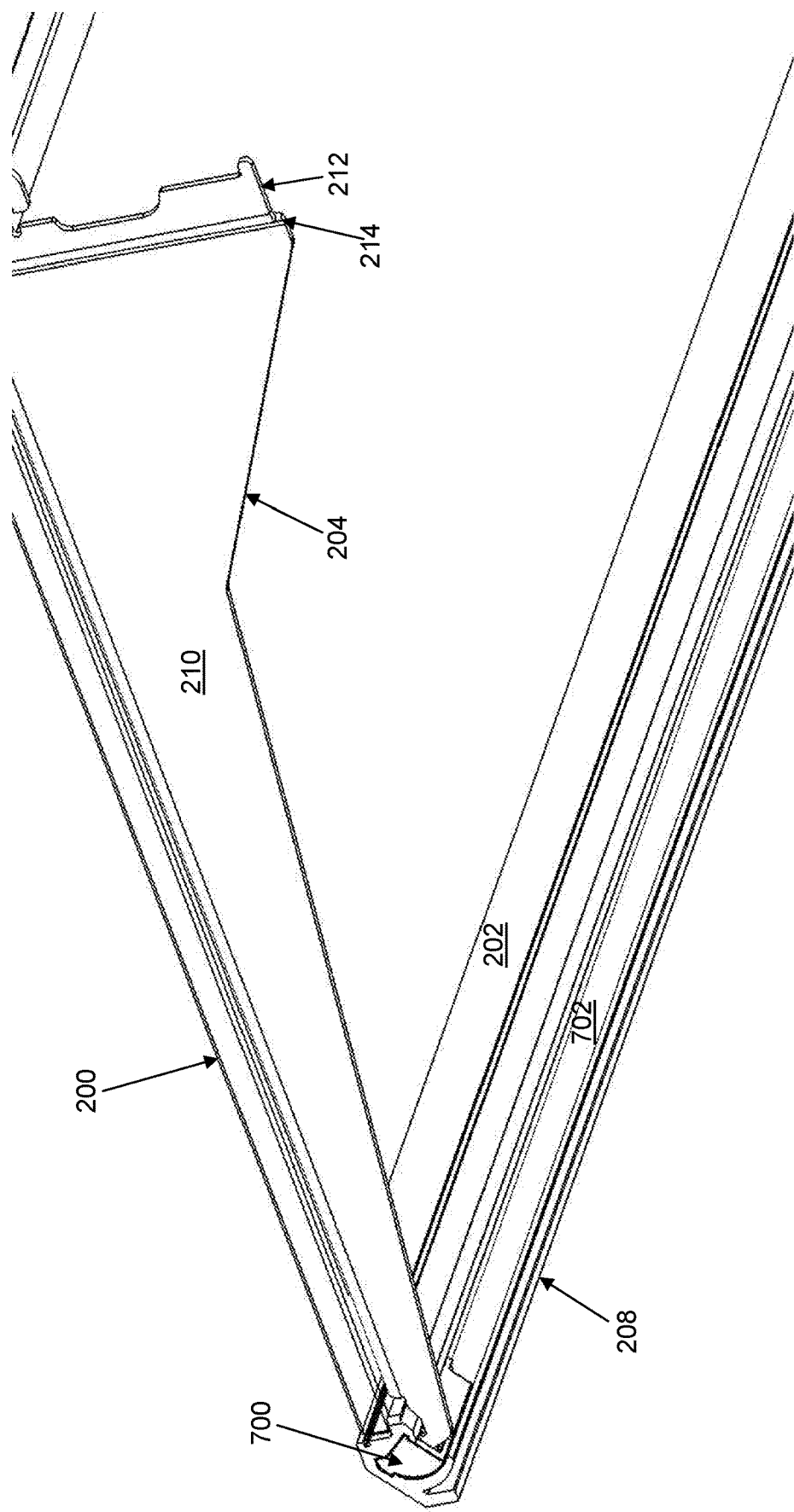
FIG. 7 depicts a back, right, bottom side view of a front trim assembly of the first shelf of FIG. 2 in accordance with an illustrative embodiment.
Figure 8:
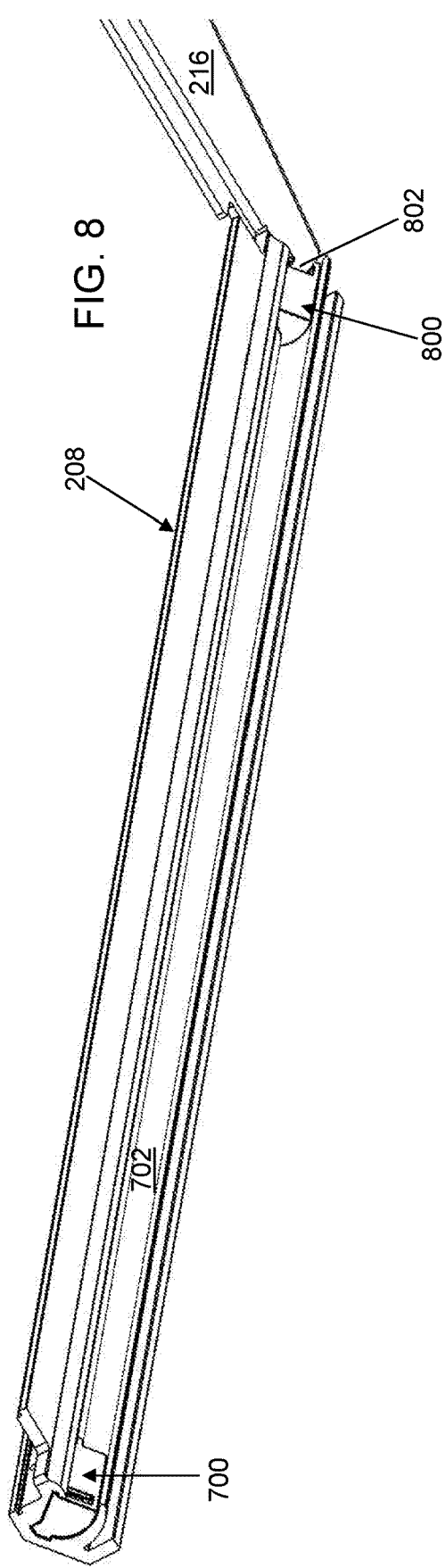
FIG. 8 depicts a zoomed back, right, bottom side view of the front trim assembly of the first shelf of FIG. 2 in accordance with an illustrative embodiment.
Figure 9:
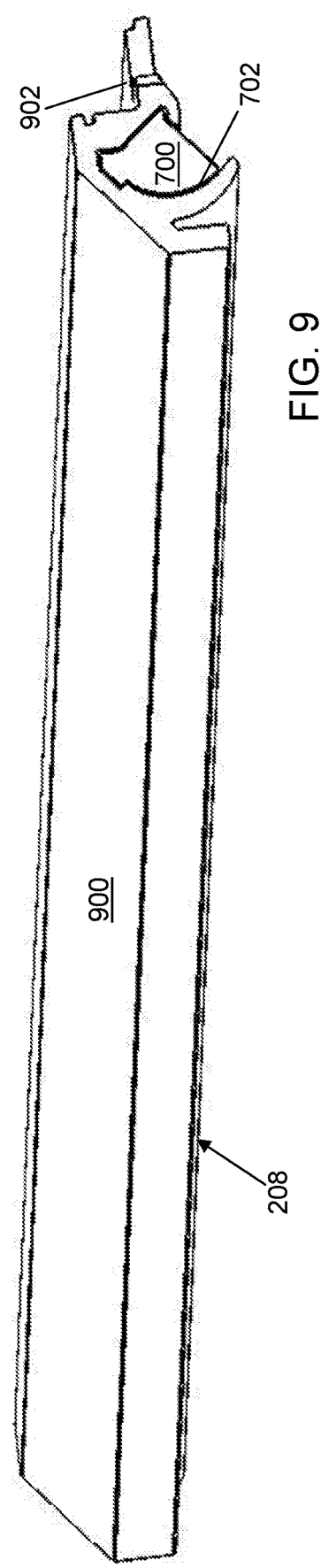
FIG. 9 depicts a front right side view of the front trim assembly of the first shelf of FIG. 2 in accordance with an illustrative embodiment.
Figure 10:
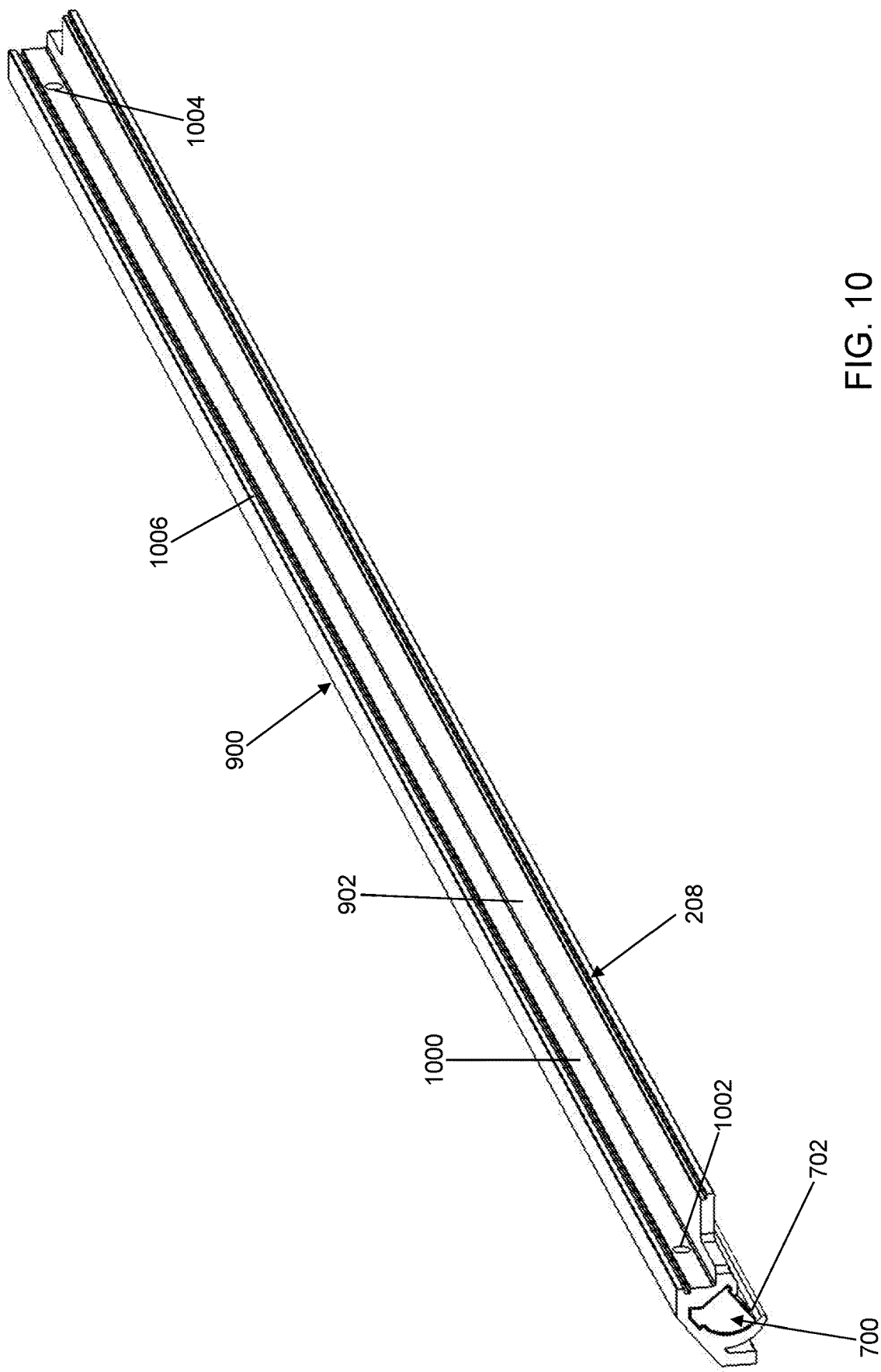
FIG. 10 depicts a back, right side view of the front trim assembly of FIG. 9 in accordance with an illustrative embodiment.
Figure 11:
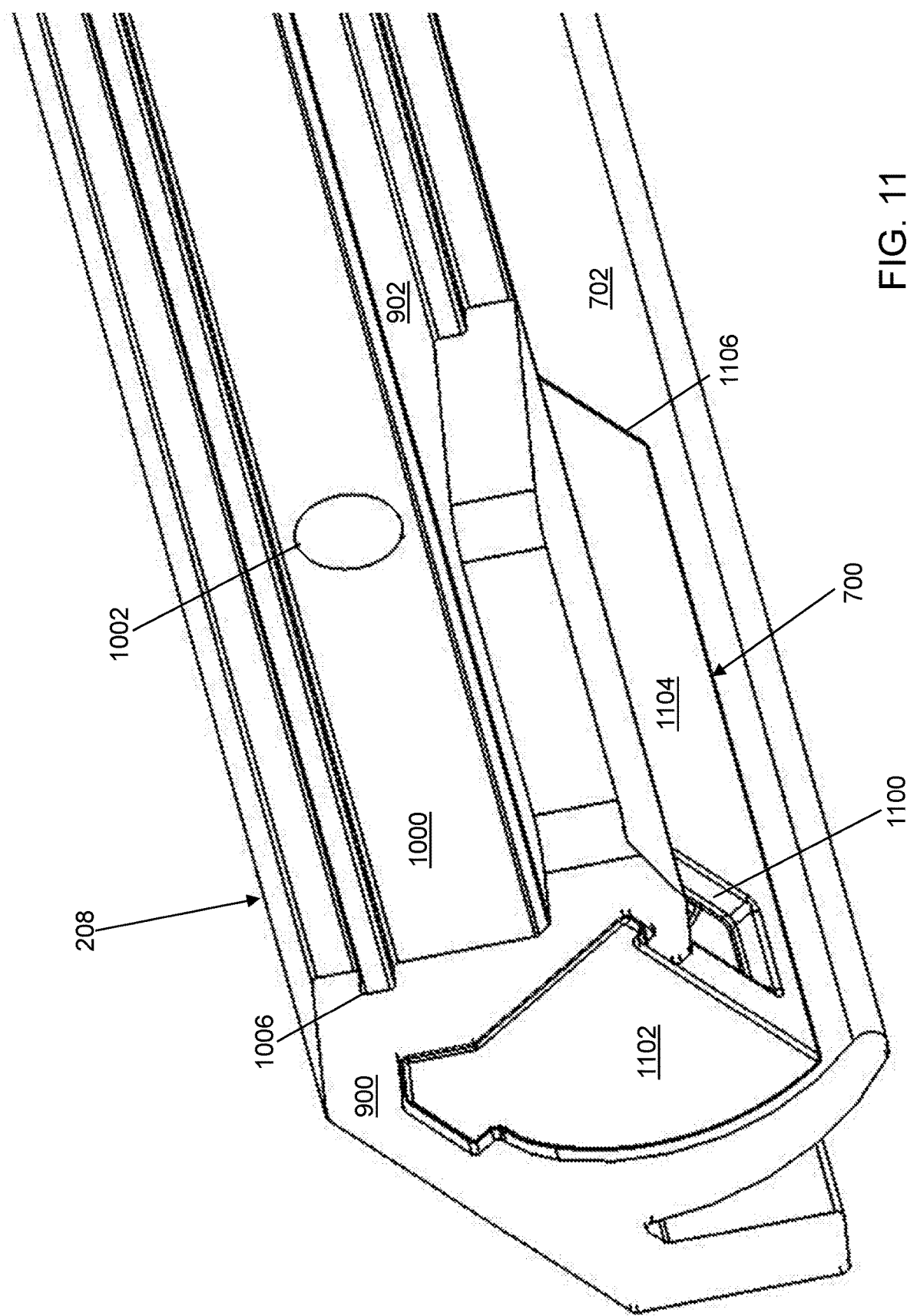
FIG. 11 depicts a zoomed back, right side view of the front trim assembly of FIG. 9 in accordance with an illustrative embodiment.
Figure 12A:
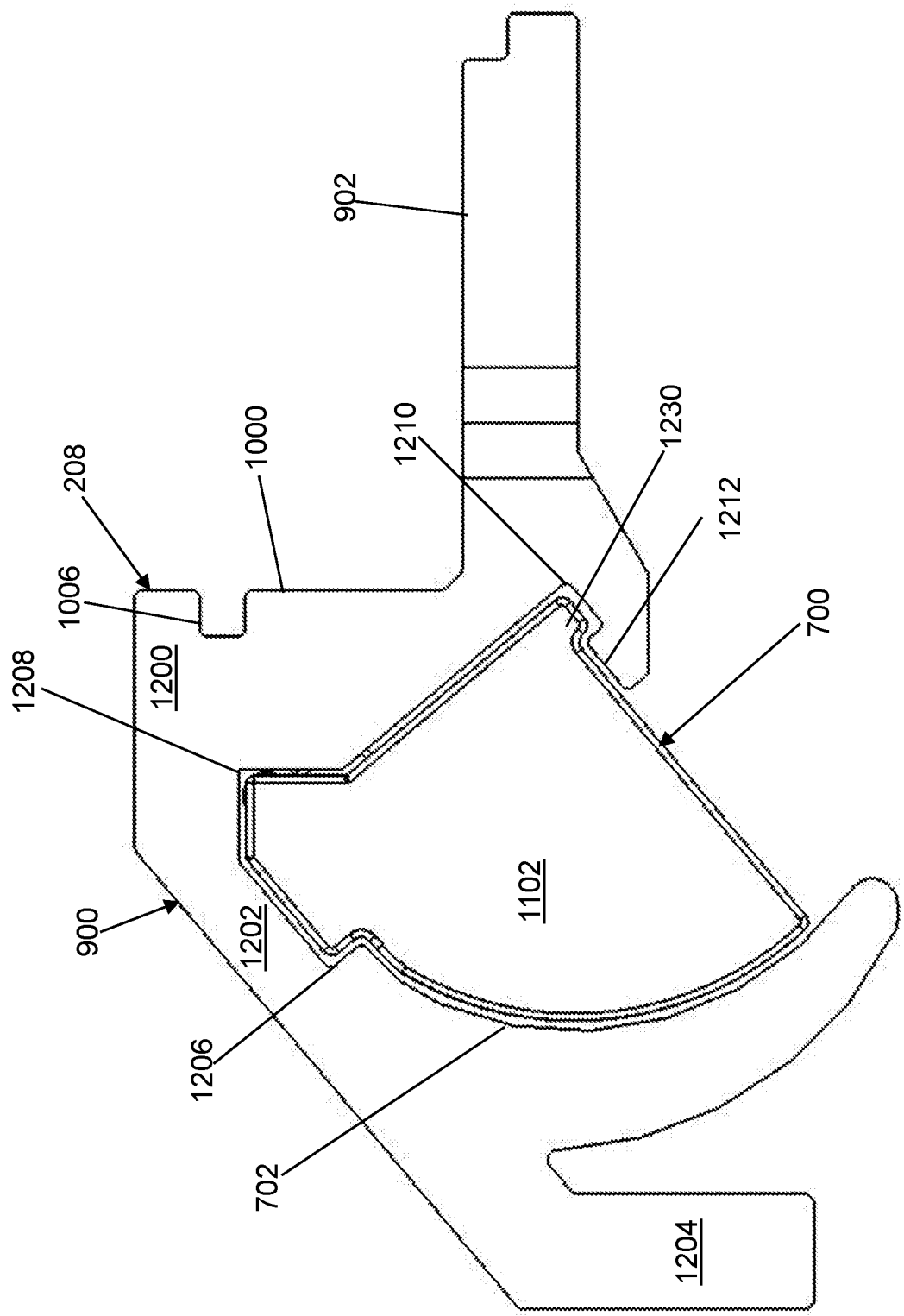
FIG. 12A depicts a right side view of the front trim assembly of FIG. 9 in accordance with an illustrative embodiment.
Figure 12B:
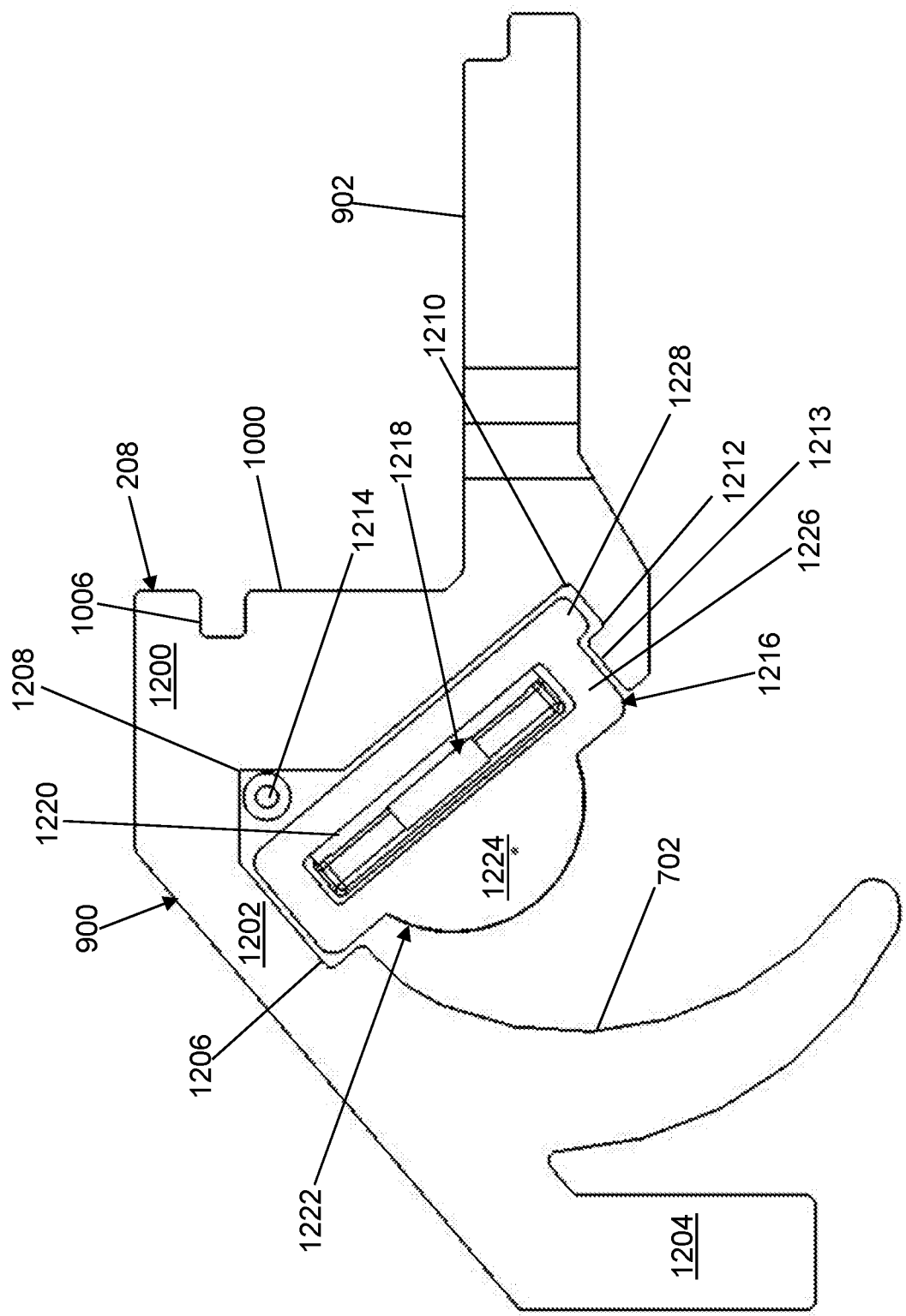
FIG. 12B depicts a right side view of a light assembly of the front trim assembly of the first shelf of FIG. 2 in accordance with an illustrative embodiment.

Referring to FIG. 7, a back right side view of first front trim assembly 208 is shown in accordance with an illustrative embodiment. Referring to FIG. 8, a zoomed back right side view of first front trim assembly 208 is shown in accordance with an illustrative embodiment. Referring to FIG. 9, a front right side view of first front trim assembly 208 is shown in accordance with an illustrative embodiment. Referring to FIG. 10, a back right side view of first front trim assembly 208 is shown in accordance with an illustrative embodiment. Referring to FIG. 11, a zoomed back right side view of first front trim assembly 208 is shown in accordance with an illustrative embodiment. Referring to FIG. 12A, a right side view of first front trim assembly 208 is shown in accordance with an illustrative embodiment. Referring to FIG. 12B, a right side view of first front trim assembly 208 is shown with a right end cap assembly 700 and a left end cap assembly 800 removed in accordance with an illustrative embodiment. First front trim assembly 208 may include right end cap assembly 700, left end cap assembly 800, a reflective wall 702, a light assembly 1216, and a front trim 900.

Front trim 900 may include a top wall 1200, a planed wall 1202, a front wall 1204, a trim back wall 1000, a trim shelf support wall 902, a first L-shaped notch 1206, a second L-shaped notch 1208, a third L-shaped notch 1210, and a support shelf 1212. Top wall 1200 may be horizontal when mounted in the interior space. Planed wall 1202 extends downwards from top wall 1200 towards a front of the interior space. Front wall 1204 extends vertically downward from planed wall 1202.

Trim back wall 1000 extends vertically downward from top wall 1200 opposite planed wall 1202. Trim shelf support wall 902 extends horizontally from trim back wall 1000 towards a back of the interior space. In an illustrative embodiment, a front edge of first shelf support plate 202 is supported on trim shelf support wall 902 adjacent trim back wall 1000.

First L-shaped notch 1206 is formed on a back surface of planed wall 1202. First L-shaped notch 1206 forms a right angle with an edge that is perpendicular to planed wall 1202 and an edge that is parallel to planed wall 1202. Second L-shaped notch 1208 extends from the edge of first L-shaped notch 1206 that is parallel to planed wall 1202. Second L-shaped notch 1208 is formed on a bottom surface of top wall 1200 and a back surface of trim back wall 1000. Second L-shaped notch 1208 forms a right angle with an edge that is parallel to top wall 1200 and an edge that is parallel to trim back wall 1000. Third L-shaped notch 1210 extends from the edge of second L-shaped notch 1208 that is parallel to trim back wall 1000. Third L-shaped notch 1210 is formed on a back surface of trim back wall 1000 and of trim shelf support wall 902. Third L-shaped notch 1210 forms a right angle with an edge that is perpendicular to planed wall 1202 and an edge that is parallel to planed wall 1202. Support shelf 1212 extends generally perpendicularly from the edge of third L-shaped notch 1210 that is parallel to planed wall 1202. Support shelf 1212 includes a surface that extends parallel to planed wall 1202 in a direction away from the edge of third L-shaped notch 1210 that is perpendicular to planed wall 1202.

First L-shaped notch 1206, second L-shaped notch 1208, third L-shaped notch 1210, and support shelf 1212 define an aperture within which light assembly 1216 is mounted to front trim 900. A first right tab aperture wall 1002 and a first left tab aperture wall 1004 may be formed in trim back wall 1000 to hold right end cap assembly 700 and left end cap assembly 800 in position within first L-shaped notch 1206, second L-shaped notch 1208, third L-shaped notch 1210, and support shelf 1212. An adhesive notch 1006 may be formed in trim back wall 1000 as a conduit within which excess adhesive is captured when first shelf support plate 202 is mounted to front trim 900.

To simplify the description of front trim 900, top wall 1200, planed wall 1202, front wall 1204, trim back wall 1000, trim shelf support wall 902, first L-shaped notch 1206, second L-shaped notch 1208, third L-shaped notch 1210, and support shelf 1212 have been described as distinct elements though in an illustrative embodiment, front trim 900, top wall 1200, planed wall 1202, front wall 1204, trim back wall 1000, trim shelf support wall 902, first L-shaped notch 1206, second L-shaped notch 1208, third L-shaped notch 1210, and support shelf 1212 form a single structure. For example, the components of front trim 900 may be formed of metal or plastic through a molding process such as an extrusion process to define the shape described. Other shapes may be used in alternative embodiments.

Reflective wall 702 may extend from the edge of first L-shaped notch 1206 that is perpendicular to planed wall 1202 and from a back surface of planed wall 1202. Reflective wall 702 may form a concave reflective surface positioned, shaped, and formed of a material configured to reflect light from an array of lights 1218 included as part of light assembly 1216. Reflective wall 702 may be a distinct element mounted to front trim 900 or may be formed as part of front trim 900. First L-shaped notch 1206, third L-shaped notch 1210, support shelf 1212, and reflective wall 702 define an aperture within which right end cap assembly 700 and left end cap assembly 800 are mounted to front trim 900.

Right end cap assembly 700 and left end cap assembly 800 are positioned on opposite sides of light assembly 1216 to provide power to the array of lights 1218 from first right hook 210 through first right brace plate 210 to right shelf electrical connector 502 of first right brace 204 and from first left hook 212 through first right brace plate 210 to right shelf electrical connector 502 of first left brace 206, respectively. Right end cap assembly 700 and left end cap assembly 800 are sized and shaped to be inserted within the aperture formed by first L-shaped notch 1206, third L-shaped notch 1210, support shelf 1212, and reflective wall 702.

Light assembly 1216 may include the array of lights 1218, a light board 1220, and a light housing 1222. The array of lights 1218 include a plurality of lights arrange in a linear array that extends along at least a portion of the edge of third L-shaped notch 1210 that is perpendicular to planed wall 1202 and is opposite reflective wall 702 though other arrangements may be used in alternative embodiments. The plurality of lights may be a plurality of light emitting diodes though other types of lights may be used in alternative embodiments. A single light further may be used in alternative embodiments instead of the array of lights 1218.

Figure 16:
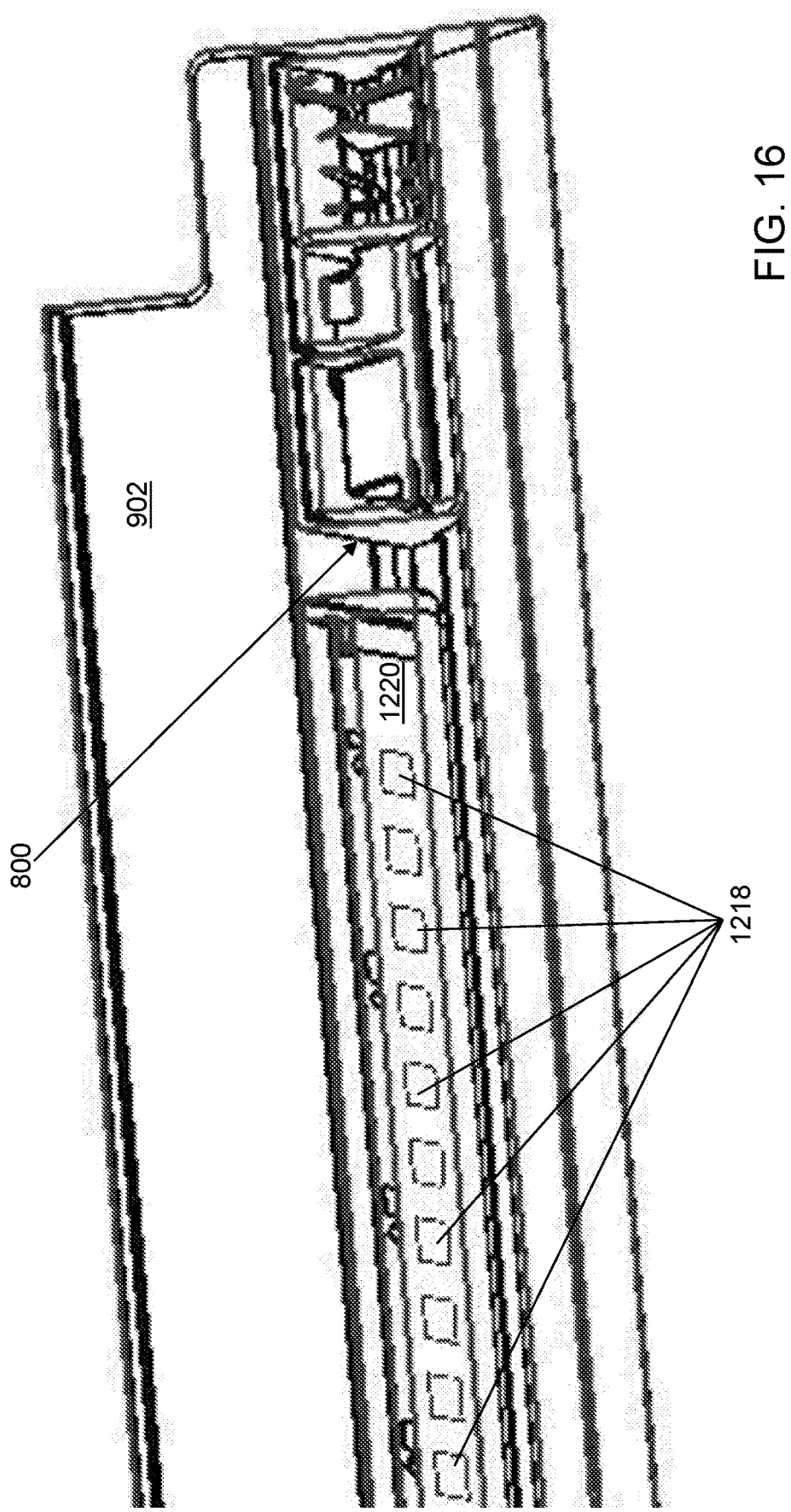
FIG. 16 depicts a cross sectional, bottom, left perspective view of the light assembly of the front trim assembly of the first shelf of FIG. 2 in accordance with an illustrative embodiment.

The array of lights 1218 are mounted to light board 1220 that provides the electrical connection to each light as well as a mounting surface for the array of lights 1218, for example, as shown in FIG. 16. Light board 1220 is mounted within light housing 1222.

Light housing 1222 may include a dome shaped cover 1224, a body 1226, an arm 1228, and an end cap 1724 (shown referring to FIG. 17). Arm 1228 protrudes from body 1226 and is shaped and sized to be inserted within the aperture formed by third L-shaped notch 1210 and support shelf 1212. Body 1226 is generally rectangular in shape and sized to be inserted within the aperture formed by first L-shaped notch 1206, third L-shaped notch 1210, and support shelf 1212. Dome shaped cover 1224 includes a convex wall that extends between the edge of first L-shaped notch 1206 that is perpendicular to planed wall 1202 and support shelf 1212 and is opposite an edge of body 1226 that extends parallel to the edge of third L-shaped notch that is perpendicular to planed wall 1202. Body 1226 may be open to allow light from the array of lights 1218 to be emitted through dome shaped cover 1224 towards reflective wall 702. End cap 1724 covers an end of light housing 1222 positioned opposite an exterior edge 1322 of light housing 1222. Right end cap assembly 700 is mounted adjacent exterior edge 1322 of light housing 1222 to allow electrical connection to light board 1220. In an illustrative embodiment, right end cap assembly 700 is sonic welded to exterior edge 1322 of light housing 1222.

Referring to FIG. 13, a zoomed back right side view of right end cap assembly 700 is shown in accordance with an illustrative embodiment. Right end cap assembly 700 may include a first right end cap housing 1300a and electrical components that power the array of lights 1218. The electrical components that power the array of lights 1218 are housed in first right end cap housing 1300a.

Figure 19:
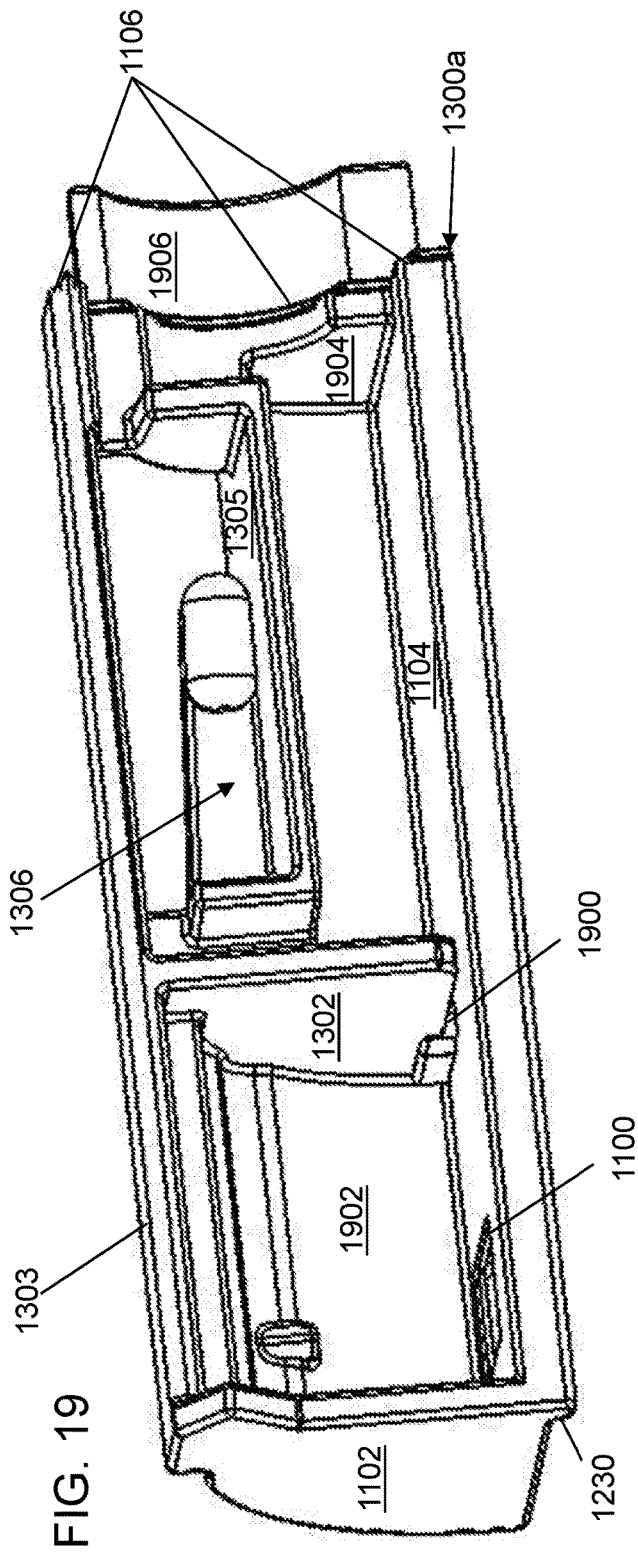
FIG. 19 depicts a back perspective view of a right end cap housing of the right end cap assembly of the front trim assembly of FIG. 9 in accordance with an illustrative embodiment.

Referring to FIG. 19, a back perspective view of first right end cap housing 1300a is shown in accordance with an illustrative embodiment. First right end cap housing 1300a may include a first right connector aperture wall 1100, an exterior side wall 1102, a back, bottom wall 1104, a right end cap interior wall 1302, a right end cap top wall 1303, a trim wall 1902, an interior side wall 1904, an extension wall 1906, a right tab housing 1305, a right mounting tab 1306, and a right notch wall 1900. Exterior side wall 1102, back, bottom wall 1104, right end cap top wall 1303, trim wall 1902, and interior side wall 1904 form a housing that is open opposite trim wall 1902. When first right end cap housing 1300a is mounted to front trim 900, first right end cap housing 1300a is open adjacent the edge of third L-shaped notch 1210 that is perpendicular to planed wall 1202. Trim wall 1902 follows reflective wall 702. Back, bottom wall 1104 extends across an opening of front trim 900 between reflective wall 702 and support shelf 121. Right end cap top wall 1303 extends parallel to and adjacent the edge of first L-shaped notch 1206 that is parallel to planed wall 1202 when first right end cap housing 1300a is mounted to front trim 900. Similar to arm 1228 that protrudes from body 1226, a housing arm 1230 is shaped and sized to be inserted within the aperture formed by third L-shaped notch 1210 and support shelf 1212.

Extension wall 1906 extends from an exterior surface 1106 of interior side wall 1904 in a direction opposite right end cap interior wall 1302. Extension wall 1906 has a concave shape configured to accommodate dome shaped cover 1224 of light housing 1222. Exterior surface 1106 of interior side wall 1904 has a shape selected for at least partial abutment with exterior edge 1322 of light housing 1222.

First right connector aperture wall 1100 forms an aperture through back, bottom wall 1104. Right end cap interior wall 1302 divides an interior of first right end cap housing 1300a into two sections. Right notch wall 1900 supports right end cap interior wall 1302 on back, bottom wall 1104, but does not extend a full length of right end cap interior wall 1302 so that a gap is formed between a portion of right end cap interior wall 1302 and back, bottom wall 1104.

Right tab housing 1305 is mounted between right end cap interior wall 1302 and interior side wall 1904. Right mounting tab 1306 may include a right tab arm 1308 and a right tab head 1310. Right tab arm 1308 extends from an edge of right tab housing 1305 adjacent right end cap interior wall 1302 though right tab arm 1308 could extend from any other wall of right tab housing 1305 or of first right end cap housing 1300a. Right tab head 1310 is formed at an end of right tab arm 1308 opposite the edge of right tab housing 1305 adjacent right end cap interior wall 1302. Right mounting tab 1306 extends away from right tab housing 1305 towards the edge of third L-shaped notch 1210 that is perpendicular to planed wall 1202 when first right end cap housing 1300a is mounted to front trim 900. Right tab head 1310 generally has a bulb shape that extends beyond right tab arm 1308 towards the edge of third L-shaped notch 1210 that is perpendicular to planed wall 1202 when first right end cap housing 1300a is mounted to front trim 900.

To mount first right end cap housing 1300a to front trim 900, right end cap housing 1300a is slid within the aperture formed by first L-shaped notch 1206, third L-shaped notch 1210, support shelf 1212, and reflective wall 702 until right tab head 1310 "clicks into" first right tab aperture wall 1002 to hold first right end cap housing 1300a in a proper position relative to front trim 900. First right end cap housing 1300a may further be mounted to front trim 900, for example, with screws, rivets, glue, etc. In alternative embodiments, first right end cap housing 1300a may be mounted to front trim 900 in other manners than those shown.

Referring to FIG. 17, a zoomed back perspective view of a left end cap housing 1700a is shown in accordance with an illustrative embodiment. Referring to FIG. 18, a zoomed top perspective view of left end cap housing 1700a is shown in accordance with an illustrative embodiment. Left end cap housing 1700a may have a similar size and shape relative to first right end cap housing 1300a though left end cap housing 1700a may be a mirror image of first right end cap housing 1300a. Left end cap housing 1700a may include a left end cap interior wall 1702, a left end cap top wall 1703, a first left connector aperture wall 1704, a left tab housing 1705, a left mounting tab 1706, a bottom wall 1710, an exterior side wall 1712, an interior side wall 1714, a trim wall 1716, a tab housing support wall 1726, and a left notch wall (not shown). Similar to right mounting tab 1306, left mounting tab 1706 may include a left tab arm 1718 and a left tab head 1720. In the illustrative embodiment, left end cap housing 1700a is a mirror image of first right end cap housing 1300a except that interior side wall 1714 has a shape that is the same as exterior side wall 1712, and left end cap housing 1700a includes tab housing support wall 1726 that extends up from bottom wall 1710 to a lower surface of left tab housing 1705 to support left tab housing 1705. An exterior surface 1728 of interior side wall 1714 faces end cap 1724 of light housing 1222.

Figure 15:
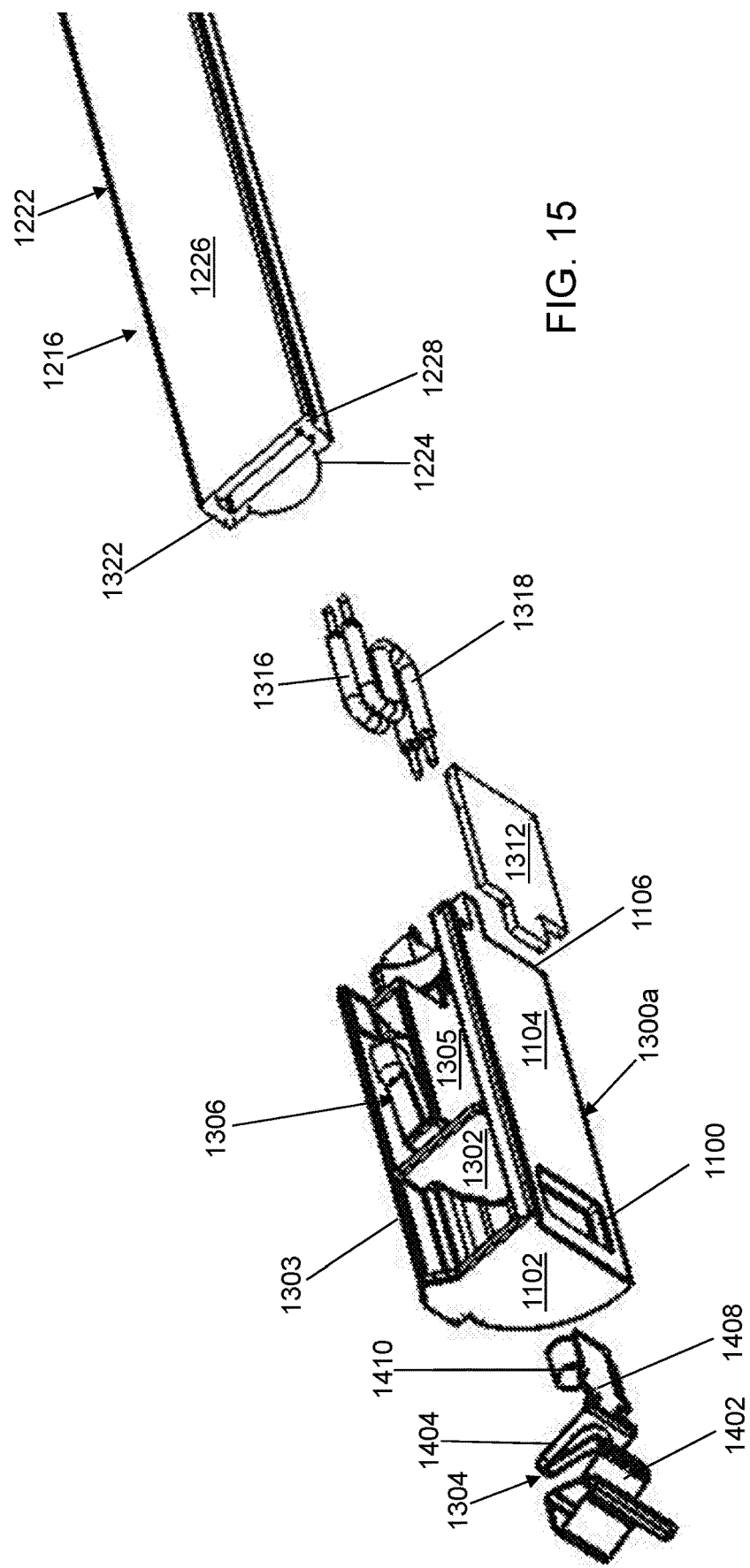
FIG. 15 depicts an exploded bottom perspective view of the light assembly of FIG. 14 in accordance with an illustrative embodiment.

Referring to FIG. 14, a zoomed top perspective view of the electrical components of light assembly 1216 are shown in accordance with an illustrative embodiment. Referring to FIG. 15, an exploded bottom perspective view of the electrical components of light assembly 1216 are shown in accordance with an illustrative embodiment. The electrical components that power the array of lights 1218 may include a first electrical connector 1304 housed in first right end cap housing 1300, a rectifier board 1312, a rectifier 1314, a first wire 1316, a second wire 1318, a connecting wire 1214, and a left electrical connector 1304a housed in first left end cap housing 1700a.

Figure 20:
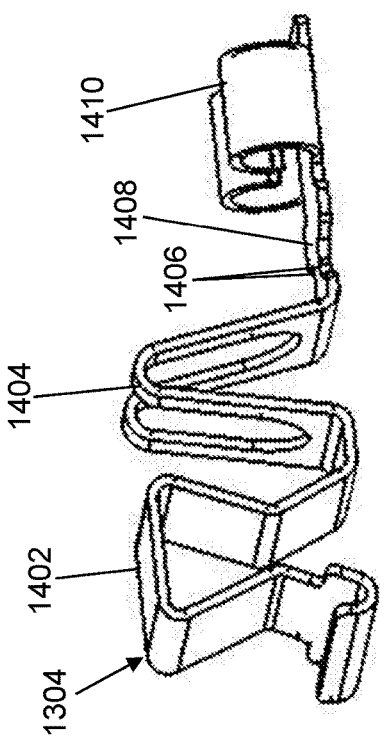
FIG. 20 depicts a back perspective view of an electrical connector of the right end cap assembly of the front trim assembly of FIG. 9 in accordance with an illustrative embodiment.

Referring to FIG. 20, a back perspective view of first electrical connector 1304 is shown in accordance with an illustrative embodiment. In the illustrative embodiment, first electrical connector 1304 is identical to left electrical connector 1304a though left electrical connector 1304a is rotated 180 degrees relative to first electrical connector 1304 when both are mounted to front trim 900. First electrical connector 1304 may include a first flex connector 1402, a spring 1404, connector notches 1406, a connector plate 1408, and a prong connector 1410. First flex connector 1402 has a narrowed prong shape that extends vertically above the opening formed by first right connector aperture wall 1100 in back, bottom wall 1104 and by first left connector aperture wall 1704 in bottom wall 1710. Spring 1404 extends between first flex connector 1402 and connector plate 1408. Spring 1404 forms a vertical triangular shape with an opening facing back, bottom wall 1104. Spring 1404 is sized and shaped to allow first electrical connector 1304 to compress to fit within a first space between exterior side wall 1102 and right end cap interior wall 1302 of first right end cap housing 1300*a*, and/or to allow left electrical connector 1304*a* to compress to fit within a first space between exterior side wall 1712 and right end cap interior wall 1702 of first left end cap housing 1700*a*. Connector notches 1406 are formed in connector plate 1408 as horizontal notches that can be inserted to generally abut right notch wall 1900 to properly align first electrical connector 1304 and/or left electrical connector 1304*a* within first right end cap housing 1300*a* and first left end cap housing 1700*a*, respectively. Prong connector 1410 includes a pair of prong shaped connectors that extend from an end of connector plate 1408 opposite spring 1404.

Figure 22A:
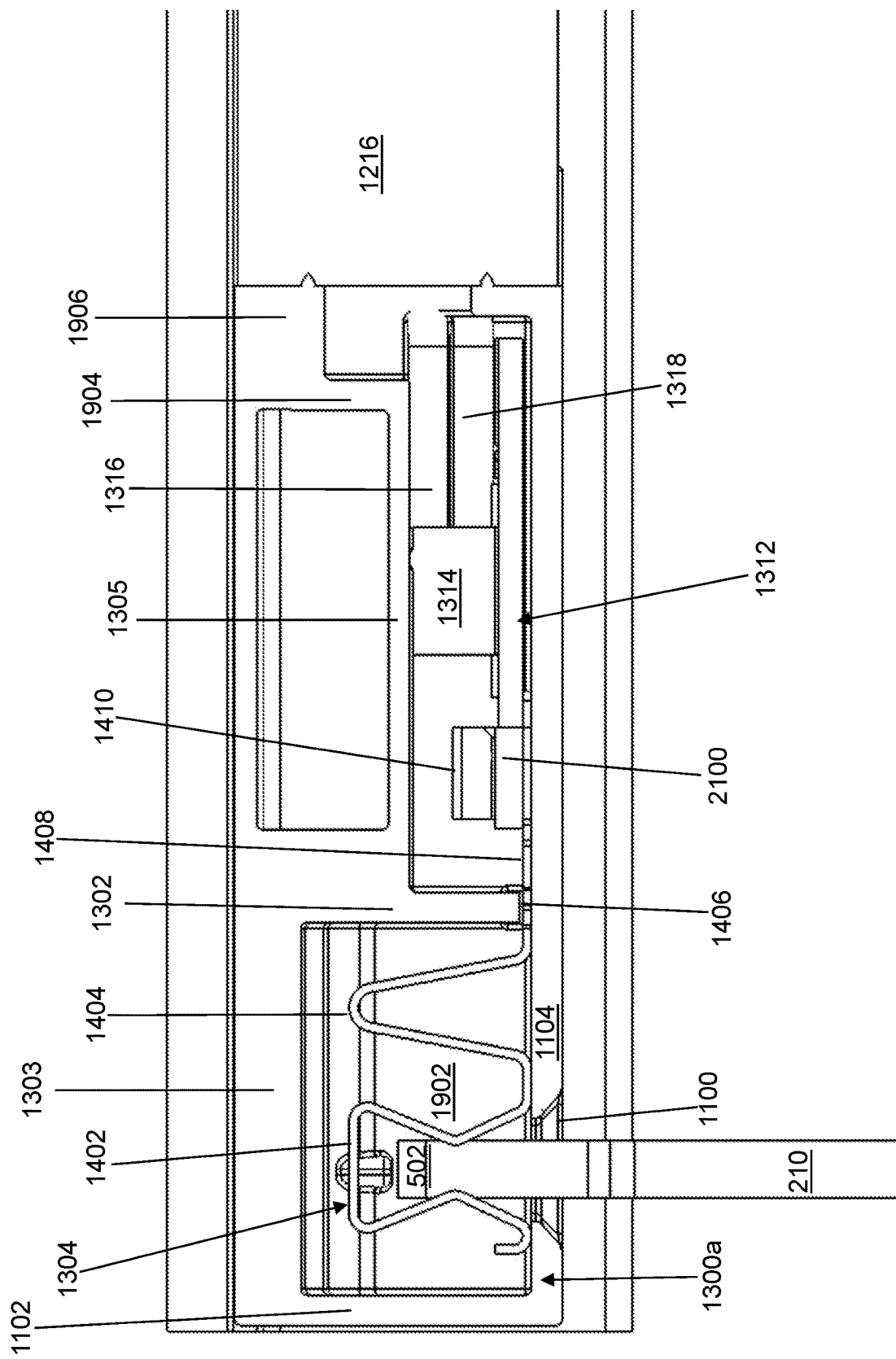
FIG. 22A depicts a back cross-sectional view of the right end cap assembly of FIG. 13 in accordance with an illustrative embodiment.
Figure 22B:
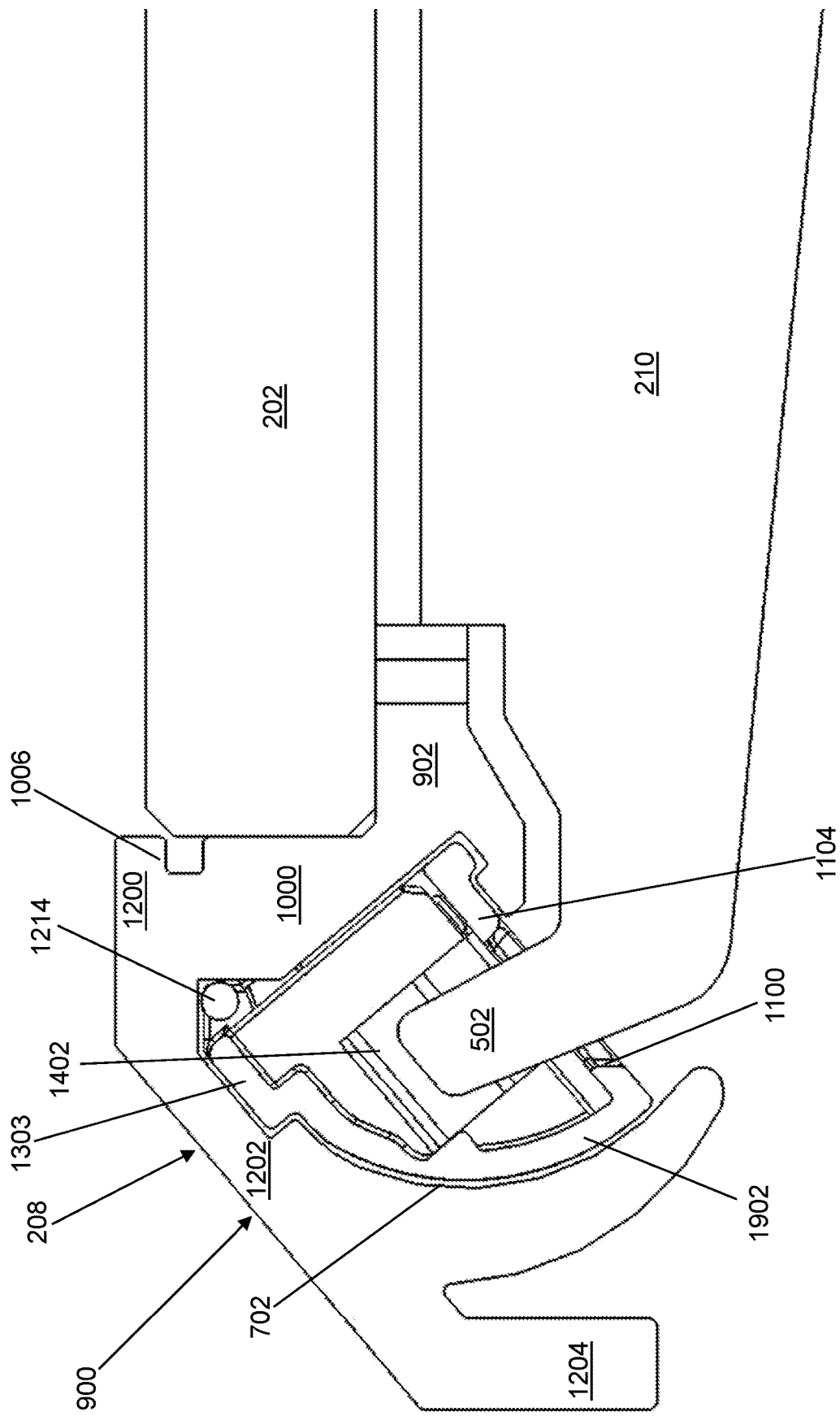
FIG. 22B depicts a right side, cross-sectional view of the right end cap assembly of FIG. 13 in accordance with an illustrative embodiment.

As shown referring to FIGS. 22A and 22B, the non-coated portion of right shelf electrical connector 502 of first right brace 204 makes electrical contact with first flex connector 1402 of first electrical connector 1304 by insertion through first right connector aperture wall 1100 and into the narrowed prong formed by first flex connector 1402. First flex connector 1402 is sized and formed of a material to deform to accept right shelf electrical connector 502 while maintaining a connection with right shelf electrical connector 502. The non-coated portion of right shelf electrical connector 502 of first left brace 206 makes electrical contact with first flex connector 1402 of left electrical connector 1304*a* by insertion through first left connector aperture wall 1704 and into the narrowed prong formed by first flex connector 1402. First electrical connector 1304 and left electrical connector 1304*a* are formed of electrically conductive material such as a metal; whereas, first right end cap housing 1300*a* and first left end cap housing 1700*a* are formed of electrically insulative material such as a plastic polymer.

Figure 21:
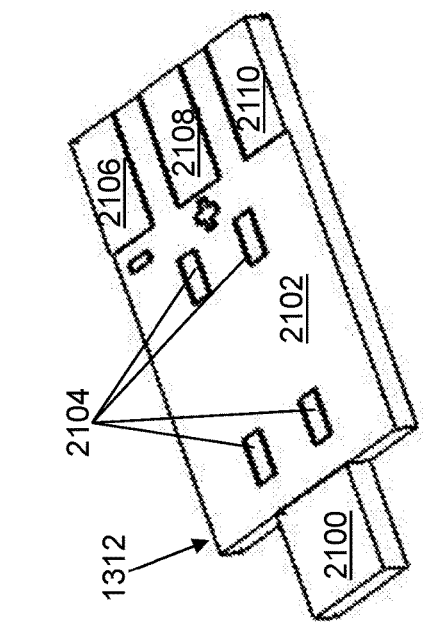
FIG. 21 depicts a back perspective view of a rectifier board of the right end cap assembly of the front trim assembly of FIG. 9 in accordance with an illustrative embodiment.

For illustration, rectifier 1314 may be implemented as a diode bridge that provides the same polarity of output to the array of lights 1218 for either polarity of input from right shelf electrical connector 502 of first right brace 204 or from right shelf electrical connector 502 of first left brace 206. Referring to FIG. 21, a back perspective view of rectifier board 1312 is shown in accordance with an illustrative embodiment. Rectifier board 1312 may include a power connector 2100, a connector plate 2102, rectifier connectors 2104, a negative connector 2106, a positive connector 2108, and an input connector 2110. Power connector 2100 extends from plate 2102 and connects to prong connector 1410 of first electrical connector 1304 by insertion within the prongs above connector plate 1408. Rectifier connectors 2104, negative connector 2106, positive connector 2108, and input connector 2110 are formed as electrical contacts on plate 2102.

Rectifier 1314 is electrically connected and mounted to rectifier board 1312 through rectifier connectors 2104. Rectifier 1314 may be a four-terminal component that includes four diodes connected in a bridge configuration and may be selected to provide an appropriate voltage/current rating based on the voltage/current received from right shelf electrical connector 502 of first right brace 204 or from right shelf electrical connector 502 of first left brace 206 and provided to the array of lights 1218. The voltage/current may be alternating current or direct current.

Connecting wire 1214 extends between right end cap assembly 700 and left end cap assembly 800 to provide power to the array of lights 1218. Connecting wire 1214 may be mounted to extend along second L-shaped notch 1208 of front trim 900. Though not shown, connecting wire 1214 connects first electrical connector 1304 to left electrical connector 1304*a* so that power can be provided to either or both of right shelf electrical connector 502 of first right brace 204 or of right shelf electrical connector 502 of first left brace 206 under control of rectifier 1314. For example, in the illustrative embodiment, a first end 1722 of connecting wire 1214 connects to prong connector 1410 of left electrical connector 1304*a*, and a second end 1320 of connecting wire 1214 connects to input connector 2110 of rectifier board 1312, for example, by soldering. Though not shown, negative connector 2106 may connect to first wire 1316 and positive connector 2108 may connect to second wire 1318, for example, by soldering. First wire 1316 and second wire 1318 are connected to light board 1220 to provide power to the array of lights 1218.

To assemble first front trim assembly 208, the respective electrical components may be mounted to first right end cap housing 1300*a* and to left end cap housing 1700*a*. The components of light assembly 1216 may further be mounted to each other. First right end cap housing 1300*a* and light assembly 1216 may be mounted to each other using various methods such as sonic welding, adhesive, fasteners, etc. with first wire 1316 and second wire 1318 connected to light board 1220 of light assembly 1216. Left end cap housing 1700*a* may further be connected to first right end cap housing 1300*a* and light assembly 1216 by connecting wire 1214. First right end cap housing 1300*a*, light assembly 1216, and left end cap housing 1700*a* may be slid within the aperture formed by first L-shaped notch 1206, third L-shaped notch 1210, support shelf 1212, and reflective wall 702 until right tab head 1310 "clicks into" first right tab aperture wall 1002 as described previously, and left tab head 1720 "clicks into" first left tab aperture wall 1004. Dome shaped cover 1224 fits within extension wall 1906 of first right end cap housing 1300*a*. In an alternative embodiment, first right end cap housing 1300*a* may be swapped with left end cap housing 1700*a*.

Due to heating and cooling variations, first right end cap housing 1300*a* and/or light housing 1222 may move along front trim 900 within the aperture formed by first L-shaped notch 1206, third L-shaped notch 1210, and support shelf 1212 toward or away from exterior surface 1728 of interior side wall 1714 of left end cap housing 1700*a* because exterior edge 1322 of light housing 1222 is fixed in place. The rate of expansion and contraction of various materials may be different. For example, the expansion of plastic is different from that of aluminum. To avoid stresses on the electrical components of first front trim assembly 208, left end cap housing 1700*a* is mounted to front trim 900 with an expansion gap 1708 selected to have a minimum length that absorbs assembly and manufacturing tolerances associated with the electrical contact between right shelf electrical connector 502 of first right brace 204 and first flex connector 1402 of first electrical connector 1304 and the electrical contact between right shelf electrical connector 502 of first left brace 206 and first flex connector 1402 of left electrical connector 1304*a*. For example, the tolerances may include a worst-case length tolerance of one or more of the components of first front trim assembly 208. Inclusion of expansion gap 1708 in the assembly process of first front trim assembly 208 removes or greatly reduces an influence of thermal expansion/contraction on the electrical components of first front trim assembly 208 thereby avoiding electrical failure or degradation and providing increased reliability of light assembly 1216. Compression/decompression of spring 1404 of first electrical connector 1304 and of spring 1404 of left electrical connector 1304a further reduces thermal expansion/contraction effects on the electrical components of first front trim assembly 208 when first shelf 200 is mounted on first right brace 204 and first left brace 206 to provide power to light assembly 216.

Figure 23:
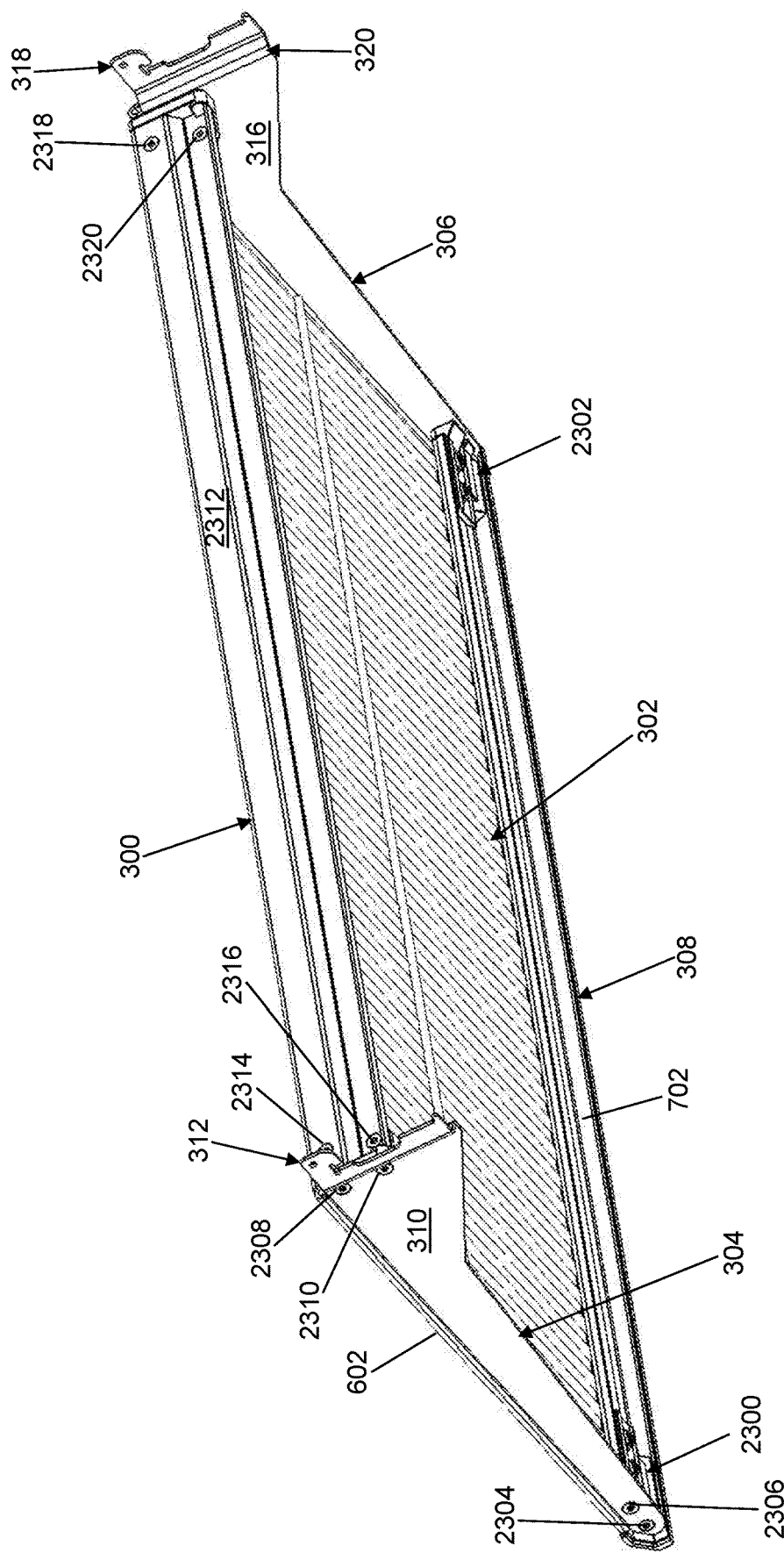
FIG. 23 depicts a back, right, bottom side perspective view of the second shelf of FIG. 3 in accordance with an illustrative embodiment.
Figure 24:
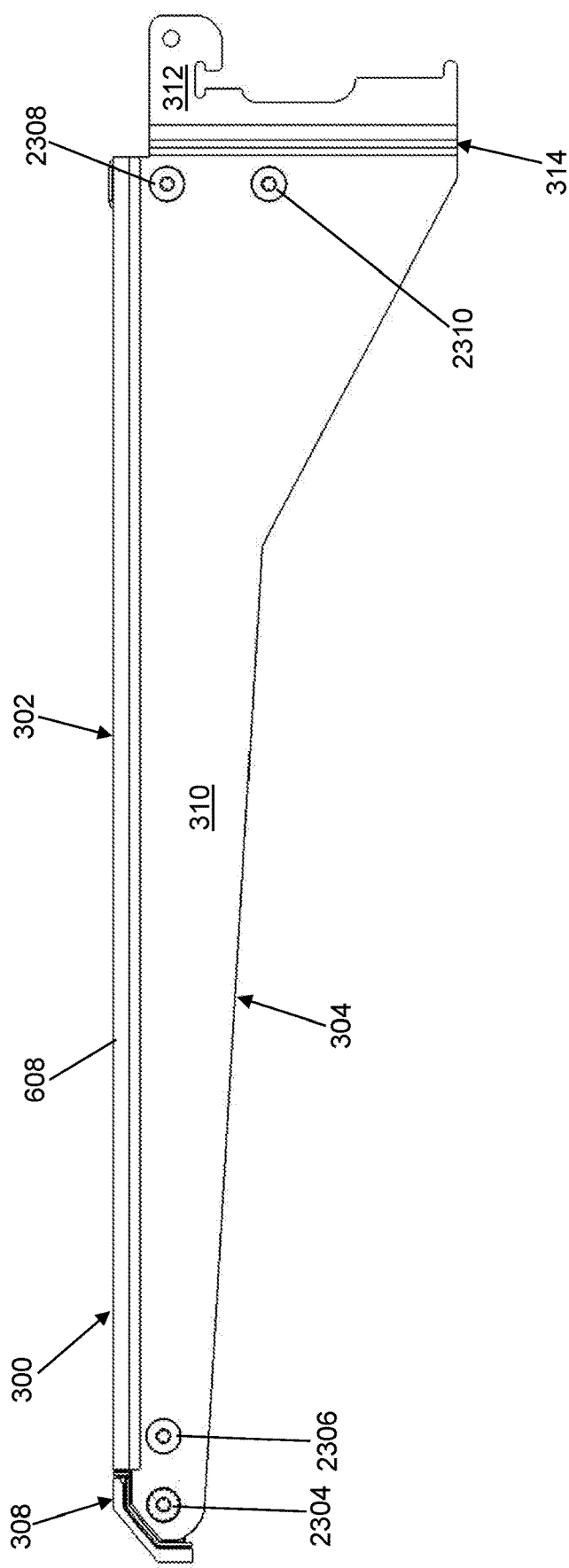
FIG. 24 depicts a right side view of the second shelf of FIG. 3 in accordance with an illustrative embodiment.

Referring to FIG. 23, a back right side perspective view of second shelf 300 is shown in accordance with an illustrative embodiment. Referring to FIG. 24, a right side view of second shelf 300 is shown in accordance with an illustrative embodiment. Similar to first front trim assembly 208, second front trim assembly 308 may include a second right end cap assembly 2300, a second left end cap assembly 2302, reflective wall 702, light assembly 1216, and front trim 900. A first fastener 2304 may be inserted in first right front aperture wall 600; a second fastener 2306 may be inserted in second right front aperture wall 602; a third fastener 2308 may be inserted in right top aperture wall 604; and a fourth fastener 2310 may be inserted in right bottom aperture wall 606 to mount second right brace 304 to second shelf support plate 302 as discussed further below. Similarly, a fifth fastener 4500 (shown referring to FIG. 45B) may be inserted in first left front aperture wall 4508; a sixth fastener 4502 (shown referring to FIG. 45B) may be inserted in second left front aperture wall 4509; a seventh fastener 4504 (shown referring to FIG. 45B) may be inserted in left top aperture wall 4510; and an eighth fastener 4506 (shown referring to FIG. 45B) may be inserted in left bottom aperture wall 4512 to mount second left brace 306 to second shelf support plate 302.

Figure 25:
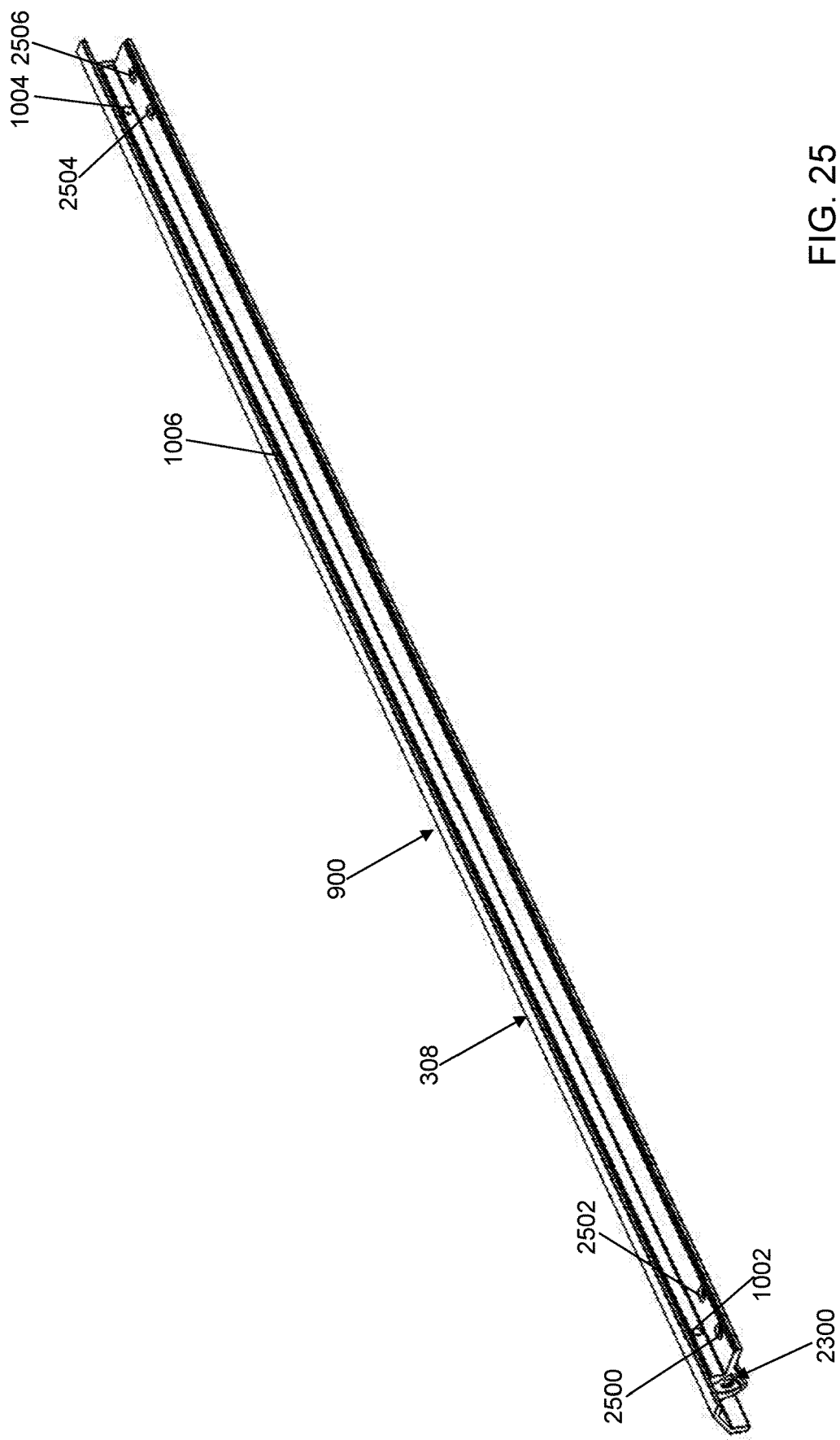
FIG. 25 depicts a back, right side view of the front trim assembly of the second shelf of FIG. 3 in accordance with an illustrative embodiment.
Figure 26:
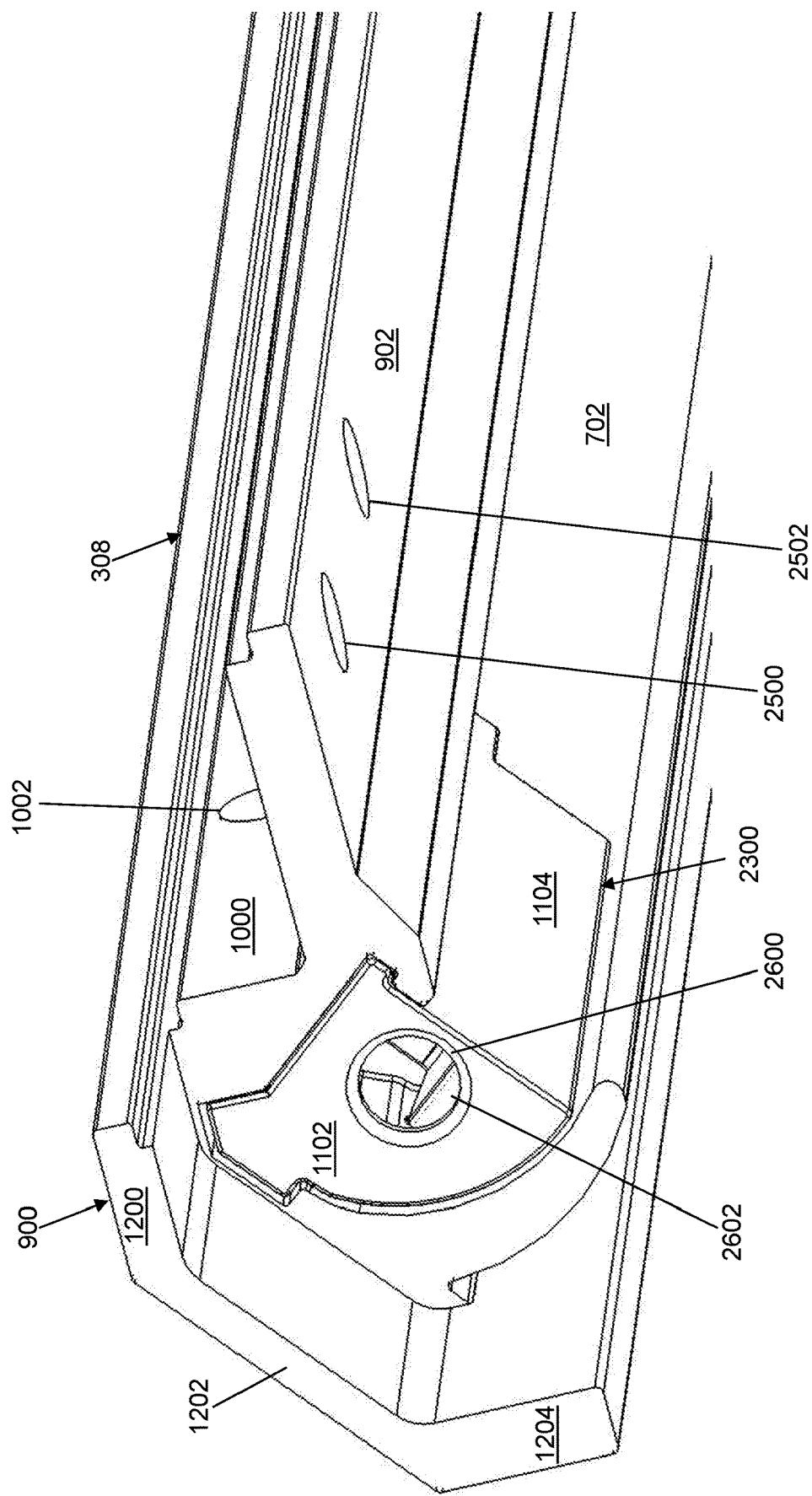
FIG. 26 depicts a zoomed back, right side view of the right end cap assembly of the front trim assembly of FIG. 25 in accordance with an illustrative embodiment.
Figure 27:
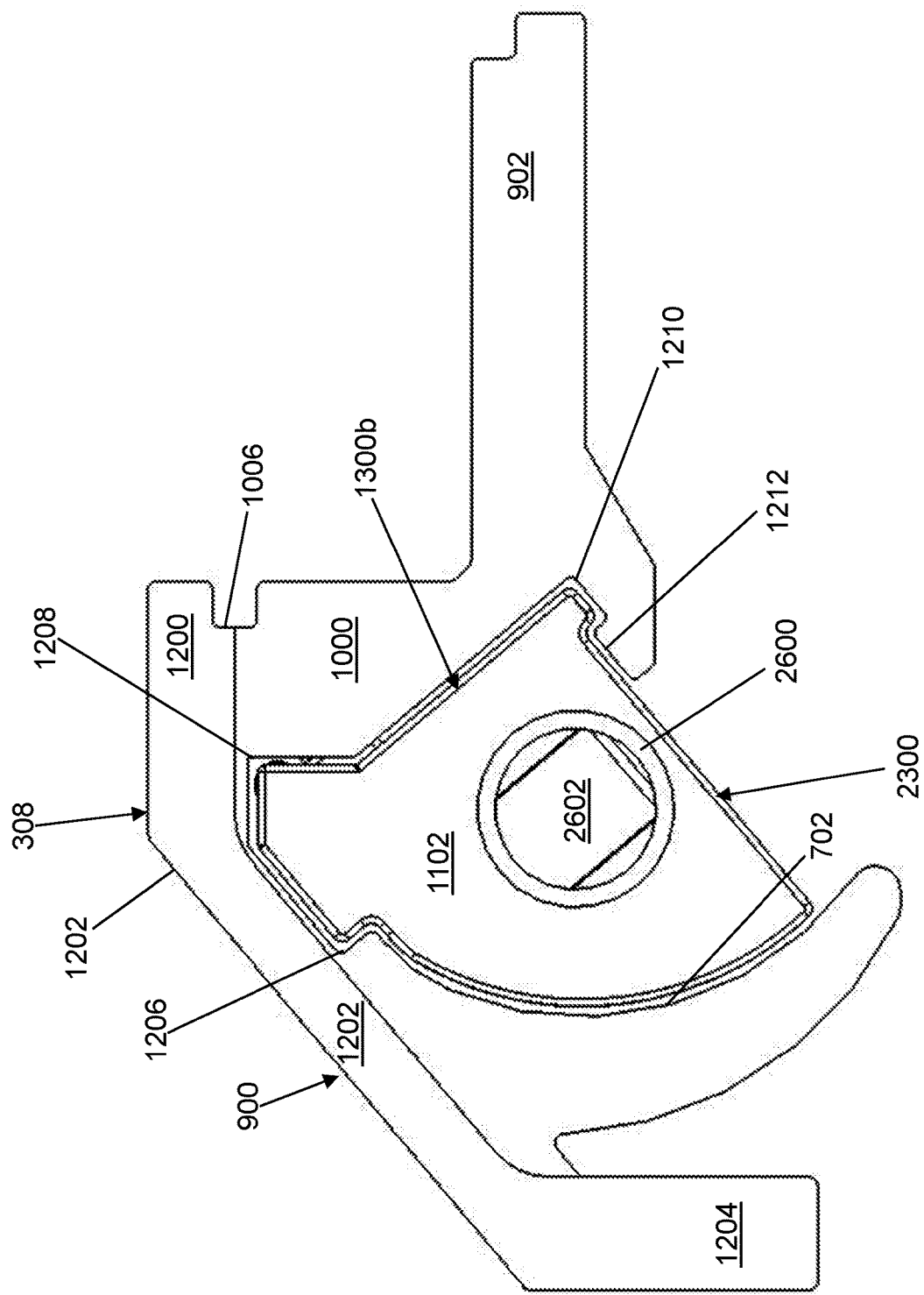
FIG. 27 depicts a right side view of the right end cap assembly of the front trim assembly of FIG. 25 in accordance with an illustrative embodiment.

Referring to FIG. 25, a back right side view of second front trim assembly 308 is shown in accordance with an illustrative embodiment. Referring to FIG. 26, a zoomed back right side view of second front trim assembly 308 is shown in accordance with an illustrative embodiment. Referring to FIG. 27, a right side view of second front trim assembly 308 is shown in accordance with an illustrative embodiment. A first right fastener device 2304 and a second right fastener device 2306 may be inserted into first brace aperture wall 600 and second brace aperture wall 602 of second right brace 304, respectively, to mount second shelf 300 to second right brace 304. Though not shown, second shelf 300 may be similarly mounted to second left brace 306.

Figure 28:
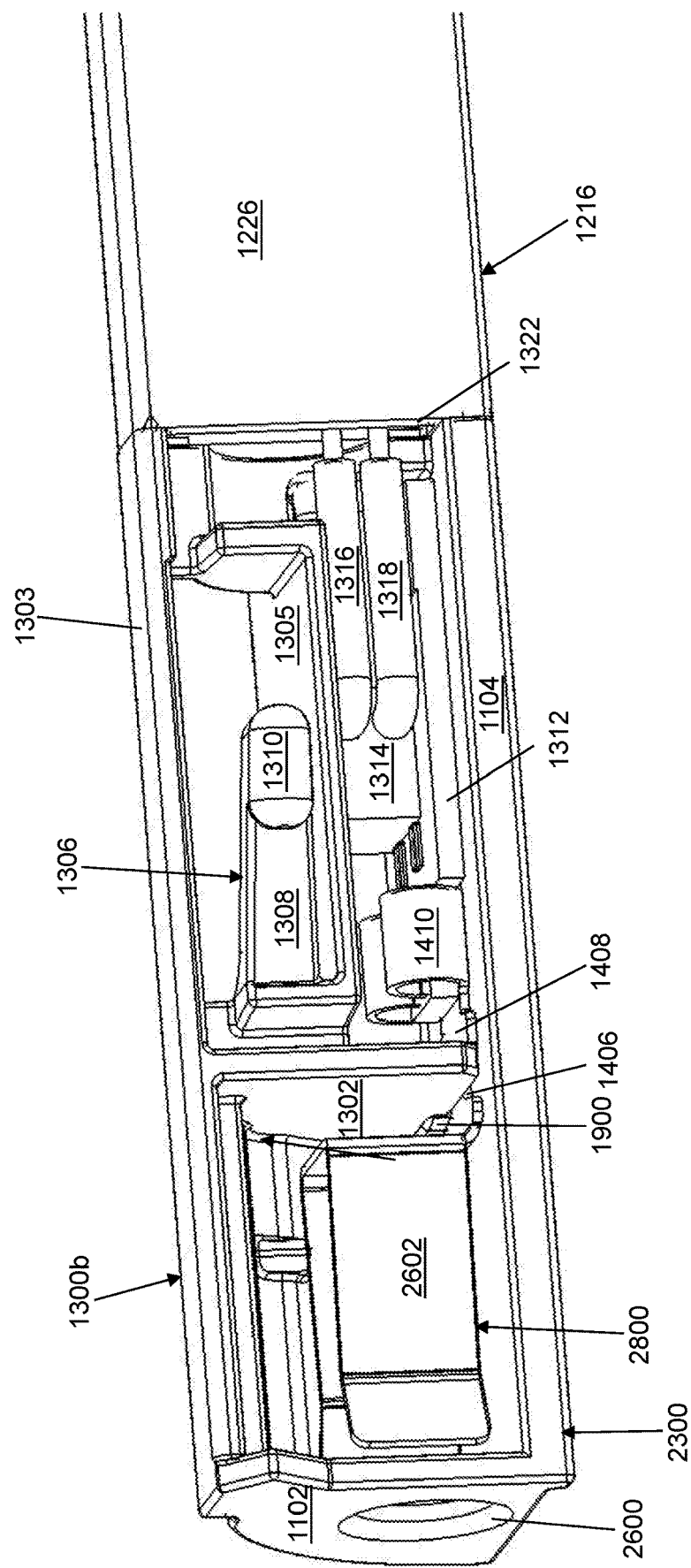
FIG. 28 depicts a zoomed back, right side view of the right end cap assembly of the front trim assembly of FIG. 25 in accordance with an illustrative embodiment.
Figure 34:
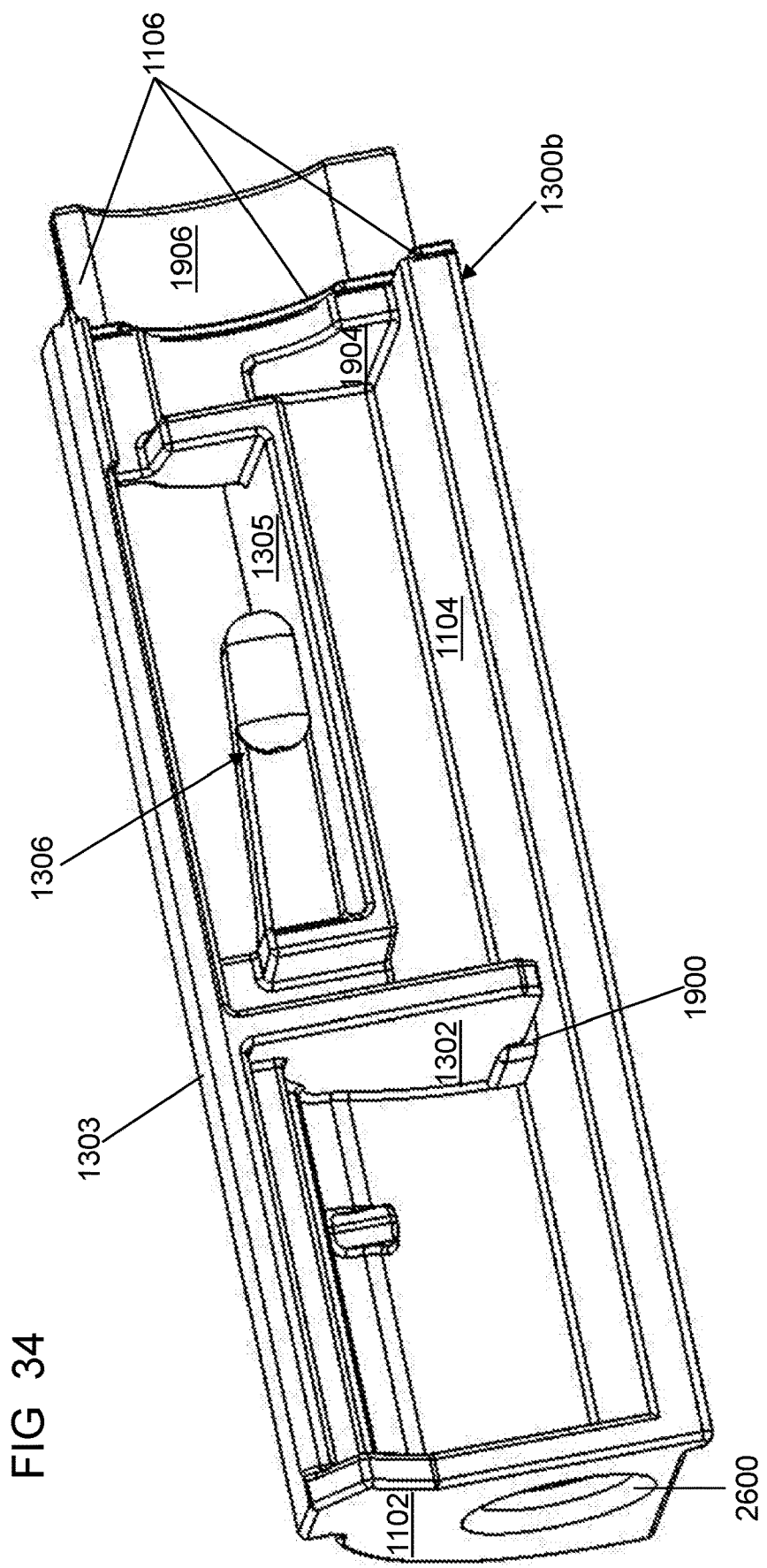
FIG. 34 depicts a back perspective view of a right end cap housing of the right end cap assembly of the front trim assembly of FIG. 25 in accordance with an illustrative embodiment.

Second right end cap assembly 2300 may be similar to right end cap assembly 700 and may include a second right end cap housing 1300b and electrical components that power the array of lights 1218. Referring to FIG. 28, a zoomed back right side view of second right end cap housing 1300b and light assembly 1216 is shown in accordance with an illustrative embodiment. Referring to FIG. 34, a back perspective view of second right end cap housing 1300b is shown in accordance with an illustrative embodiment.

Second right end cap housing 1300b may be similar to first right end cap housing 1300a and may include exterior side wall 1102, back, bottom wall 1104, right end cap interior wall 1302, right end cap top wall 1303, trim wall 1902, interior side wall 1904, extension wall 1906, right tab housing 1305, right mounting tab 1306, a second right connector aperture wall 2600, and right notch wall 1900. Instead of first right connector aperture wall 1100 formed through back, bottom wall 1104, second right end cap housing 1300b includes second right connector aperture wall 2600 formed through exterior side wall 1102. When second right end cap assembly 2302 is mounted to front trim 900, first right fastener device 2304 may be inserted through first brace aperture wall 600 of second right brace 304 and through second right connector aperture wall 2600.

Figure 29:
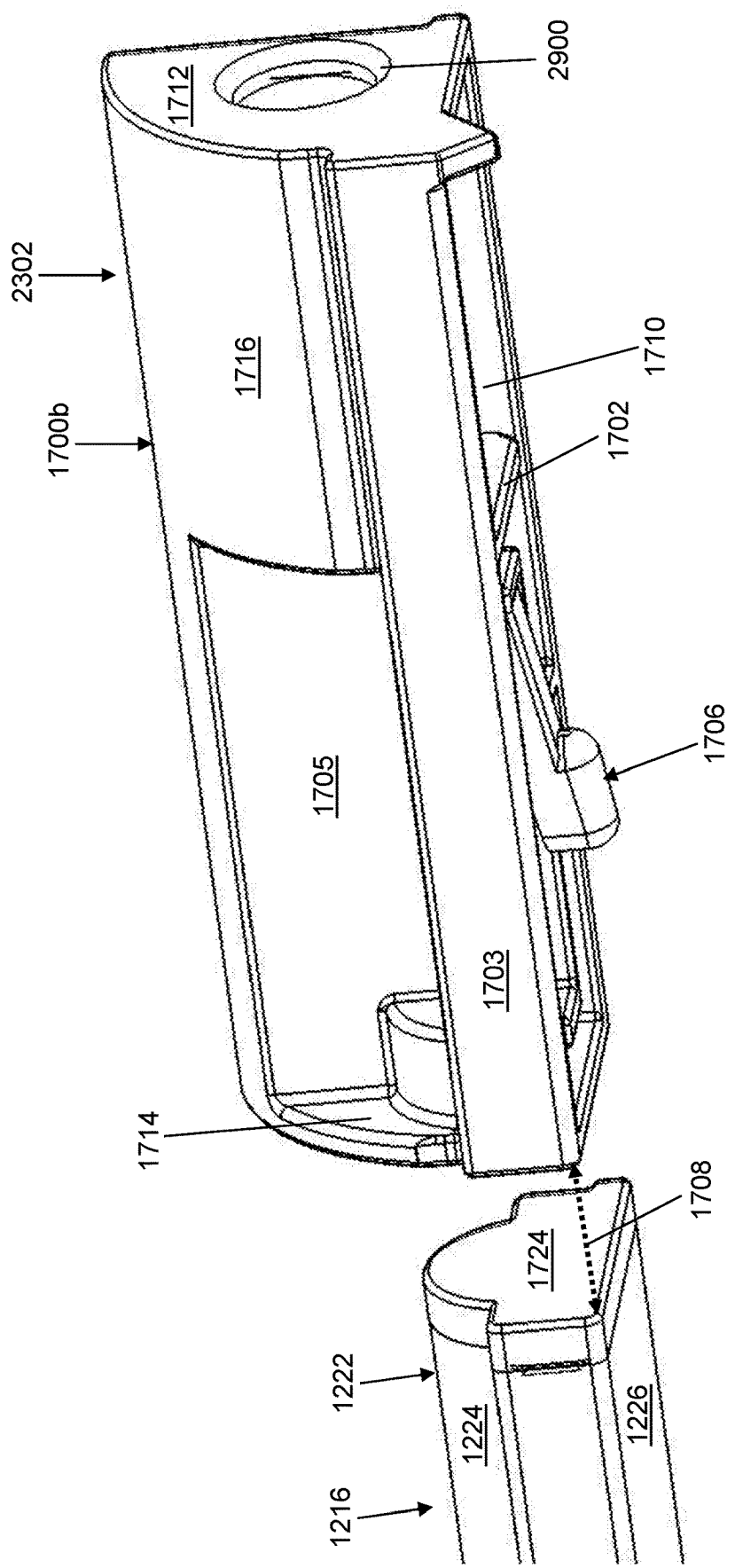
FIG. 29 depicts a zoomed top perspective view of the left end cap assembly of the front trim assembly of FIG. 25 in accordance with an illustrative embodiment.
Figure 30:
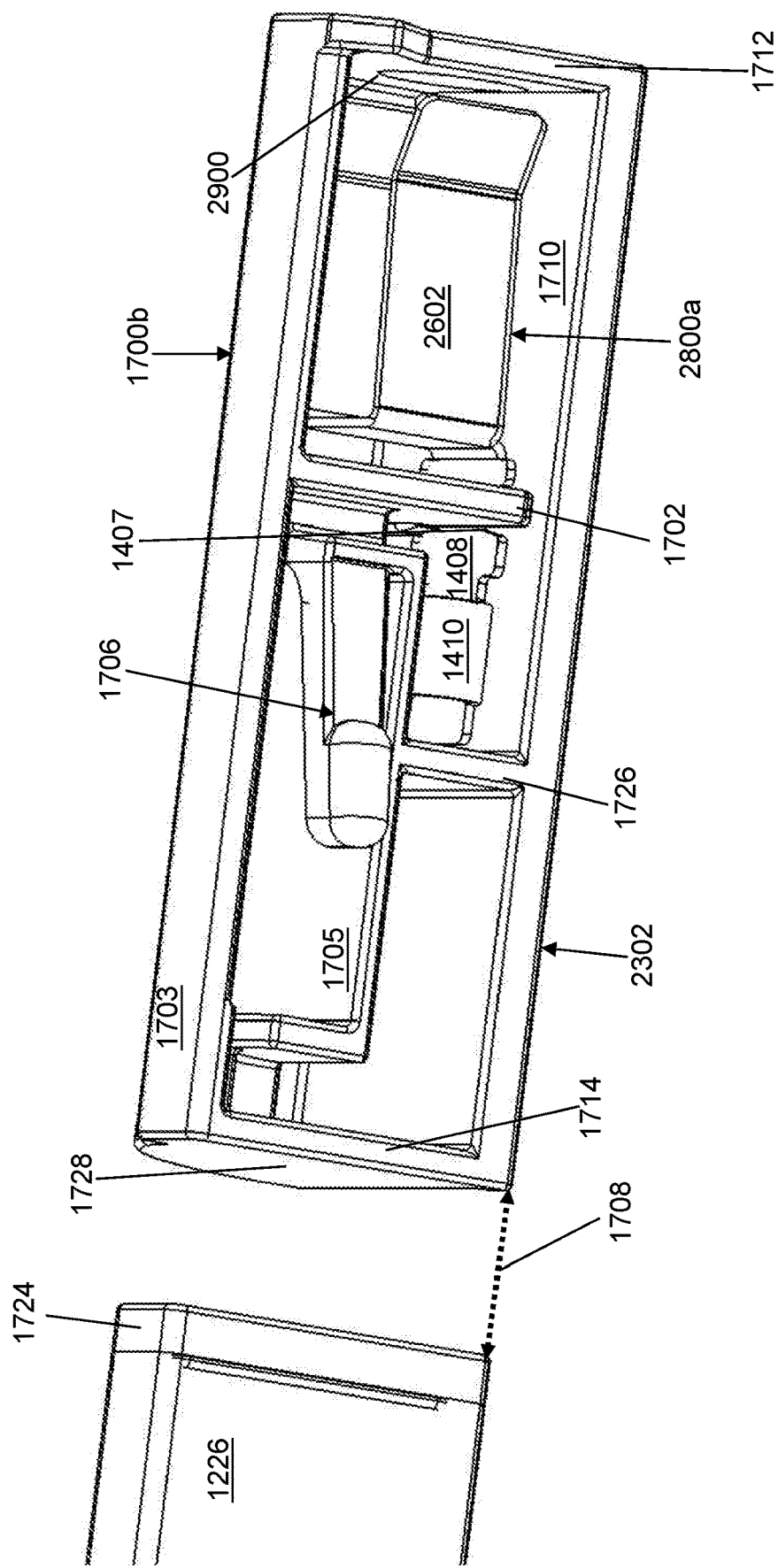
FIG. 30 depicts a zoomed back perspective view of the left end cap assembly of the front trim assembly of FIG. 25 in accordance with an illustrative embodiment.

Referring to FIG. 29, a zoomed top perspective view of second left end cap assembly 2302 and light assembly 1216 is shown in accordance with an illustrative embodiment. Referring to FIG. 30, a zoomed back perspective view of second left end cap assembly 2302 and light assembly 1216 is shown in accordance with an illustrative embodiment. Second left end cap assembly 2302 may be similar to left end cap assembly 800 and may include a second left end cap housing 1700b and electrical components that power the array of lights 1218. Second left end cap housing 1700b may be similar to first left end cap housing 1700a and may include left end cap interior wall 1702, left end cap top wall 1703, a second left connector aperture wall 2900, left tab housing 1705, left mounting tab 1706, bottom wall 1710, exterior side wall 1712, interior side wall 1714, trim wall 1716, tab housing support wall 1726, and a left notch wall (not shown). Instead of first left connector aperture wall 1704 formed through bottom wall 1710, second left end cap housing 1700b includes second left connector aperture wall 2900 formed through exterior side wall 1712. When second left end cap assembly 2302 is mounted to front trim 900, first right fastener device 2304 may be inserted through first brace aperture wall 600 of second left brace 306 and through second left connector aperture wall 2900.

Figure 31:
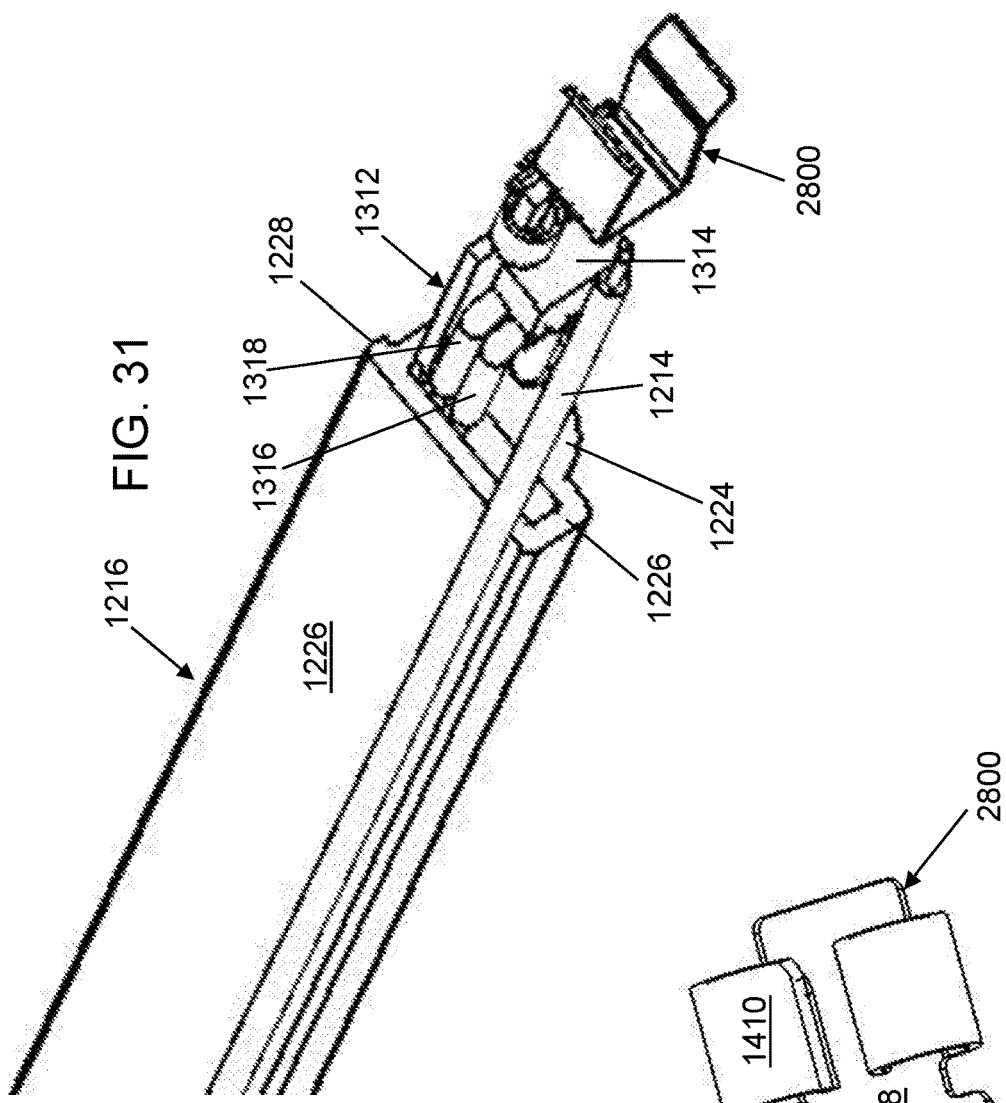
FIG. 31 depicts a zoomed back perspective view of electrical components of the light assembly of the front trim assembly of the second shelf of FIG. 28 in accordance with an illustrative embodiment.

Referring to FIG. 31, a zoomed back perspective view of the electrical components of second front trim assembly 308 are shown in accordance with an illustrative embodiment. The electrical components that power the array of lights 1218 of second front trim assembly 308 may be similar to the electrical components that power the array of lights 1218 of first front trim assembly 208. The electrical components that power the array of lights 1218 of second front trim assembly 308 may include a second electrical connector 2800 housed in second right end cap housing 1300b, rectifier board 1312, rectifier 1314, first wire 1316, second wire 1318, connecting wire 1214, and a second left electrical connector 2800a housed in second left end cap housing 1700b.

Figure 32:
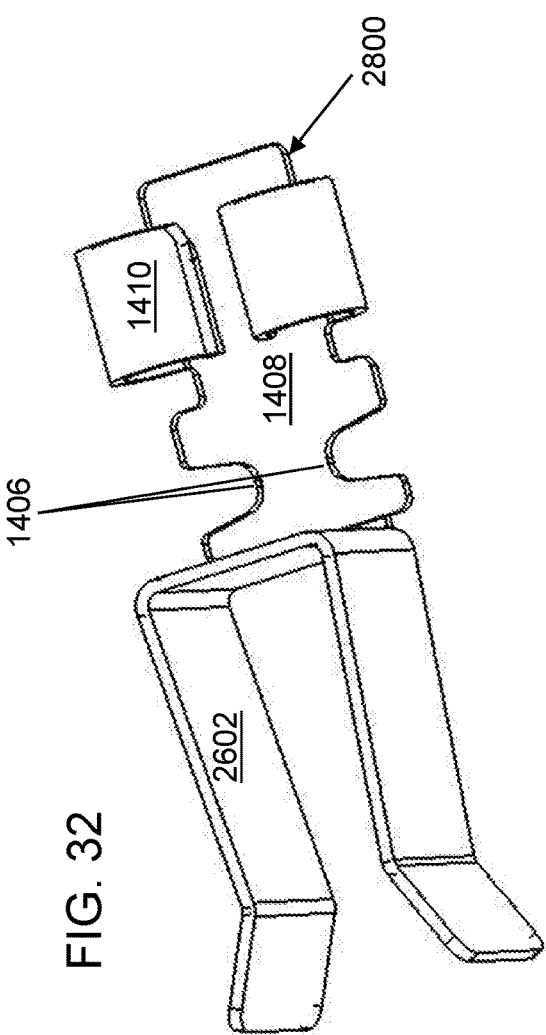
FIG. 32 depicts a back perspective view of a first electrical connector of the right end cap assembly of the front trim assembly of FIG. 25 in accordance with an illustrative embodiment.

Referring to FIG. 32, a back perspective view of second electrical connector 2800 is shown in accordance with an illustrative embodiment. Similar to first electrical connector 1304, second electrical connector 2800 may include a second flex connector 2602, connector notches 1406, connector plate 1408, and prong connector 1410. Second flex connector 2602 is mounted to extend from connector plate 1408 in a direction opposite prong connector 1410. Second flex connector 2602 has a prong shape that extends horizontally to cover the opening formed by second right connector aperture wall 2600 formed through exterior side wall 1102 and by second left connector aperture wall 2900 formed through exterior side wall 1712.

Figure 33:
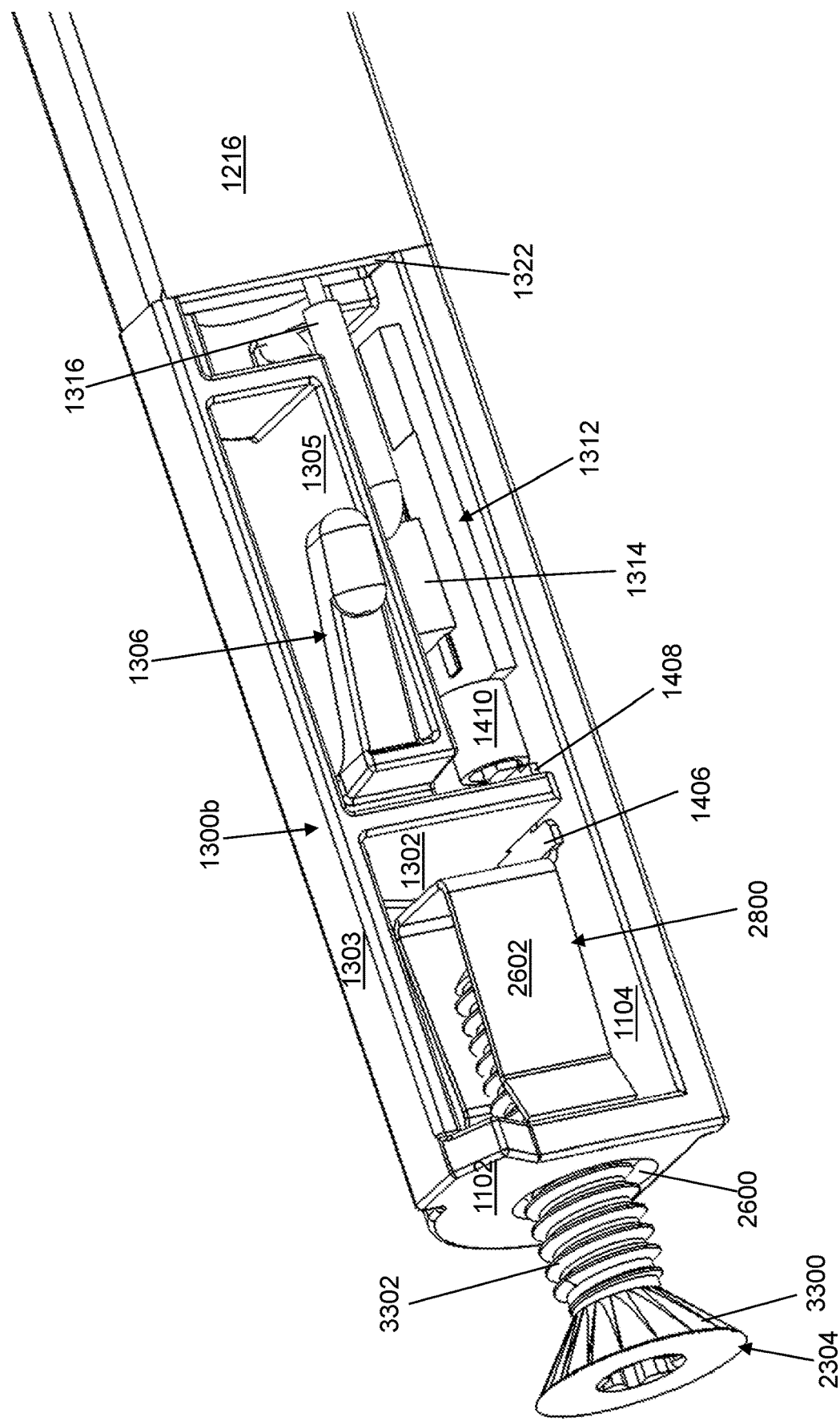
FIG. 33 depicts a back, right perspective view of the right side of the right end cap assembly of the front trim assembly of FIG. 23 in accordance with an illustrative embodiment.

Referring to FIG. 33, a back right perspective view of second right end cap assembly 2300 and of light assembly 1216 is shown in accordance with an illustrative embodiment. In an illustrative embodiment, first right fastener device 2304 is a screw with a head 3300 and a shaft 3302 that may be threaded. A non-coated portion of first right fastener device 2304 may be inserted through first brace aperture wall 600 of second right brace 304 and through second right connector aperture wall 2600 formed through exterior side wall 1102. For example, shaft 3302 makes electrical contact with a non-coated portion of second right brace 304 and with second flex connector 2602 of second electrical connector 2800 by insertion into the prong formed by second flex connector 2602. Second flex connector 2602 is sized and formed of a material to deform to accept shaft 3302 while maintaining a connection with shaft 3302. The non-coated portion of first right fastener device 2304 of second left brace 306 similarly makes electrical contact with second flex connector 2602 of second left electrical connector 2800a. Second electrical connector 2800 and second left electrical connector 2800a are formed of electrically conductive material such as a metal; whereas, second right end cap housing 1300b and second left end cap housing 1700b are formed of electrically insulative material such as a plastic polymer.

Figure 35:
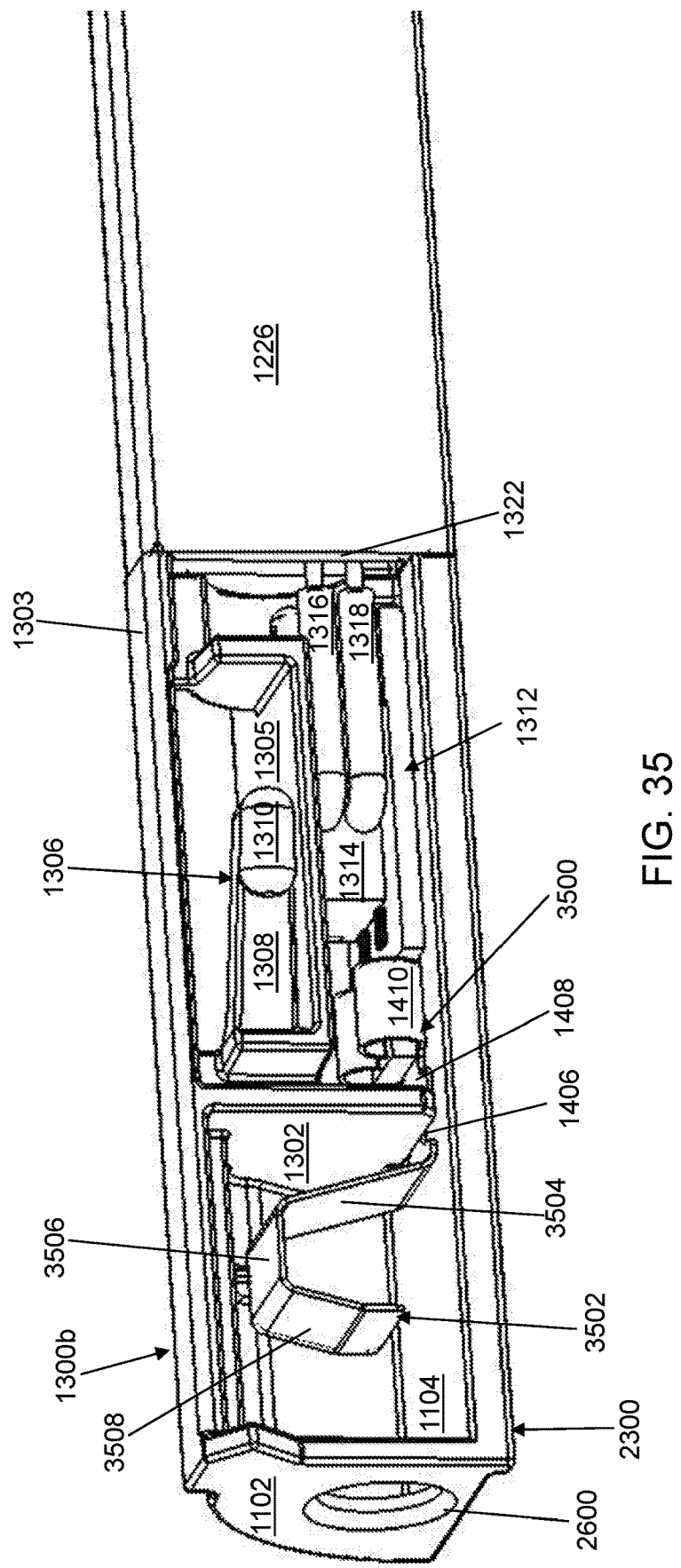
FIG. 35 depicts a zoomed back, right side view of the right end cap assembly of the front trim assembly of FIG. 25 with a second electrical connector in accordance with an illustrative embodiment.
Figure 38:
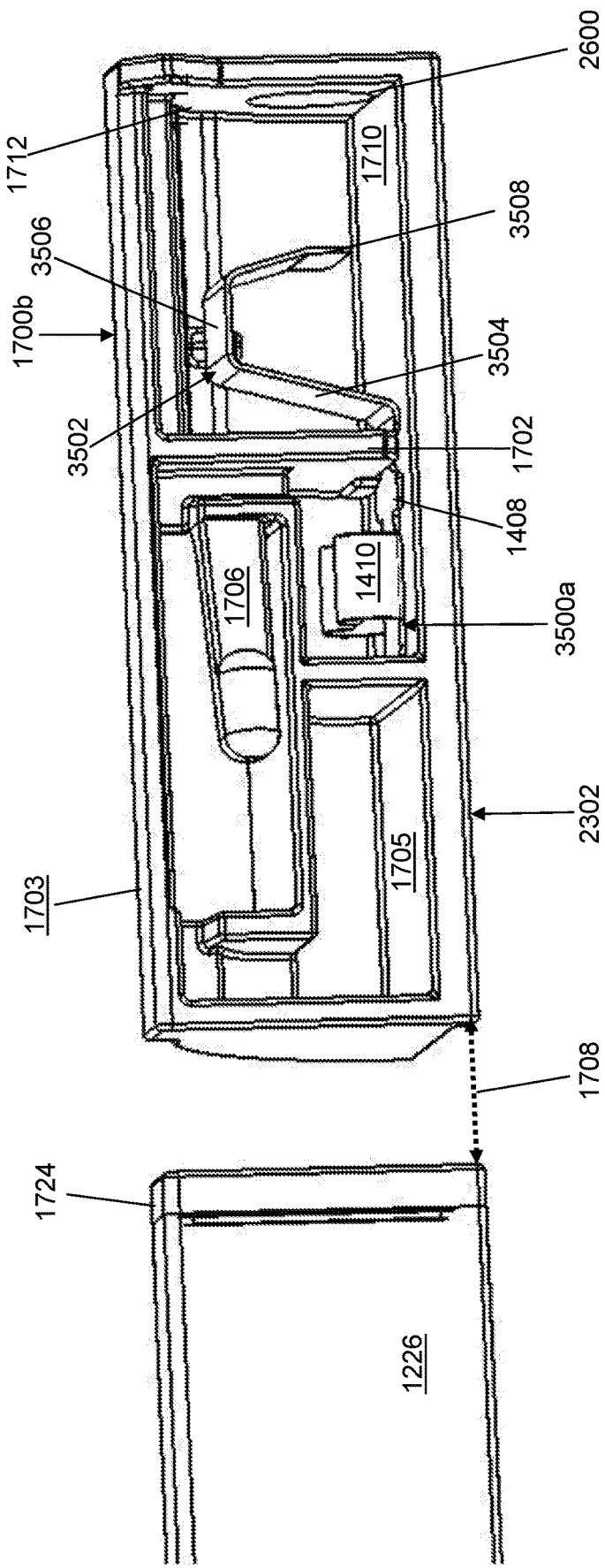
FIG. 38 depicts a zoomed back perspective view of the left end cap assembly of the front trim assembly of FIG. 25 with the second electrical connector of FIG. 35 in accordance with an illustrative embodiment.

Referring to FIG. 35, a zoomed back right side view of second front trim assembly 308 is shown with a third electrical connector 3500 in accordance with an illustrative embodiment. Referring to FIG. 36, a zoomed top perspective view of electrical components of second front trim assembly 308 with third electrical connector 3500 is shown in accordance with an illustrative embodiment. Referring to FIG. 37, a back perspective view of third electrical connector 3500 is shown in accordance with an illustrative embodiment. Referring to FIG. 38, a zoomed back perspective view of second left end cap assembly 2302 with third electrical connector 3500 and light assembly 1216 is shown in accordance with an illustrative embodiment.

Similar to second electrical connector 2800, third electrical connector 3500 may include a third flex connector 3502, connector notches 1406, connector plate 1408, and prong connector 1410. Third flex connector 3502 forms a U-shaped tab that extends horizontally from connector plate 1408 in a direction opposite prong connector 1410. Third flex connector 3502 includes an upward extending wall 3504 mounted to connector plate 1408, a plateau wall 3506, and a downward extending contact wall 3508. Downward extending contact wall 3508 is positioned in front of the opening formed by second right connector aperture wall 2600 formed through exterior side wall 1102 and by second left connector aperture wall 2900 formed through exterior side wall 1712.

Figure 39:
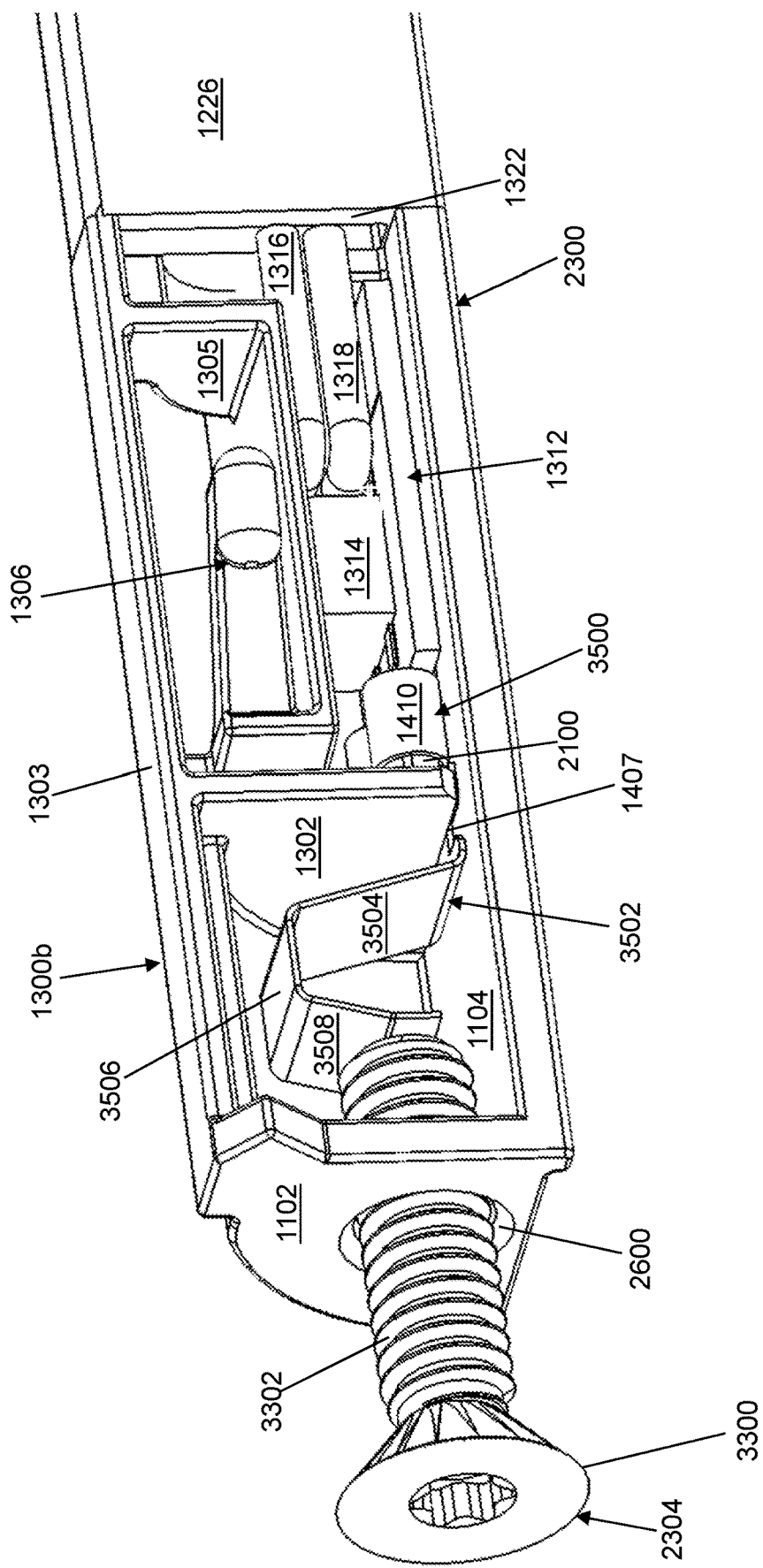
FIG. 39 depicts a back, right perspective view of the right side of the right end cap assembly of the front trim assembly of FIG. 23 with the second electrical connector of FIG. 35 in accordance with an illustrative embodiment.

Referring to FIG. 39, a back right perspective view of second right end cap assembly 2300 with third electrical connector 3500 and of light assembly 1216 is shown in accordance with an illustrative embodiment. A non-coated portion of first right fastener device 2304 may be inserted through first brace aperture wall 600 of second right brace 304 and through second right connector aperture wall 2600 formed through exterior side wall 1102. For example, shaft 3302 makes electrical contact with a non-coated portion of second right brace 304 and with downward extending contact wall 3508 of third electrical connector 3500. Third flex connector 3502 is sized and formed of a material to deform when shaft 3302 is pressed against downward extending contact wall 3508 while maintaining contact with shaft 3302. The non-coated portion of first right fastener device 2304 of second left brace 306 similarly makes electrical contact with third flex connector 3502 of a third left electrical connector 3500a. Third electrical connector 3500 and third left electrical connector 3500a are formed of electrically conductive material such as a metal.

Figure 40:
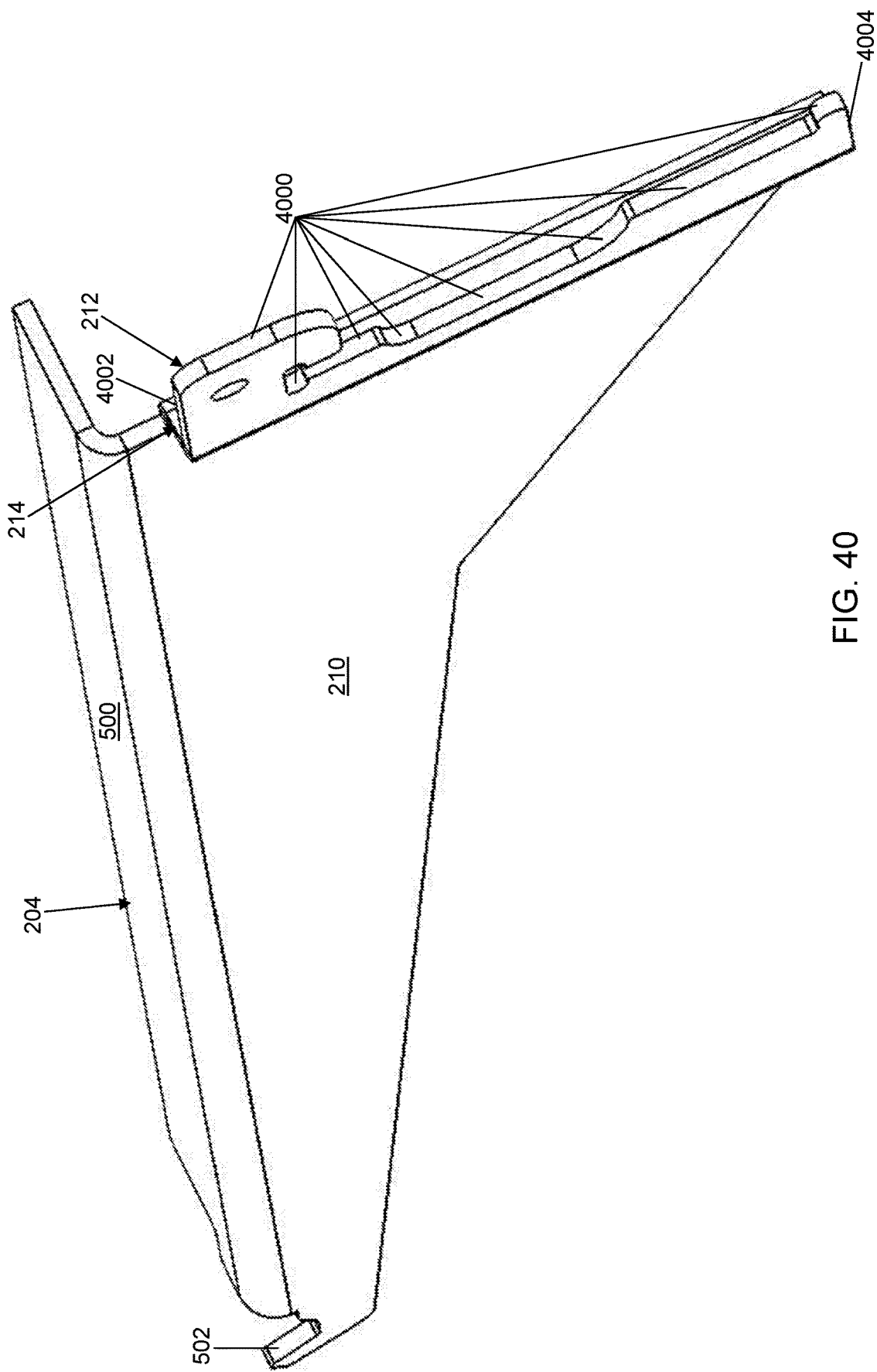
FIG. 40 depicts a back, right side view of the right brace of the first shelf of FIG. 2 in accordance with an illustrative embodiment.
Figure 41:
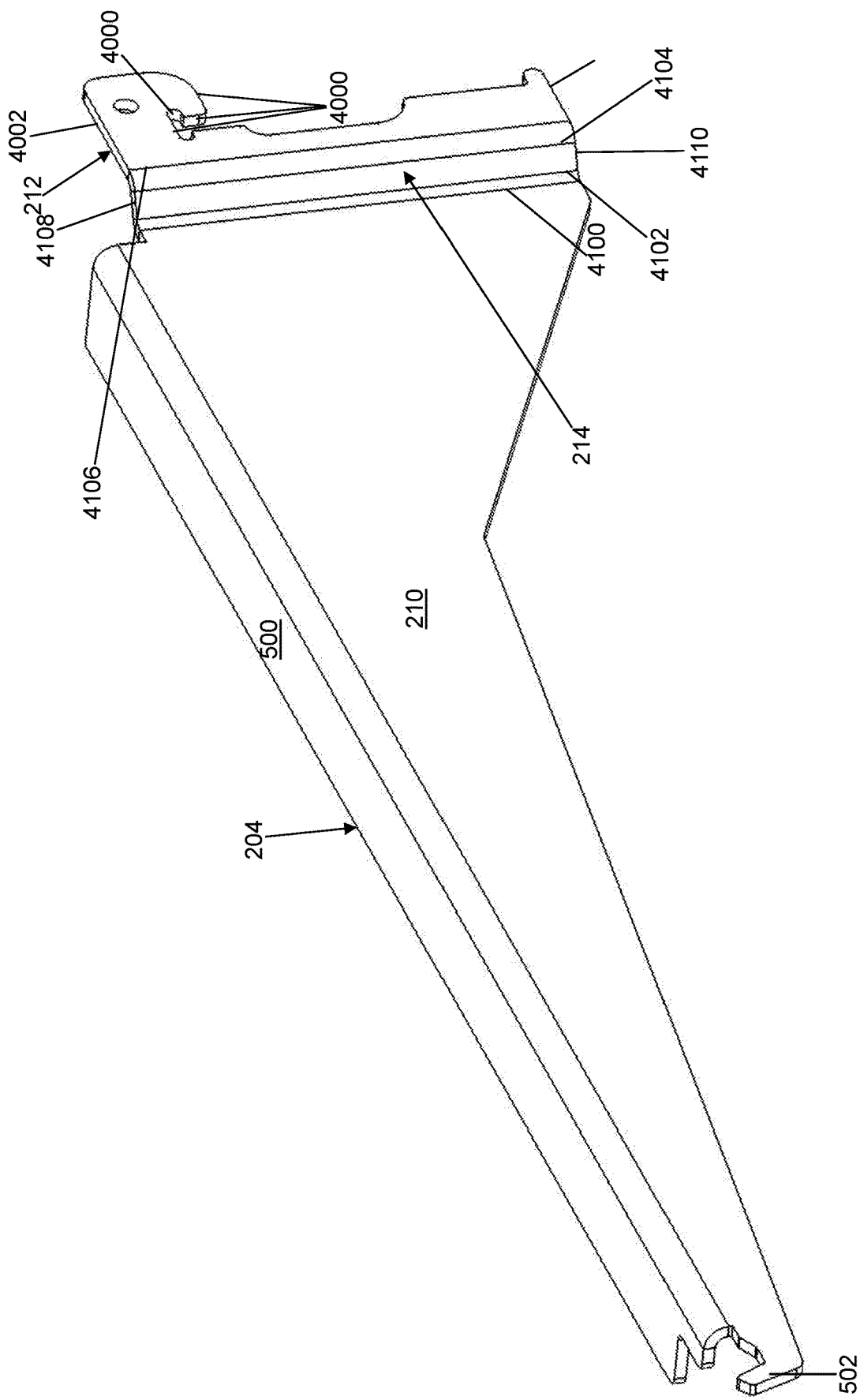
FIG. 41 depicts a front right side view of the right brace of the first shelf of FIG. 2 in accordance with an illustrative embodiment.
Figure 42:
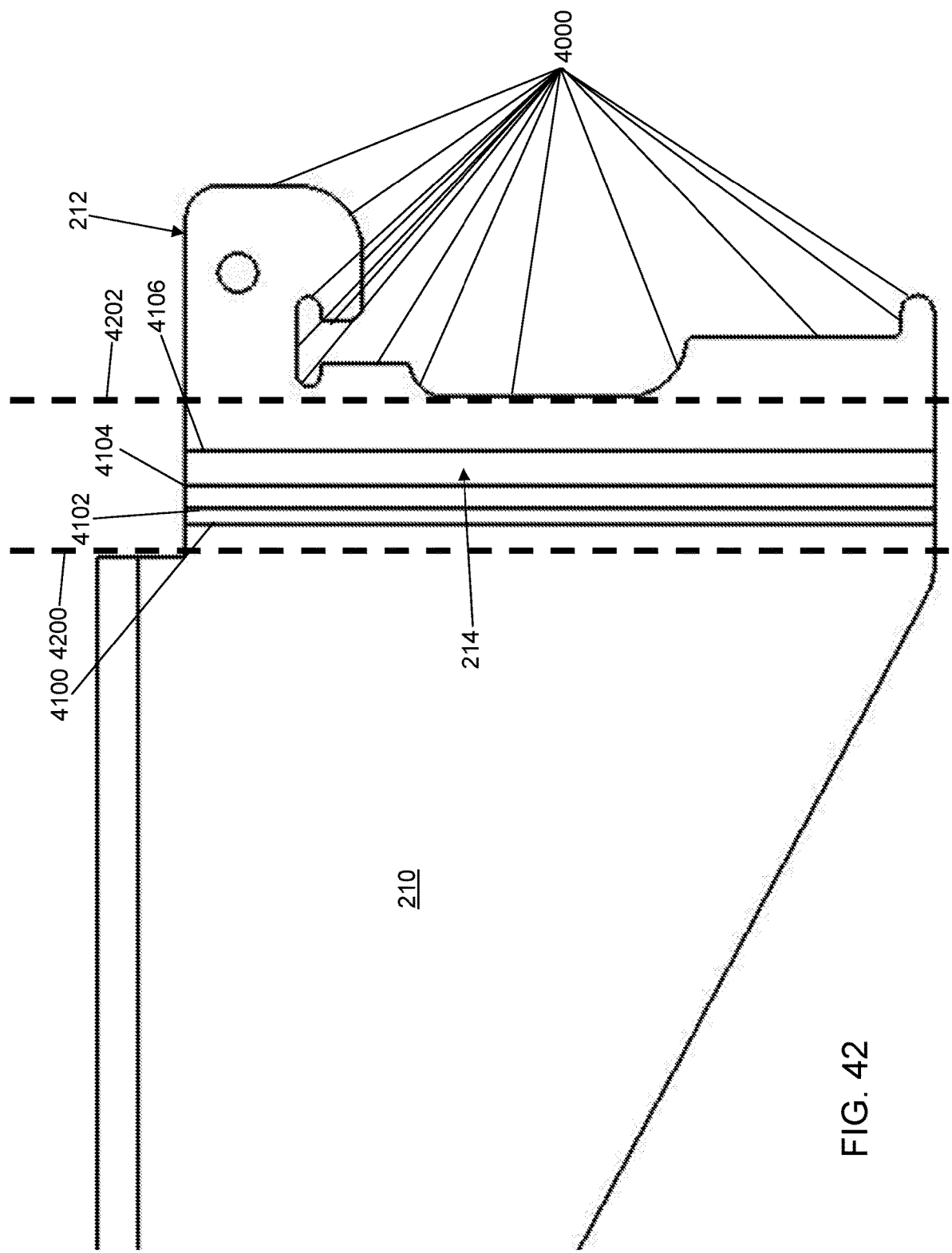
FIG. 42 depicts a right side view of the right brace of the first shelf of FIG. 2 zoomed to show a hook of the right brace in accordance with an illustrative embodiment.

Referring to FIG. 40 depicts a back, right side view of first right brace 204 is shown in accordance with an illustrative embodiment. Referring to FIG. 41, a front right side view of first right brace 204 is shown in accordance with an illustrative embodiment. Referring to FIG. 42, a right side view of first right brace 204 is shown zoomed to show a hook of the right brace in accordance with an illustrative embodiment. First right brace hook 212 may include an exterior edge surface 4000, a top hook surface 4002, and a bottom hook surface 4004. Exterior edge surface 4000 extends downward in a generally perpendicular direction from top hook surface 4002 and upward in a generally perpendicular direction from bottom hook surface 4004. All or a portion of exterior edge surface 4000 may contact first right ladder 108a and/or second right ladder 108b or the ladder connector depending on the embodiment to provide an electrical current to first right brace 204. Exterior edge surface 4000 may include various features to support connectivity to first right ladder 108a and/or second right ladder 108b or the ladder connector to provide a stable support of first shelf 200 or second shelf 300. For illustration, U.S. Patent Publication Number 2019/0211627 describes an illustrative structure for exterior edge surface 4000.

First right transition wall 214 may include a plurality of seams between first right brace plate 210 and first right brace hook 212. For example, first right transition wall 214 may include a first seam 4100, a second seam 4102, a third seam 4104, and a fourth seam 4106 that extend between a top surface 4108 and a bottom surface 4110 of first right transition wall 214. First seam 4100, second seam 4102, third seam 4104, and fourth seam 4106 extend downward in a generally perpendicular direction from top surface 4108 and upward in a generally perpendicular direction from bottom surface 4110.

The electrical current is provided to first right brace 204 through electrical contact with first right ladder 108a and/or second right ladder 108b or the ladder connector. The electrical contact may be direct due to physical contact or wirelessly. An exterior surface of first right brace 204 may be coated with electrically insulating material except on various surfaces of first right transition wall 214 and/or on first right brace hook 212. For example, the exterior surface of first right brace 204 may be coated with the electrically insulating material except on exterior edge surface 4000. As another option, the exterior surface of first right brace 204 may be coated with the electrically insulating material except on exterior edge surface 4000 and right of any of first seam 4100, second seam 4102, third seam 4104, and fourth seam 4106. As still another option, the exterior surface of first right brace 204 may be coated with the electrically insulating material except on exterior edge surface 4000 and right of where first right transition wall 214 extends from first right brace plate 210 that is identified by a first line 4200. As yet still another option, the exterior surface of first right brace 204 may be coated with the electrically insulating material except on exterior edge surface 4000 and right of where exterior edge surface 4000 extends closest to first right transition wall 214. Other locations further may be defined to simplify manufacture of first right brace 204.

First left brace 204, first right brace 204, and left brace 204 may be similarly coated with electrically insulating material. As discussed previously, right shelf electrical connector 502 and left shelf electrical connector 802 may also not be coated with electrically insulating material to provide the electrical current to light assembly 1216 or any other object connected to right shelf electrical connector 502 and/or left shelf electrical connector 802. The electrical current may provide DC power, AC power, or an electrical signal to the object connected to right shelf electrical connector 502 and left shelf electrical connector 802.

Figure 43:
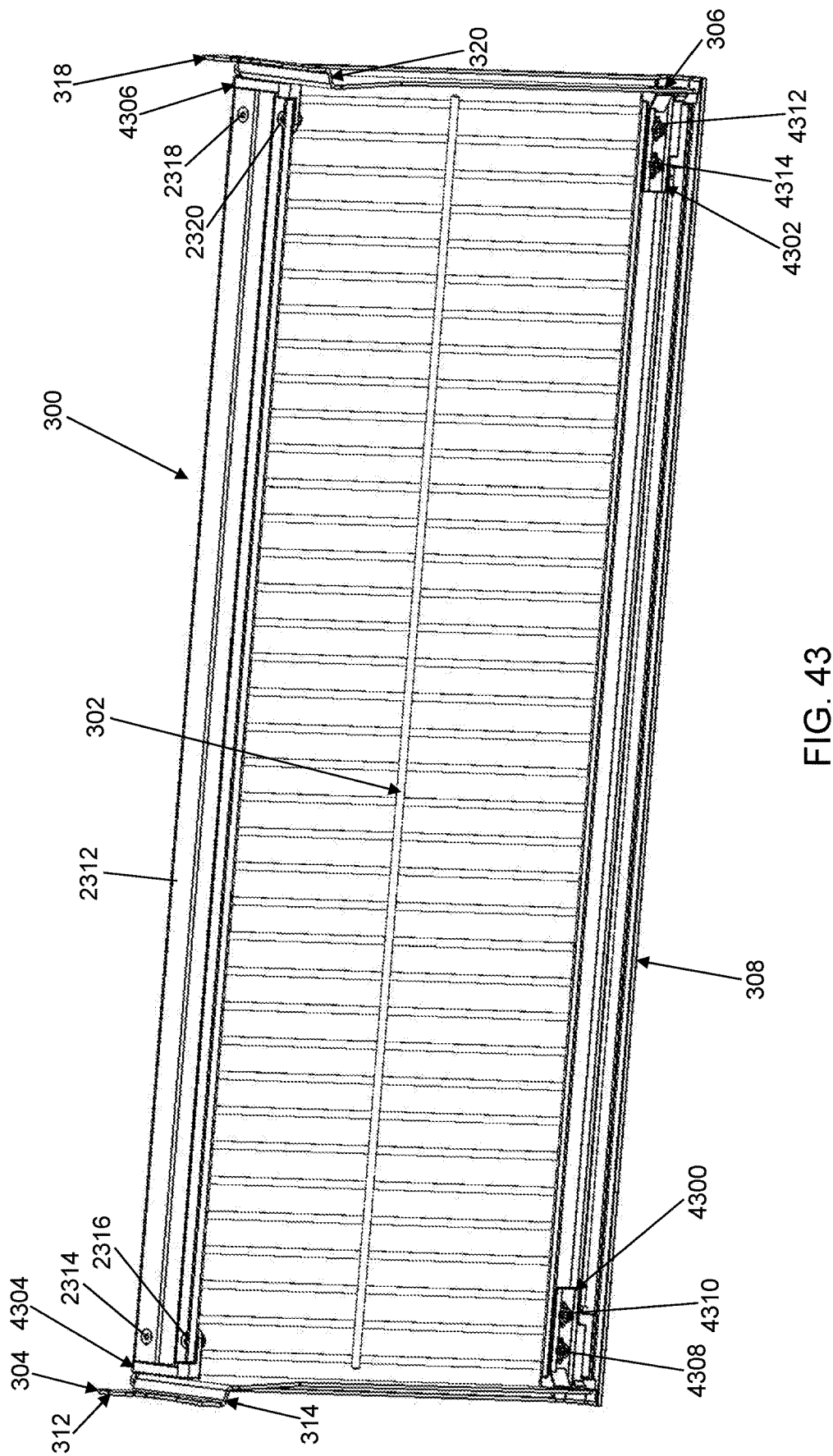
FIG. 43 depicts a back, bottom view of the second shelf of FIG. 3 in accordance with an illustrative embodiment.
Figure 44:
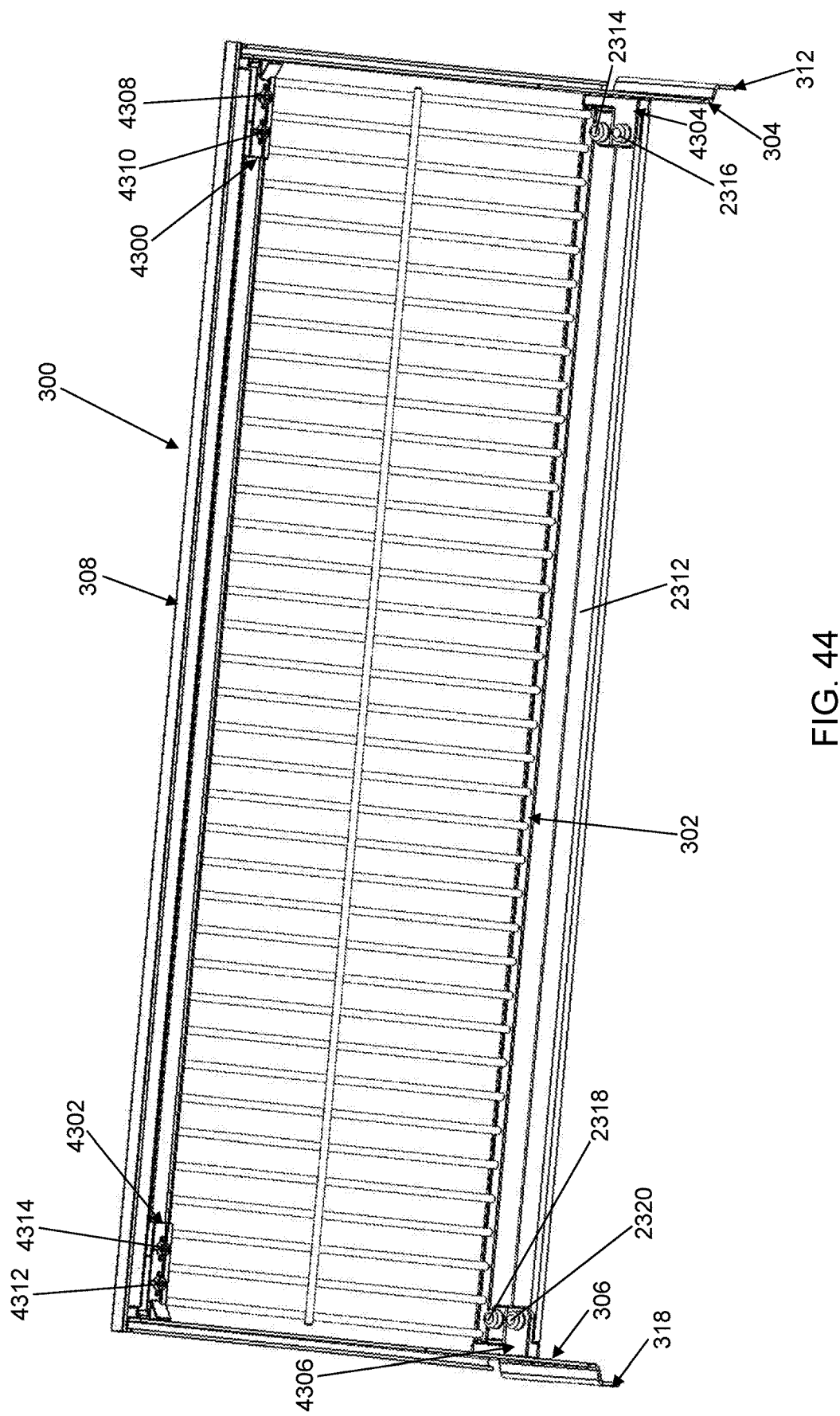
FIG. 44 depicts a bottom view of the second shelf of FIG. 3 in accordance with an illustrative embodiment.
Figure 45A:
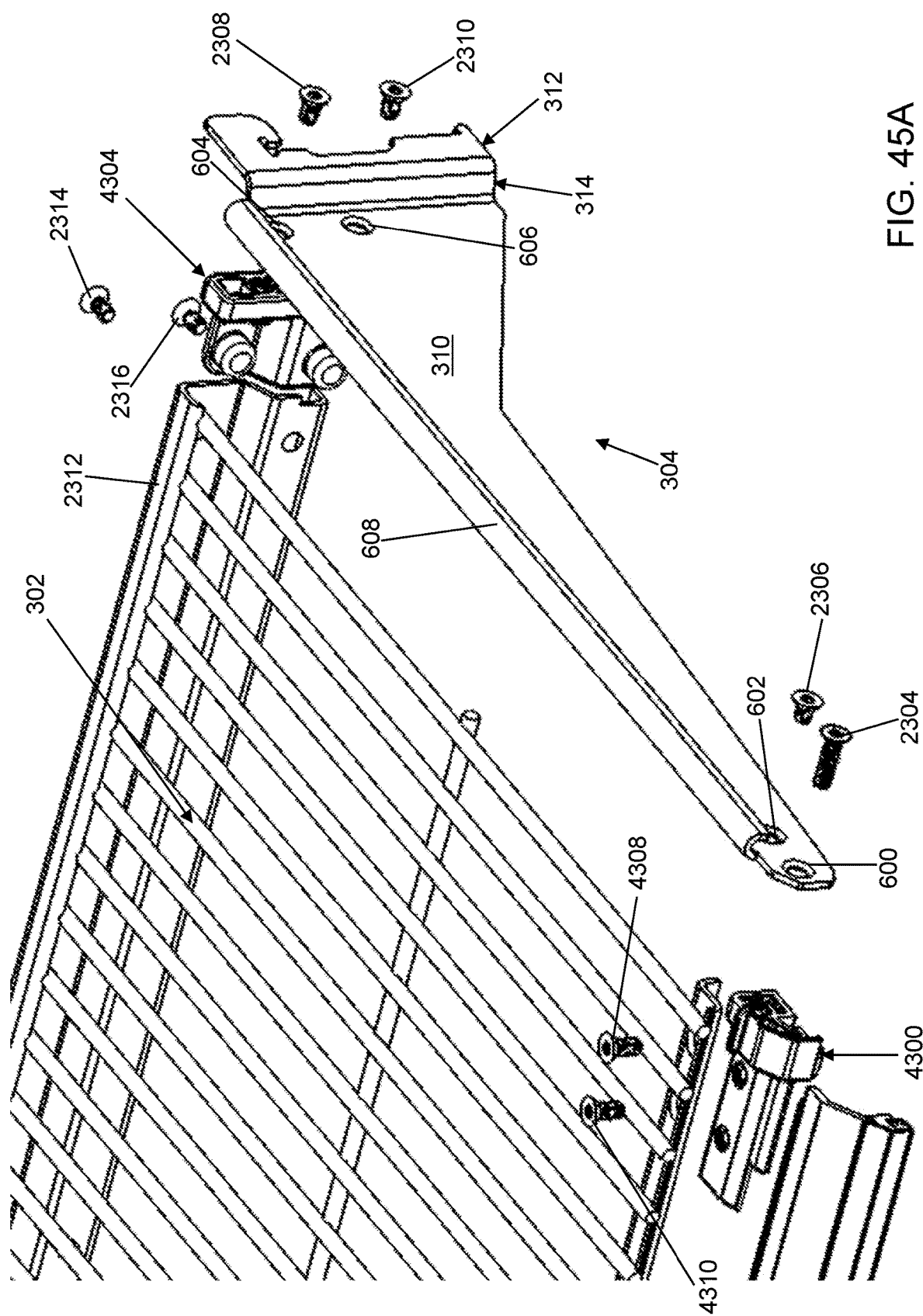
FIG. 45A depicts an exploded front view of a right side of the second shelf of FIG. 3 in accordance with an illustrative embodiment.
Figure 45B:
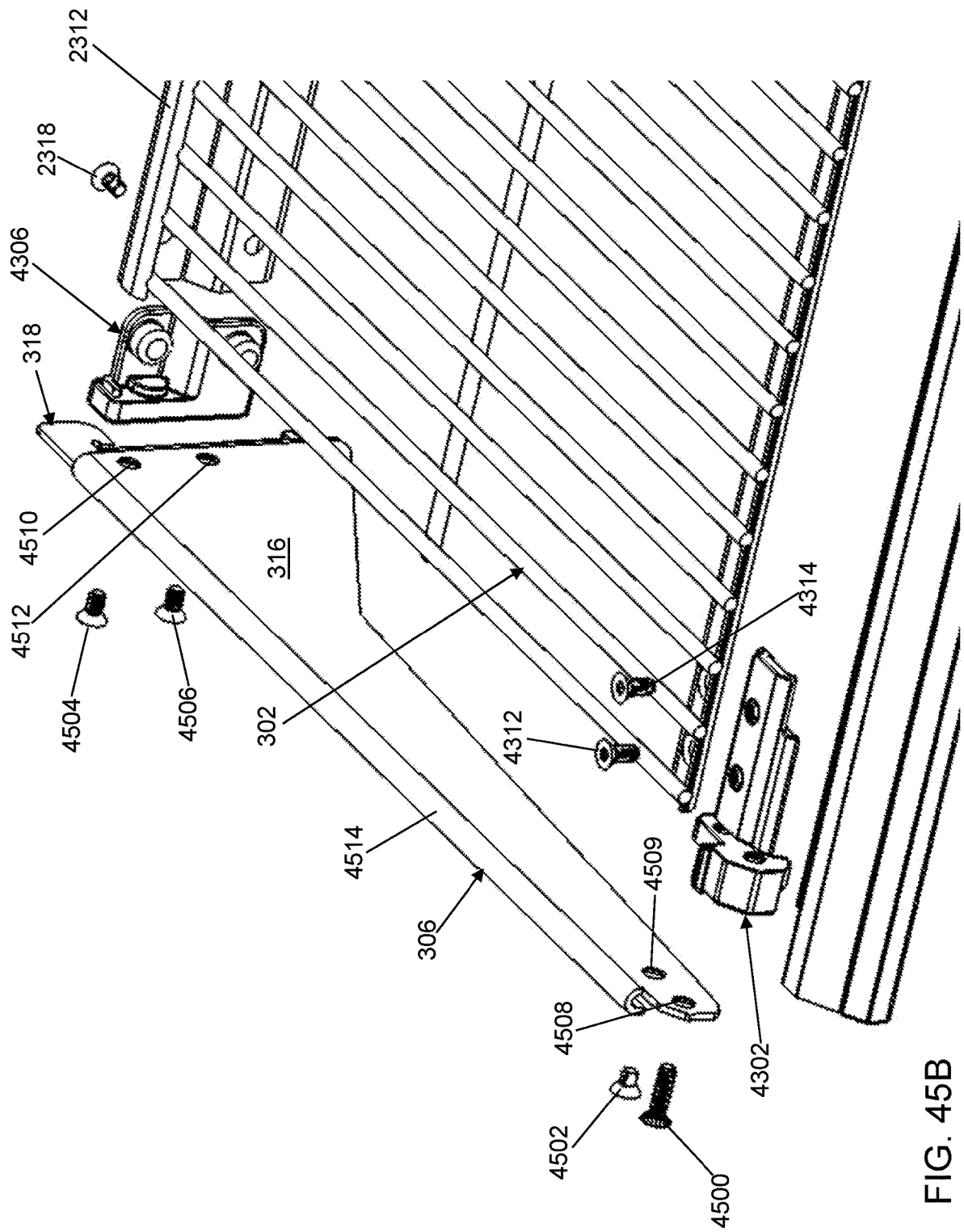
FIG. 45B depicts an exploded front view of a left side of the second shelf of FIG. 3 in accordance with an illustrative embodiment.

Referring to FIG. 43, a back, bottom view of second shelf 300 is shown in accordance with an illustrative embodiment. Referring to FIG. 44, a bottom view of second shelf 300 is shown in accordance with an illustrative embodiment. Referring to FIG. 45A, an exploded front view of a right side of second shelf 300 is shown in accordance with an illustrative embodiment. Referring to FIG. 45B, an exploded front view of a left side of second shelf 300 is shown in accordance with an illustrative embodiment. Second shelf 300 further may include a front, right insulator 4300, a front, left insulator 4302, a back, right insulator 4304, and a back, left insulator 4306. Front, right insulator 4300, front, left insulator 4302, back, right insulator 4304, and back, left insulator 4306 avoid conduction of the electrical current on other components of second shelf 300 while supporting conduction of the electrical current to light assembly 1216 or any other object connected to first fastener 2304. The electrical current may provide DC power, AC power, or an electrical signal to the object connected to first fastener 2304.

Referring to FIG. 46, a left side view of second shelf support plate 302 is shown in accordance with an illustrative embodiment. Referring to FIG. 47, a left, bottom view of second shelf support plate 302 is shown in accordance with an illustrative embodiment. Second shelf support plate 302 may include the plurality of wires 4600, a front trim bracket 4602, a back bracket 2312, and a support wire 4604. The plurality of wires 4600 are parallel and extend between front trim bracket 4602 and back bracket 2312 to form a wire frame to support items placed on second shelf 300. Support wire 4604 is mounted below the plurality of wires 4600 near a midpoint between front trim bracket 4602 and back bracket 2312 to provide additional strength and rigidity to support items placed on second shelf support plate 302. Front trim bracket 4602 extends below a front edge of the plurality of wires 4600 and is shaped and sized to align with a portion of second front trim assembly 308. For example, front trim bracket 4602 has a sideways s-shape. Front trim bracket 4602 may include a first trim aperture wall 4700, a second trim aperture wall 4702, a third trim aperture wall 4704, and a fourth trim aperture wall 4706 formed through a top surface 4606 of front trim bracket 4602. In the illustrative embodiment, first trim aperture wall 4700 and second trim aperture wall 4702 are located adjacent a right edge of front trim bracket 4602, and third trim aperture wall 4704 and fourth trim aperture wall 4706 are located adjacent a left edge of front trim bracket 4602. Front trim bracket 4602 may include a fewer or a greater number of aperture walls.

Back bracket 2312 extends from a back edge of the plurality of wires 4600. In the illustrative embodiment, back bracket 2312 has an s-shape. Back bracket 2312 may include a first bracket aperture wall 4708, a second bracket aperture wall 4710, a third bracket aperture wall 4712, and a fourth bracket aperture wall 4714. In the illustrative embodiment, first bracket aperture wall 4708 and second bracket aperture wall 4710 are located adjacent a right edge of back bracket 2312, and third bracket aperture wall 4712 and fourth bracket aperture wall 4714 are located adjacent a left edge of back bracket 2312. Back bracket 2312 may include a fewer or a greater number of aperture walls.

The plurality of wires 4600 may be welded to front trim bracket 4602 and back bracket 2312. Support wire 4604 further may be welded to the plurality of wires 4600.

A ninth fastener 2314 may be inserted in first bracket aperture wall 4708, and a tenth fastener 2316 may be inserted in second bracket aperture wall 4710 to mount back, right insulator 4304 to second shelf support plate 302. An eleventh fastener 2318 may be inserted in third bracket aperture wall 4712, and a twelfth fastener 2320 may be inserted in fourth bracket aperture wall 4714 to mount back, left insulator 4306 to second shelf support plate 302.

A thirteenth fastener 4308 may be inserted in first trim aperture wall 4700, and a fourteenth fastener 4310 may be inserted in second trim aperture wall 4702 to mount front, right insulator 4300 to second shelf support plate 302. A fifteenth fastener 4312 may be inserted in third trim aperture wall 4704, and a sixteenth fastener 4314 may be inserted in fourth trim aperture wall 4706 to mount front, left insulator 4302 to second shelf support plate 302.

Figure 48:
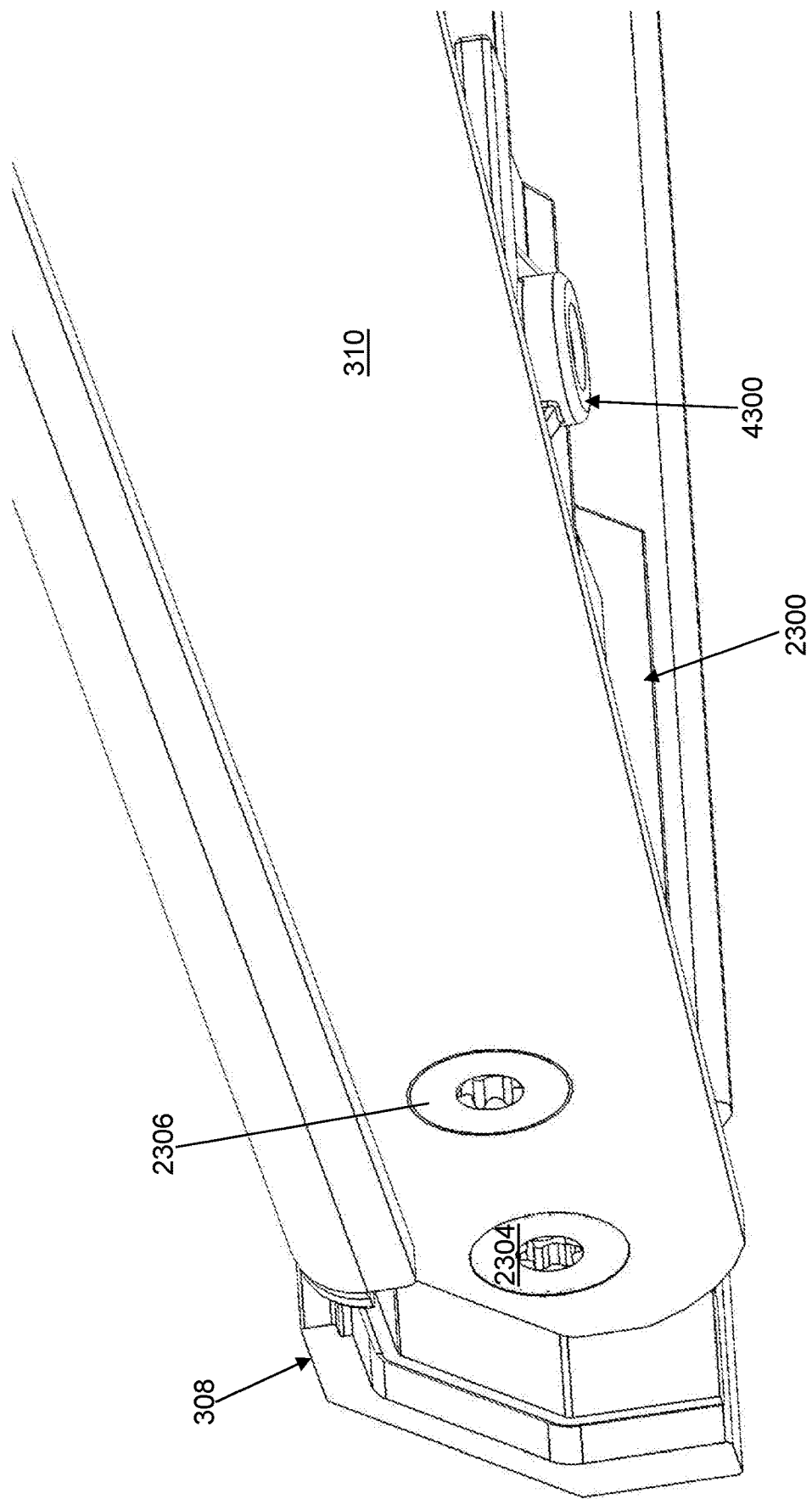
FIG. 48 depicts a zoomed back view of a front, right side of the front trim assembly of FIG. 25 in accordance with an illustrative embodiment.
Figure 49:
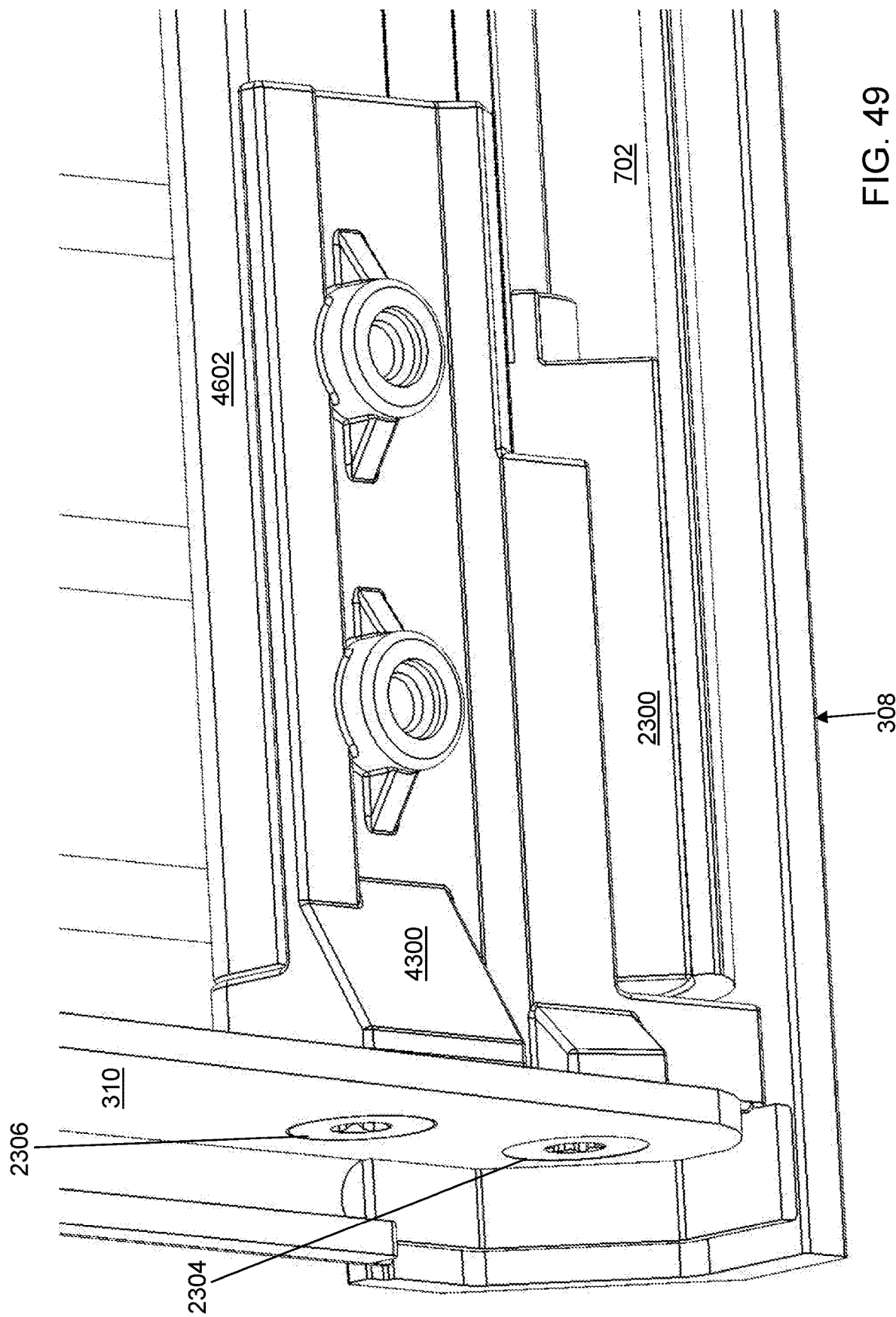
FIG. 49 depicts a zoomed bottom view of the front, right side of the front trim assembly of FIG. 25 in accordance with an illustrative embodiment.
Figure 50:
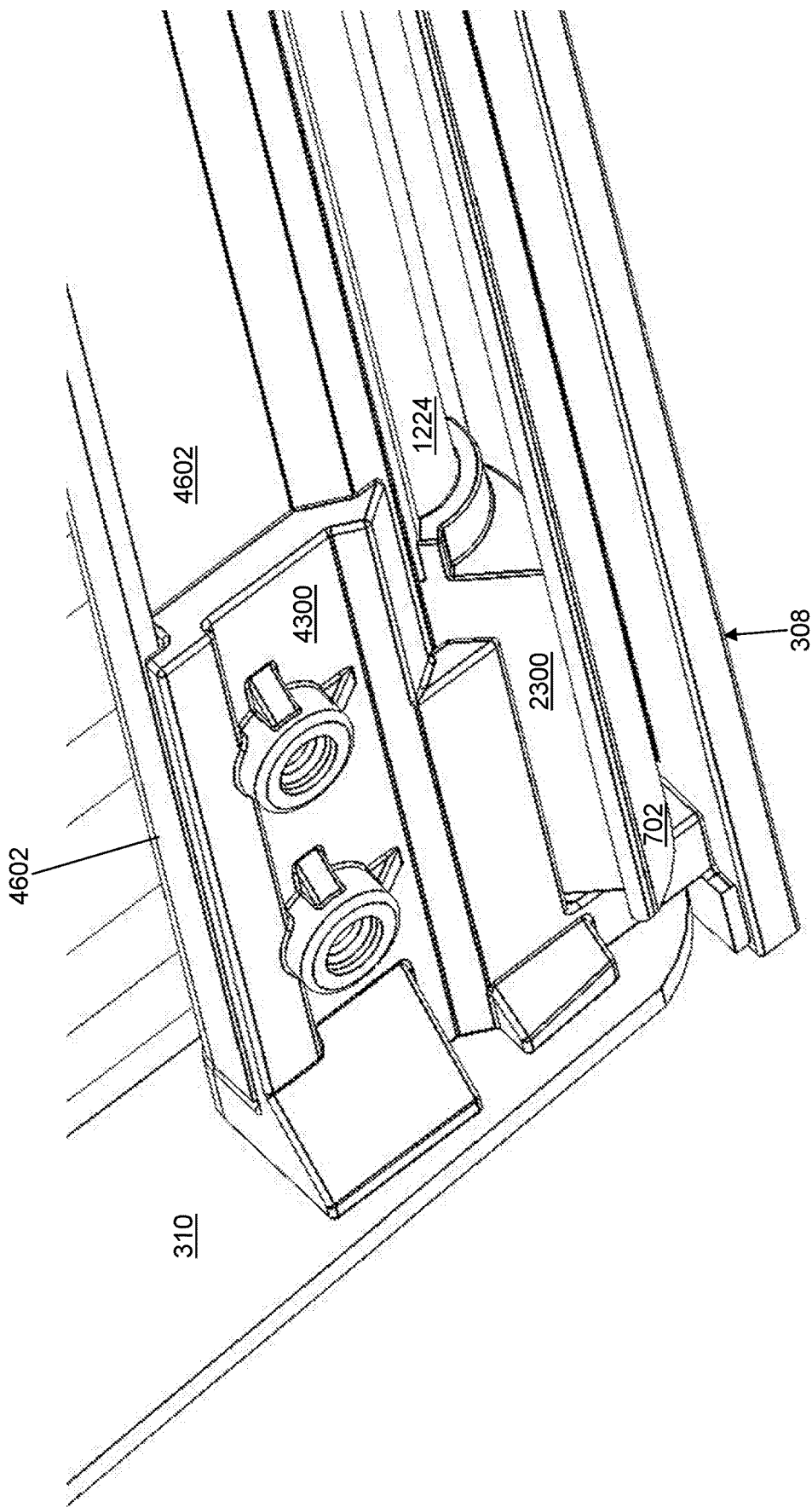
FIG. 50 depicts a zoomed bottom, left view of the front, right side of the front trim assembly of FIG. 25 in accordance with an illustrative embodiment.
Figure 51:
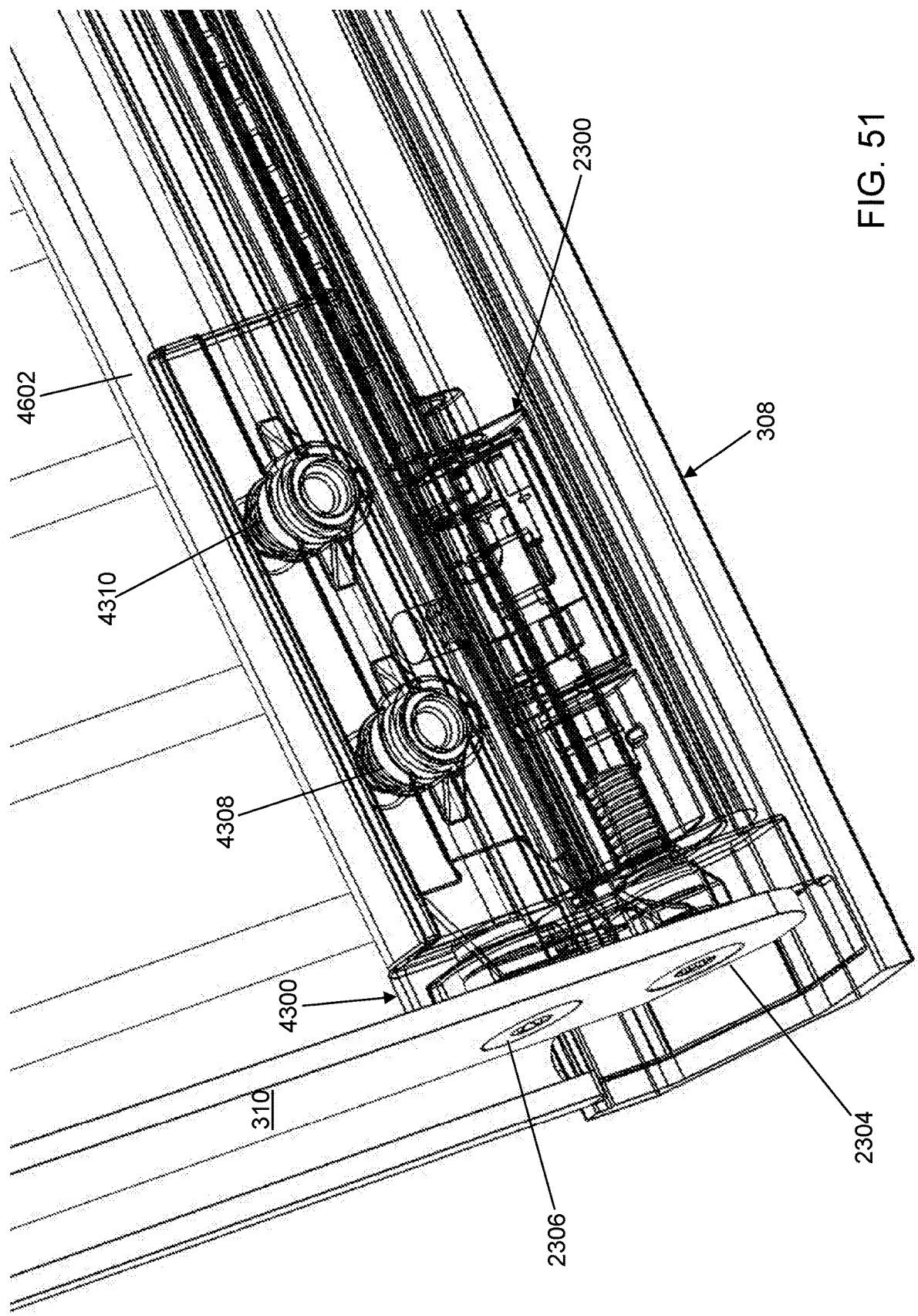
FIG. 51 depicts a zoomed bottom view of the front, right side of the front trim assembly of FIG. 25 with a front, right insulator and the right end cap assembly transparent in accordance with an illustrative embodiment.

Referring to FIG. 48, a zoomed back view of a front, right side of second front trim assembly 308 is shown in accordance with an illustrative embodiment. Referring to FIG. 49, a zoomed bottom view of the front, right side of second front trim assembly 308 is shown in accordance with an illustrative embodiment. Referring to FIG. 50, a zoomed bottom, left view of the front, right side of second front trim assembly 308 is shown in accordance with an illustrative embodiment. Referring to FIG. 51, a zoomed bottom view of the front, right side of second front trim assembly 308 is shown with front, right insulator 4300 and second right end cap assembly 2300 transparent in accordance with an illustrative embodiment.

Figure 52:
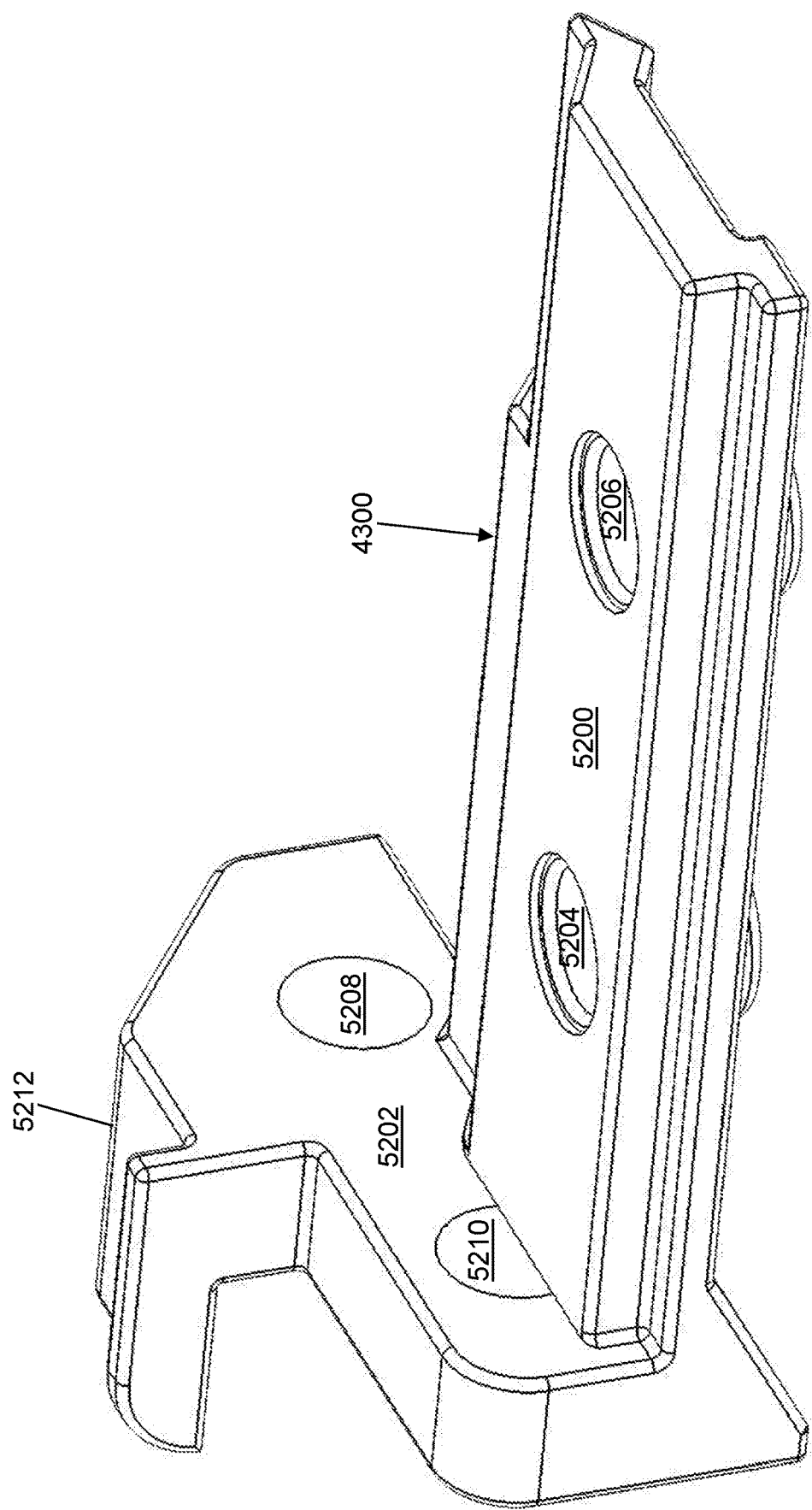
FIG. 52 depicts a back, left side view of the front, right insulator of FIG. 51 in accordance with an illustrative embodiment.
Figure 53:
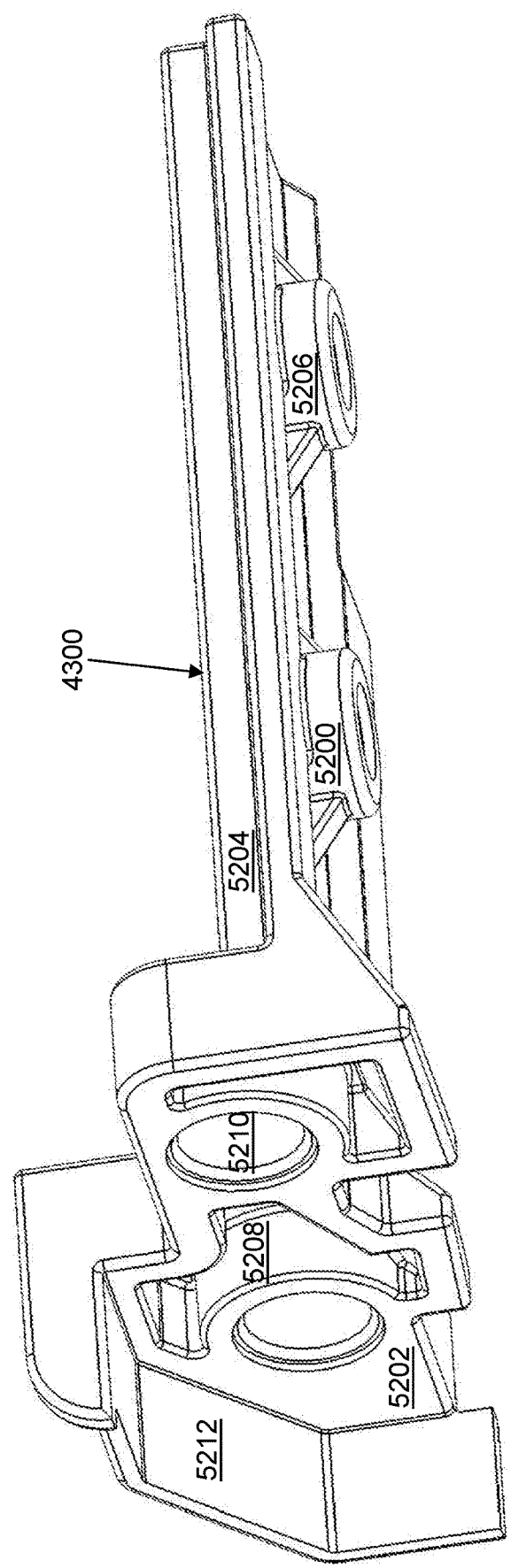
FIG. 53 depicts a back, right side view of the front, right insulator of FIG. 51 in accordance with an illustrative embodiment.

Referring to FIG. 52, a back, left side view of front, right insulator 4300 is shown in accordance with an illustrative embodiment. Referring to FIG. 53, a back, right side view of front, right insulator 4300 is shown in accordance with an illustrative embodiment. Front, left insulator 4302 may be a mirror image of front, right insulator 4300. Front, right insulator 4300 and front, left insulator 4302 are formed at least partially of an electrically insulating material. Front, right insulator 4300 and front, left insulator 4302 connect between second right brace 304 and second right end cap assembly 2300 and between second left brace 306 and second left end cap assembly 2302, respectively.

Front, right insulator 4300 may include a first wall 5200 and a second wall 5202. Second wall 5202 extends in a generally perpendicular direction from first wall 5200. A first insulator aperture wall 5204 and a second insulator aperture wall 5206 are formed in first wall 5200. First wall 5200 may include a fewer or a greater number of aperture walls. A third insulator aperture wall 5208 and a fourth insulator aperture wall 5210 are formed in second wall 5202. Second wall 5202 may include a fewer or a greater number of aperture walls. First insulator aperture wall 5204, second insulator aperture wall 5206, third insulator aperture wall 5208, and fourth insulator aperture wall 5210 may be at least partially threaded. Alternatively, threaded nuts may be inserted into first insulator aperture wall 5204, second insulator aperture wall 5206, third insulator aperture wall 5208, and/or fourth insulator aperture wall 5210.

In the illustrative embodiment, first insulator aperture wall 5204 and second insulator aperture wall 5206 extend from first wall 5200 in a direction of insertion of a shaft of thirteenth fastener 4308 and of fourteenth fastener 4310, respectively. In the illustrative embodiment, third insulator aperture wall 5208 and fourth insulator aperture wall 5210 extend from second wall 5202 in a direction that is opposite to the direction of insertion of shaft 3302 of first fastener 2304 and of second fastener 2306, respectively. Shaft 3302 of first fastener 2304 is inserted into first right front aperture wall 600, third insulator aperture wall 5208, and second right connector aperture wall 2600, which are aligned, to contact second flex connector 2602 or third flex connector 3502 and provide the electrical current from first right ladder 108a and/or second right ladder 108b or the ladder connector through second right brace 304. Second left brace 306 can be similarly configured.

Figure 54:
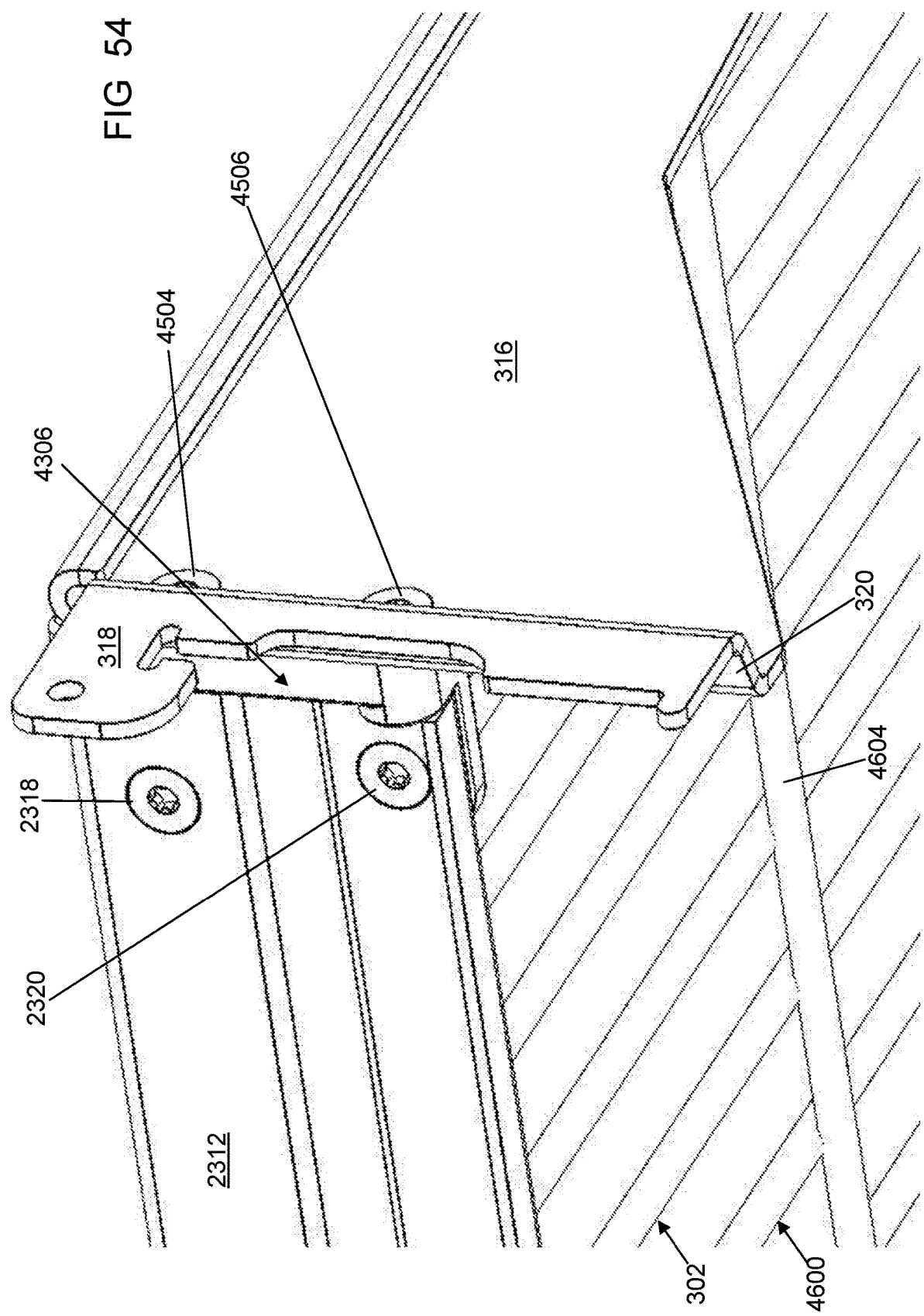
FIG. 54 depicts a zoomed back, left view of a back, left area of the second shelf of FIG. 3 in accordance with an illustrative embodiment.
Figure 55:
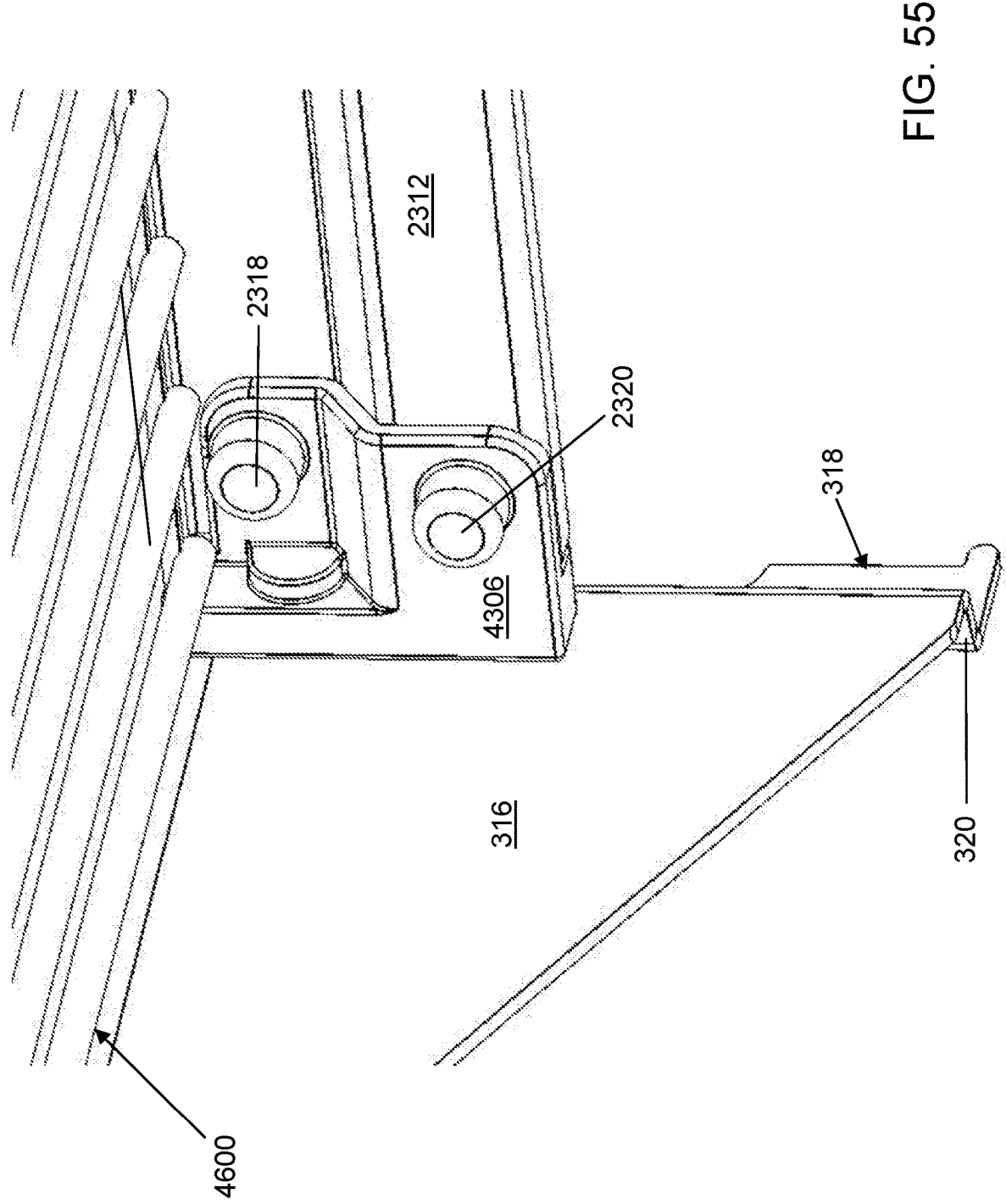
FIG. 55 depicts a zoomed front, right view of the back, left area of the second shelf of FIG. 3 in accordance with an illustrative embodiment.
Figure 56:
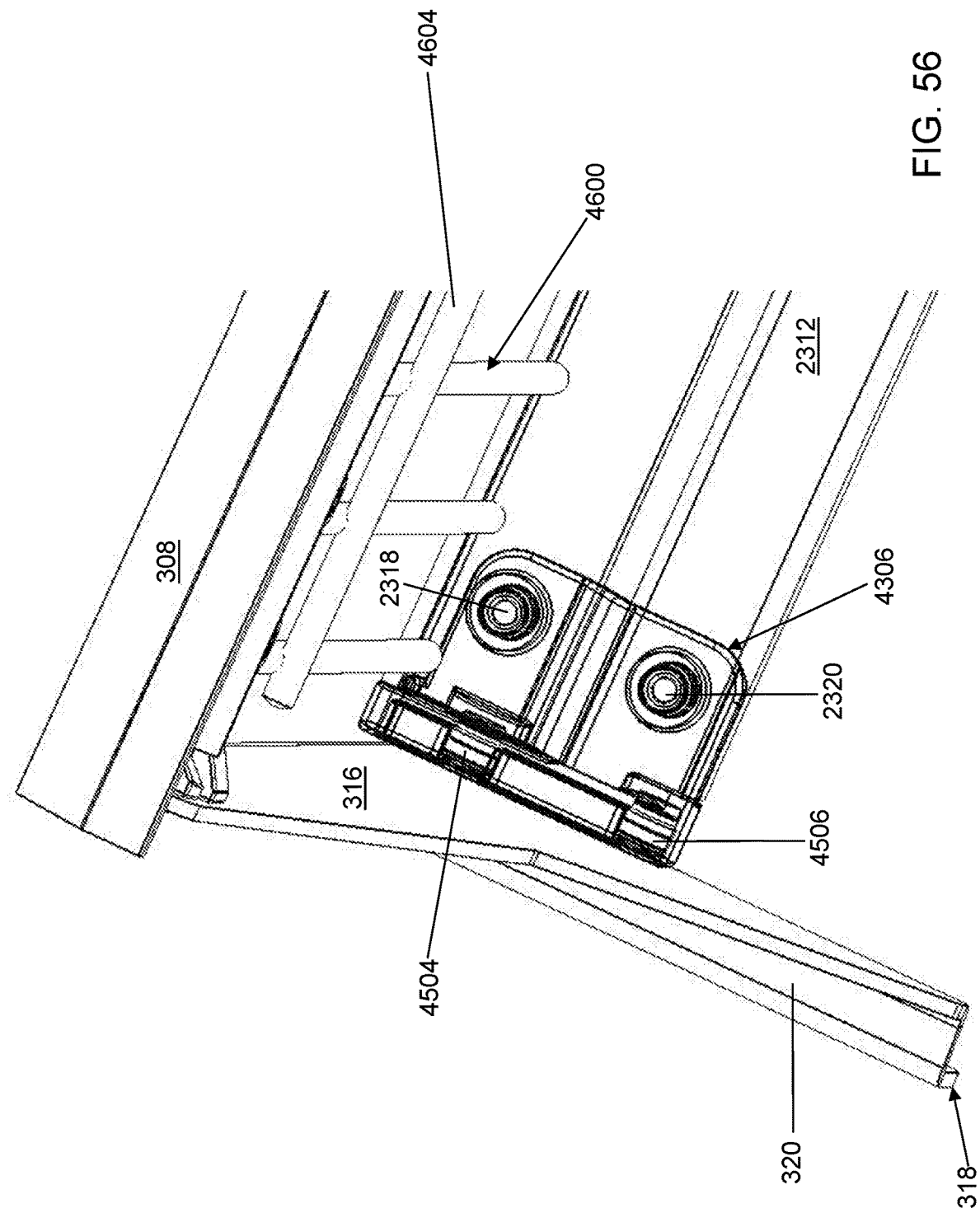
FIG. 56 depicts a zoomed front, right view of the back, left area of the second shelf of FIG. 3 with a back, left insulator transparent in accordance with an illustrative embodiment.

Referring to FIG. 54, a zoomed back, left view of a back, left area of second shelf 300 is shown in accordance with an illustrative embodiment. Referring to FIG. 55, a zoomed front, right view of the back, left area of second shelf 300 is shown in accordance with an illustrative embodiment. Referring to FIG. 56, a zoomed front, right view of the back, left area of second shelf 300 is shown with back, left insulator 4306 transparent in accordance with an illustrative embodiment.

Figure 58:
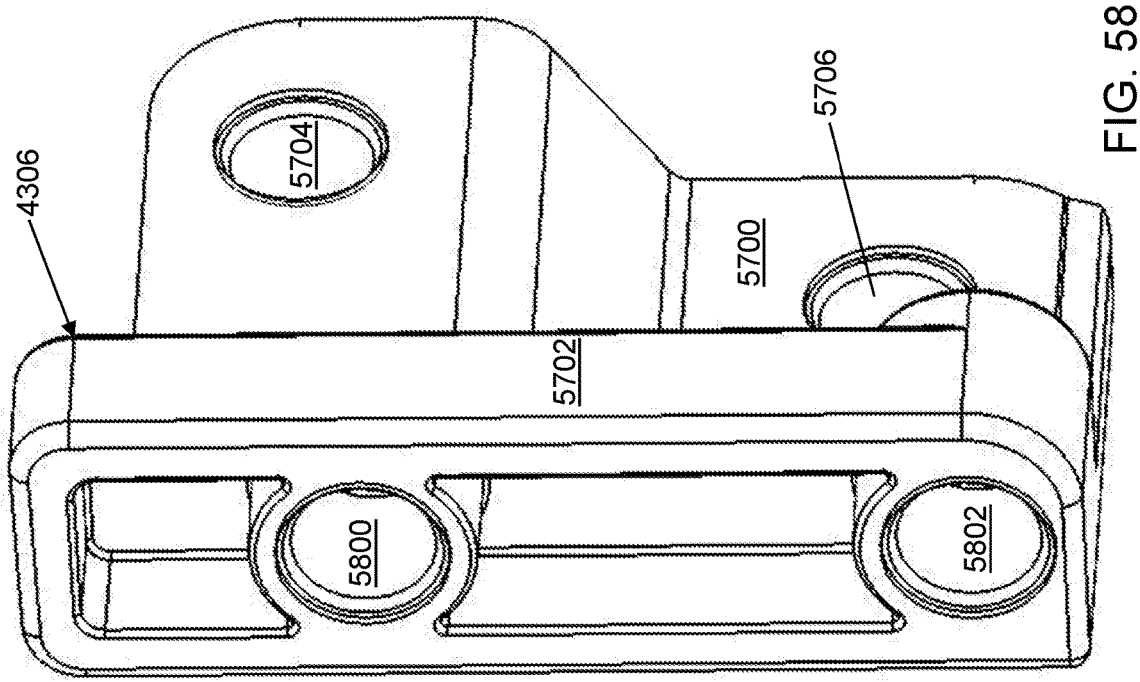
FIG. 58 depicts a left side view of the back, left insulator of FIG. 56 in accordance with an illustrative embodiment.
Figure 57:
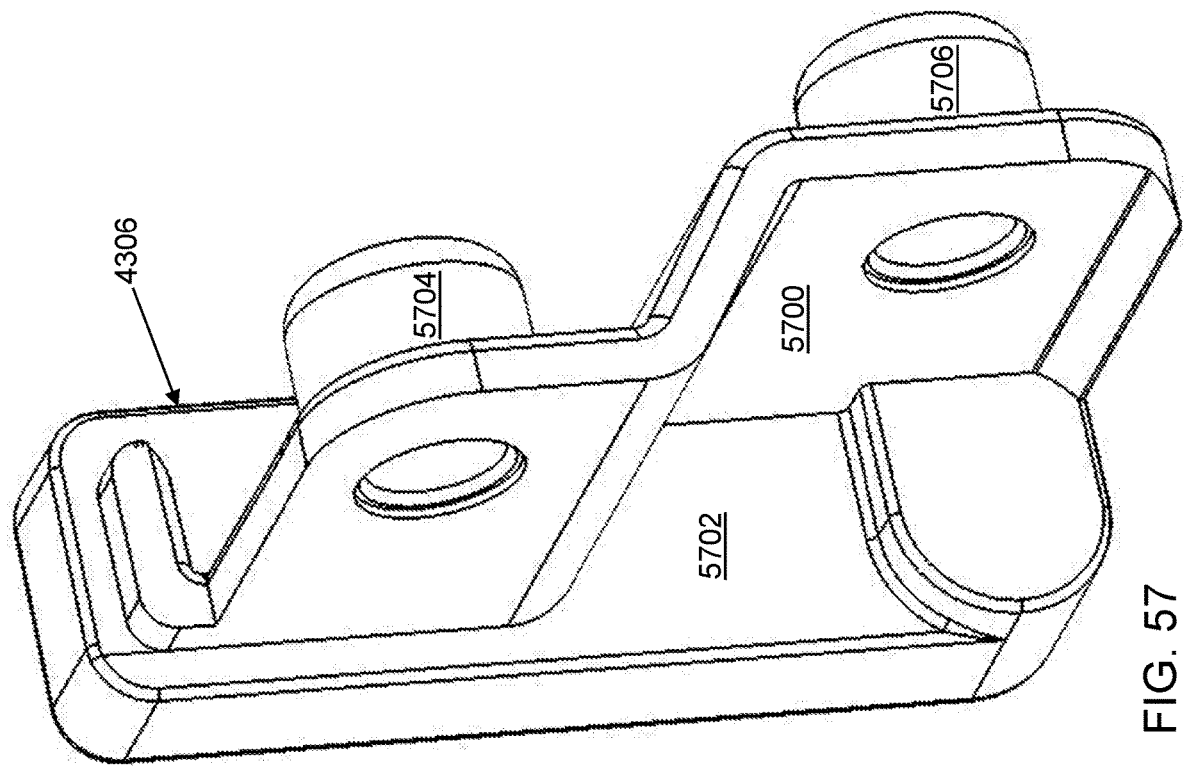
FIG. 57 depicts a front, right side view of the back, left insulator of FIG. 56 in accordance with an illustrative embodiment.

Referring to FIG. 57, a front, right side view of back, left insulator 4306 is shown in accordance with an illustrative embodiment. Referring to FIG. 58, a left side view of back, left insulator 4306 is shown in accordance with an illustrative embodiment. Back, left insulator 4306 may be a mirror image of back, right insulator 4304. Back, right insulator 4304 and back, left insulator 4306 are formed at least partially of an electrically insulating material.

Back, right insulator 4304 may include a third wall 5700 and a fourth wall 5702. Fourth wall 5702 extends in a generally perpendicular direction from third wall 5700. A first insulator aperture wall 5704 and a second insulator aperture wall 5706 are formed in third wall 5700. Third wall 5700 may include a fewer or a greater number of aperture walls. A third insulator aperture wall 5708 and a fourth insulator aperture wall 5710 are formed in fourth wall 5702. Fourth wall 5702 may include a fewer or a greater number of aperture walls. First insulator aperture wall 5704, second insulator aperture wall 5706, third insulator aperture wall 5708, and fourth insulator aperture wall 5710 may be at least partially threaded. Alternatively, threaded nuts may be inserted into first insulator aperture wall 5704, second insulator aperture wall 5706, third insulator aperture wall 5708, and/or fourth insulator aperture wall 5710.

In the illustrative embodiment, first insulator aperture wall 5704 and second insulator aperture wall 5706 extend from third wall 5700 in a direction of insertion of a shaft of eleventh fastener 2318 and of twelfth fastener 2320, respectively. In the illustrative embodiment, third insulator aperture wall 5708 and fourth insulator aperture wall 5710 extend from fourth wall 5702 in a direction that is opposite to the direction of insertion of the shaft of seventh fastener 4504 and of eighth fastener 4506, respectively.

The components of first shelf 200 and of second shelf 300 can be used in various combinations to provide electrical current to an object at various locations on first shelf 200 and on second shelf 300 while avoiding undesired electrical current flow in other areas.

Use of directional terms, such as top, bottom, right, left, front, back, etc. are merely intended to facilitate reference to the various surfaces and elements of the described structures relative to the orientations shown in the drawings and are not intended to be limiting in any manner. For consistency, the components of refrigerator 100 are labeled relative to a front on which a door is mounted.

As used in this disclosure, the term "mount" includes join, unite, connect, couple, associate, insert, hang, hold, affix, attach, fasten, bind, paste, secure, bolt, screw, rivet, solder, weld, glue, adhere, form over, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A shelf comprising:
    a shelf support plate formed at least partially of a first electrically conductive material, the shelf support plate including a first aperture wall formed through the shelf support plate;
    a first insulator formed at least partially of a first electrically insulating material, the first insulator including a second aperture wall and a third aperture wall;
    a first fastener including a first shaft and a first head, the first fastener formed at least partially of a second electrically conductive material;
    a second fastener including a second shaft and a second head, the second fastener formed at least partially of a third electrically conductive material; and
    a shelf brace formed at least partially of a fourth electrically conductive material, the shelf brace including a brace plate, a shelf hook that extends from the brace plate, and a fourth aperture wall, wherein the shelf hook is configured to connect to an electrical connector configured to provide an electrical current to the shelf brace, wherein the fourth aperture wall is formed through the shelf brace,
    wherein the first insulator is configured to mount between the shelf support plate and the shelf brace using the first shaft of the first fastener inserted into the first aperture wall and the second aperture wall and the second shaft of the second fastener inserted into the fourth aperture wall and the third aperture wall.

2. The shelf of claim 1, wherein the shelf support plate comprises:
    a support plate;
    a front trim mounted to extend from a front edge of the support plate; and
    a back brace mounted to extend from a back edge of the support plate,
    wherein the shelf brace is mounted to a side of the support plate.

3. The shelf of claim 2, wherein the first insulator is mounted between the back brace and the shelf brace.

4. The shelf of claim 2, wherein the first insulator is mounted between the front trim and the shelf brace.

5. The shelf of claim 2, further comprising:
a second insulator formed at least partially of a second electrically insulating material, the second insulator including a fifth aperture wall and a sixth aperture wall;
a third fastener including a third shaft and a third head, the third fastener formed at least partially of a fifth electrically conductive material; and
a fourth fastener including a fourth shaft and a fourth head, the first fastener formed at least partially of a sixth electrically conductive material,
wherein the shelf support plate includes a seventh aperture wall formed through the shelf support plate, wherein the shelf brace includes an eighth aperture wall formed through the shelf brace, wherein the second insulator is configured to mount between the shelf support plate and the shelf brace using the third shaft of the third fastener inserted into the fifth aperture wall and the seventh aperture wall and the fourth shaft of the fourth fastener inserted into the sixth aperture wall and the eighth aperture wall.

6. The shelf of claim 5, wherein the first insulator is mounted between the back brace and the shelf brace, wherein the second insulator is mounted between the front trim and the shelf brace.

7. The shelf of claim 5, wherein at least one of the first fastener, the second fastener, the third fastener, and the fourth fastener is connected to provide the electrical current from the shelf brace to an electrical device mounted to the shelf support plate.

8. The shelf of claim 7, wherein the electrical device is mounted to the front trim.

9. The shelf of claim 7, wherein the electrical current provides an electrical signal to the electrical device.

10. The shelf of claim 5, wherein the second electrically insulating material is the first electrically insulating material.

11. The shelf of claim 1, wherein the fourth electrically conductive material is the first electrically conductive material.

12. The shelf of claim 1, wherein the first fastener is selected from the group consisting of a screw, a rivet, a nail, and a bolt.

13. The shelf of claim 1, wherein at least one of the first fastener and the second fastener is connected to provide the electrical current from the shelf brace to an electrical device mounted to the shelf support plate.

14. The shelf of claim 1, wherein the first insulator further comprises:
a first wall; and
a second wall that extends in a generally perpendicular direction from the first wall,
wherein the second aperture wall is formed in the first wall,
wherein the third aperture wall is formed in the second wall.

15. The shelf of claim 14, wherein the second aperture wall further extends from the first wall in a first direction opposite a second direction of insertion of the first shaft of the first fastener.

16. The shelf of claim 14, wherein the second aperture wall further extends from the first wall in a direction of insertion of the first shaft of the first fastener.

17. The shelf of claim 1, wherein the shelf hook comprises:
a shelf hook wall mounted to the brace plate,
wherein the shelf hook wall comprises
a top surface;
a bottom surface; and
an exterior edge surface,
wherein the exterior edge surface extends between the top surface and the bottom surface,
wherein a first portion of the exterior edge surface that extends from the top surface is generally perpendicular to the top surface,
wherein a second portion of the exterior edge surface that extends from the bottom surface is generally perpendicular to the bottom surface,
wherein an exterior surface of the shelf brace is coated with a second electrically insulating material except along the exterior edge surface.

18. The shelf of claim 1, further comprising:
a transition wall mounted to the brace plate, wherein the transition wall comprises a first seam and a second seam that extend along a mounting location to the brace plate, wherein the first seam and the second seam are on opposite sides of the transition wall; and
a shelf hook wall mounted along the first seam,
wherein the shelf hook comprises
a top surface that extends above the transition wall and the shelf hook wall;
a bottom surface that extends below the transition wall and the shelf hook wall; and
an exterior edge surface that extends between the top surface and the bottom surface and along an exterior edge of the shelf hook wall opposite the first seam,
wherein a first portion of the exterior edge surface that extends from the top surface is generally perpendicular to the top surface,
wherein a second portion of the exterior edge surface that extends from the bottom surface is generally perpendicular to the bottom surface,
wherein an exterior surface of the shelf brace is coated with a second electrically insulating material except on the shelf hook.

19. The shelf of claim 18, wherein the shelf support plate includes a plurality of wires mounted together to form a wire frame.

20. The shelf of claim 18, wherein the shelf support plate includes a solid surface.

21. The shelf of claim 18, wherein the transition wall further comprises:
a third seam between the first seam and the second seam, wherein the third seam extends generally parallel to the first seam and the second seam,
wherein a portion of the shelf hook between the third seam and the second seam is coated with the second electrically insulating material.

22. The shelf of claim 18, wherein a portion of the shelf hook between the second seam and the exterior edge surface is coated with the second electrically insulating material.

23. The shelf of claim 1, wherein the shelf brace further comprises a shelf electrical connector that extends from the brace plate, wherein the shelf hook comprises:
a shelf hook wall mounted to the brace plate, wherein the shelf hook wall comprises
a top surface;
a bottom surface; and
an exterior edge surface,
wherein the exterior edge surface extends between the top surface and the bottom surface,
wherein a first portion of the exterior edge surface that extends from the top surface is generally perpendicular to the top surface, wherein a second portion of the exterior edge surface that extends from the bottom surface is generally perpendicular to the bottom surface, wherein an exterior surface of the shelf brace is coated with a second electrically insulating material except along the exterior edge surface and on the shelf electrical connector.

24. The shelf of claim 23, wherein the shelf electrical connector extends from a first edge of the brace plate, wherein the shelf hook extends from a second edge of the brace plate, wherein the first edge is at an end of the brace plate opposite the second edge.

25. The shelf of claim 24, wherein the shelf electrical connector extends upward from the first edge of the brace plate.

26. The shelf of claim 24, wherein the shelf electrical connector extends downward from the first edge of the brace plate.

27. The shelf of claim 24, wherein the shelf electrical connector extends outward from the first edge of the brace plate.

28. The shelf of claim 24, wherein the shelf electrical connector has a polygonal cross-sectional shape defined in a plane of the brace plate that extends between the first edge and the second edge.

29. The shelf of claim 1, wherein the shelf support plate comprises:
   a support plate that comprises a plurality of wires mounted together to form a wire mesh;
   a front trim mounted to extend from a front edge of the support plate; and
   a back brace mounted to extend from a back edge of the support plate,
   wherein the shelf brace is mounted to a side of the support plate.

30. The shelf of claim 1, wherein the shelf support plate comprises:
   a support plate formed of glass; and
   a front trim mounted to extend from a front edge of the support plate,
   wherein the shelf brace is mounted to a side of the support plate.

31. The shelf of claim 1, wherein the electrical connector is a ladder formed of a fifth electrically conductive material, wherein the ladder is configured to connect to an electrical source of energy.

32. The shelf of claim 1, wherein the electrical connector is mounted to a ladder formed of a fifth electrically conductive material, wherein the ladder is configured to connect to an electrical source of energy.

* * * * *